United States Patent
Mukai et al.

(10) Patent No.: US 7,206,601 B2
(45) Date of Patent: Apr. 17, 2007

(54) METHOD FOR CONNECTING A MOBILE RADIO COMMUNICATION APPARATUS TO A PLURALITY OF RADIO COMMUNICATION SYSTEMS

(75) Inventors: Manabu Mukai, Yokohama (JP); Shun-ichi Kubo, Kunitachi (JP); Takashi Wakutsu, Kawasaki (JP); Daisuke Takeda, Tokyo (JP); Jun Mitsugi, Kawasaki (JP); Kaoru Inoue, Yokohama (JP); Takeshi Tomizawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/259,047

(22) Filed: Oct. 27, 2005

(65) Prior Publication Data

US 2006/0035671 A1 Feb. 16, 2006

Related U.S. Application Data

(62) Division of application No. 10/053,544, filed on Jan. 24, 2002, now Pat. No. 7,092,733.

(30) Foreign Application Priority Data

| Jan. 25, 2001 | (JP) | 2001-017071 |
| Jan. 30, 2001 | (JP) | 2001-022161 |
| Feb. 21, 2001 | (JP) | 2001-045313 |
| Feb. 22, 2001 | (JP) | 2001-046736 |
| Feb. 23, 2001 | (JP) | 2001-048496 |

(51) Int. Cl.
*H04M 1/00* (2006.01)

(52) U.S. Cl. .................. 455/552.1; 455/436; 455/466; 455/557; 455/66.1

(58) Field of Classification Search ............. 455/552.1, 455/132, 436, 438, 418, 419, 466, 557, 66.1
See application file for complete search history.

(56) References Cited

U.S. PATENT DOCUMENTS

| 6,154,658 | A   | 11/2000 | Caci |
| 6,366,578 | B1* | 4/2002  | Johnson ..................... 370/353 |
| 6,519,601 | B1  | 2/2003  | Bosch |
| 6,546,261 | B1  | 4/2003  | Cummings |
| 6,741,639 | B1  | 5/2004  | Yoshida et al. |
| 6,768,901 | B1  | 7/2004  | Osborn et al. |

(Continued)

FOREIGN PATENT DOCUMENTS

JP 5-120243 5/1993

(Continued)

OTHER PUBLICATIONS

U.S. Appl. No. 11/259,047, filed Oct. 27, 2005, Mukai et al.
Patent Abstracts of Japan, JP 09-331579, Dec. 22, 1997.

*Primary Examiner*—Erika A. Gary
*Assistant Examiner*—Huy D Nguyen
(74) *Attorney, Agent, or Firm*—Oblon, Spivak, McClelland, Maier & Neustadt, P.C.

(57) ABSTRACT

A mobile radio communication apparatus comprises a wireless transmitter-receiver device configured to perform transmission/reception of a radio signal, a signal processing device including a resource to which functions are defined, wherein the resource handles at least a modem function and a protocol function, and configured to perform a signal processing necessary in the transmission/reception by use of the resource, and a controller that controls the signal processing device to redefine, to the resource, another modem function and another protocol function corresponding to respective one of the mobile communication systems.

6 Claims, 40 Drawing Sheets

U.S. PATENT DOCUMENTS

| | | | |
|---|---|---|---|
| 6,914,950 B1 * | 7/2005 | Luneau | 455/132 |
| 6,954,636 B2 | 10/2005 | Matsuo et al. | |
| 7,050,807 B1 * | 5/2006 | Osborn | 455/445 |
| 2001/0012779 A1 * | 8/2001 | Skog | 455/436 |
| 2002/0077151 A1 * | 6/2002 | Matthews et al. | 455/561 |
| 2002/0082044 A1 * | 6/2002 | Davenport | 455/552 |
| 2002/0107841 A1 | 8/2002 | Hellerstein et al. | |
| 2002/0119754 A1 | 8/2002 | Wakutsu et al. | |
| 2002/0122384 A1 | 9/2002 | Khawer | |
| 2002/0137514 A1 | 9/2002 | Mitsugi et al. | |
| 2003/0177286 A1 * | 9/2003 | Gould | 709/331 |
| 2003/0181218 A1 | 9/2003 | Mukai et al. | |
| 2004/0063425 A1 | 4/2004 | Wakutsu et al. | |

FOREIGN PATENT DOCUMENTS

| | | |
|---|---|---|
| JP | 9-331579 | 12/1997 |
| JP | 11-3321 | 1/1999 |
| JP | 11-184718 | 7/1999 |
| JP | 11-272623 | 10/1999 |
| JP | 11-274997 | 10/1999 |
| JP | 11-346186 | 12/1999 |
| JP | 2000-23251 | 1/2000 |
| JP | 2000-148707 | 5/2000 |
| JP | 2000-196494 | 7/2000 |
| JP | 2000-311156 | 11/2000 |
| JP | 2000-324043 | 11/2000 |
| JP | 2001-14286 | 1/2001 |
| JP | 2001-61186 | 3/2001 |
| JP | 2001-230691 | 8/2001 |
| WO | WO 99/37099 | 7/1999 |
| WO | WO 99/62194 | 12/1999 |

* cited by examiner

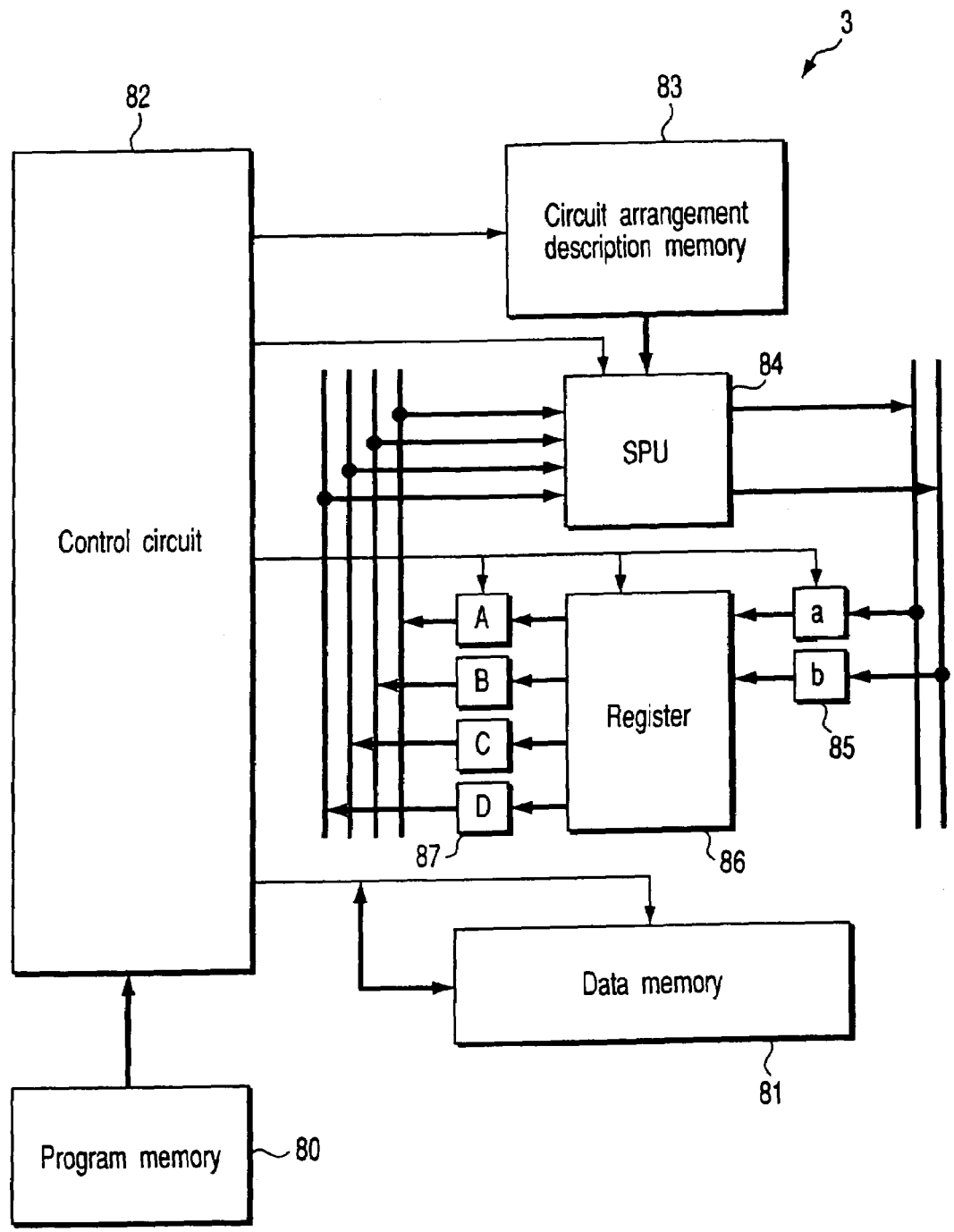
F I G. 10

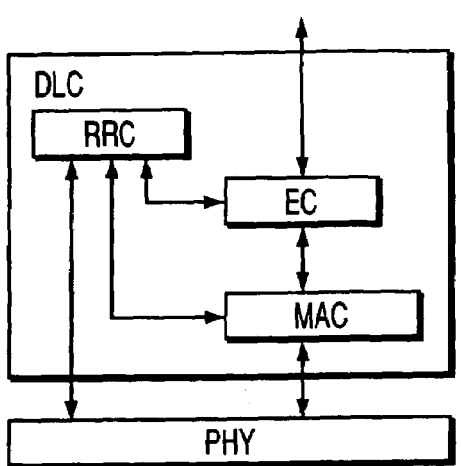

FIG. 21

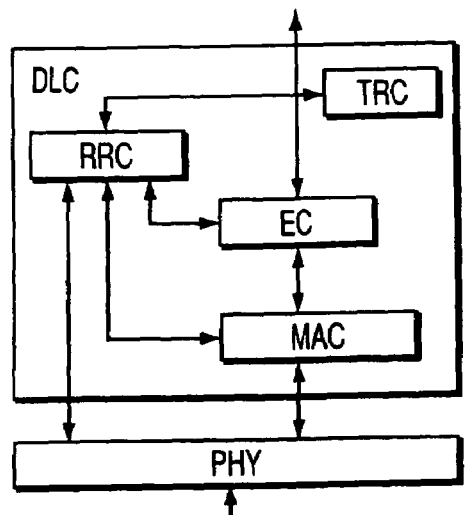

FIG. 22

| Machine number | Model ID | Version ID | Resource | Manufacturer |
|---|---|---|---|---|
| A 327 - 010001 ~ A 327 - 034800 | KA 32 | 7 | List 32 - 7 | A company |
| A 327 - 034801 ~ A 327 - 040000 | KA 32 | 8 | List 32 - 8 | A company |
| B 01 - 01 ~ B 01 - 020000 | KB 01 | 1 | List 01 - 1 | B company |
| B 01 - 20001 ~ B 01 - 040000 | KB 01 | 2 | List 01 - 2 | B company |

FIG. 23

| Unredefinable area | Function block name | Resource area A | Resource area B | Remarks |
|---|---|---|---|---|
| | Cumulative addition | 10 | 2 | Set of rate is possible for each area |
| | Correlator | 4 | 12 | |
| | Viterbi decoder | 2 | 2 | |
| | CRC check | 2 | 4 | |
| Redefinable area | Number of PLD blocks | 6200 | 6200 | When areas A and B are at the same time used, number of usable blocks is 5400 + 5400 |

FIG. 24

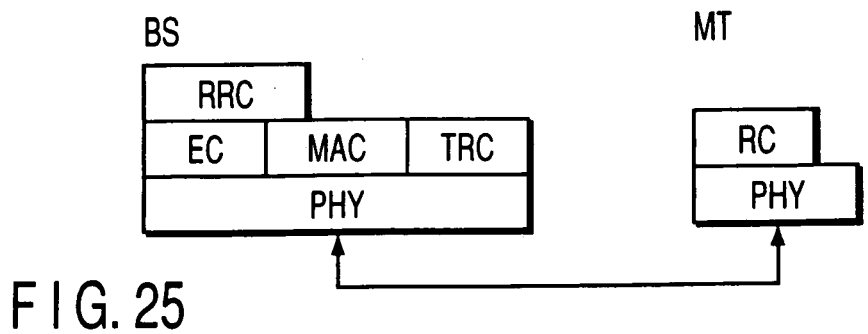

FIG. 25

| Message name | MT Residual Resource List Request |
|---|---|
| Source | TRC (BS) |
| Address | RRC (BS) |
| Type of Argument | Request information in unredefinable area |
| | Request information in redefinable area |
| | Request information in unredefinable area and redefinable area |

FIG. 26

| Offset | Contents |
|---|---|
| 0X00 | Number of unused CRC attach blocks |
| 0X01 | Number of unused CRC check blocks |
| 0X02 | Number of unused correlators |
| 0X03 | Number of unused accumulators |
| 0X0a | Number of unused PLDs |

FIG. 27

| Message name | MT Residual Resource List |
|---|---|
| Source | RRC ( BS ) |
| Address | TRC ( BS ) |
| Type of Argument | Response to "Request information in unredefinable area" |
| | Response to "Request information in redefinable area" |
| | Response to "Request information in unredefinable area and redefinable area" |

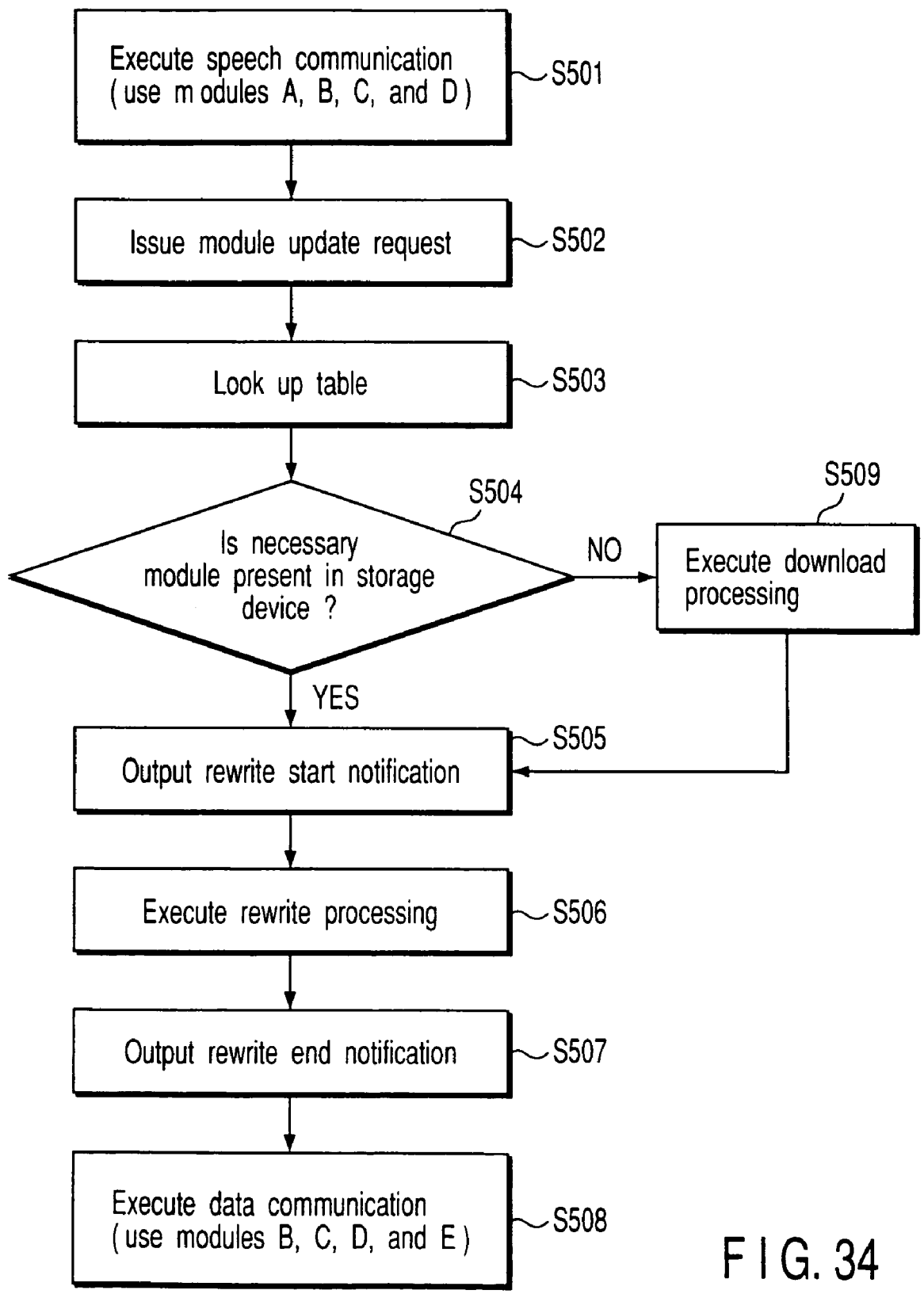
F I G. 34

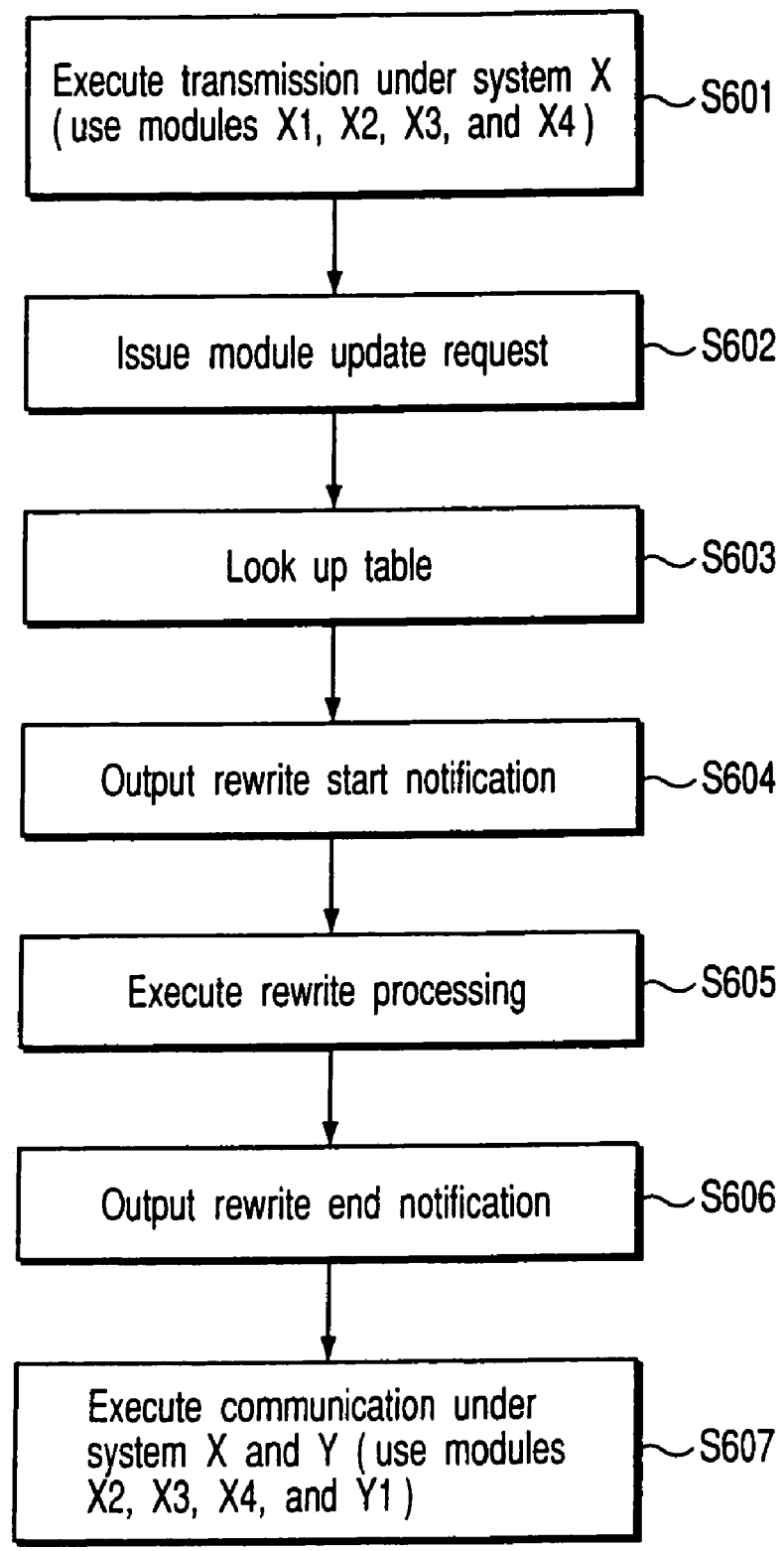
F I G. 36

Items of module use log table

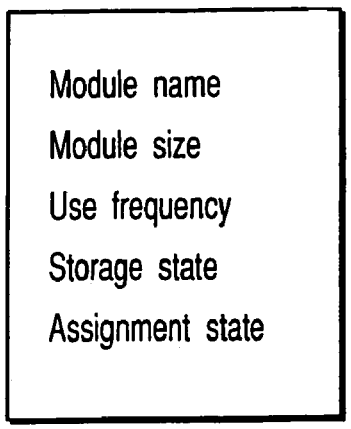

FIG. 41A

Example of contents of module use log table

| Module name | Module size | Use frequency | Storage state | Assignment state |
|---|---|---|---|---|
| QPSK modulation | 10200Byte | 320 | 0X1000 | ON |
| Correlator | 15300Byte | 230 | 0X4000 | ON |
| Convolution coding | 12900Byte | 202 | 0X5000 | OFF |
| PN coding | 25000Byte | 23 | 0X3000 | OFF |
| Walsh coding | 18000Byte | 9 | NO | OFF |

FIG. 41B

Updated module use log table

| Module name | Module size | Use frequency | Storage state | Assignment state |
|---|---|---|---|---|
| QPSK modulation | 10200Byte | 320 | 0X1000 | ON |
| Correlator | 15300Byte | 230 | 0X4000 | ON |
| Convolution coding | 12900Byte | 202 | 0X5000 | OFF |
| PN coding | 25000Byte | 23 | 0X3000 | OFF |

FIG. 41C

Items of module use log table

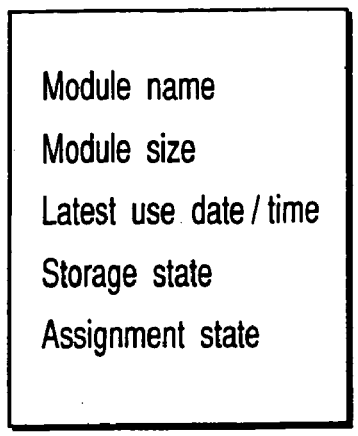

FIG. 43A

Example of contents of module use log table

| Module name | Module size | Latest use date / time | Storage state | Assignment state |
|---|---|---|---|---|
| QPSK modulation | 10200Byte | 2005 / 04 / 14 | 0X1000 | ON |
| Correlator | 15300Byte | 2005 / 12 / 21 | 0X4000 | ON |
| Convolution coding | 12900Byte | 2003 / 05 / 04 | 0X5000 | OFF |
| PN coding | 25000Byte | 2005 / 02 / 03 | 0X3000 | OFF |
| Walsh coding | 18000Byte | 2005 / 08 / 14 | NO | OFF |

FIG. 43B

Updated module use log table

| Module name | Module size | Latest use date / time | Storage state | Assignment state |
|---|---|---|---|---|
| QPSK modulation | 10200Byte | 2005 / 04 / 14 | 0X1000 | ON |
| Correlator | 15300Byte | 2005 / 12 / 21 | 0X4000 | ON |
| PN coding | 25000Byte | 2005 / 02 / 03 | 0X3000 | OFF |
| Walsh coding | | | | OFF |

FIG. 43C

Items of module use log table

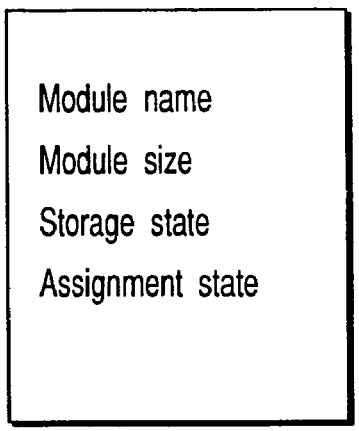

- Module name
- Module size
- Storage state
- Assignment state

FIG. 45A

Example of contents of module use log table

| Module name | Module size | Storage state | Assignment state |
|---|---|---|---|
| QPSK modulation | 10200Byte | 0X1000 | ON |
| Correlator | 15300Byte | 0X4000 | ON |
| Convolution coding | 12900Byte | 0X5000 | OFF |
| PN coding | 25000Byte | 0X3000 | OFF |
| Walsh coding | 18000Byte | NO | OFF |

FIG. 45B

Updated module use log table

| Module name | Module size | Storage state | Assignment state |
|---|---|---|---|
| QPSK modulation | 10200Byte | 0X1000 | ON |
| Correlator | 15300Byte | 0X4000 | ON |
| Convolution coding | 12900Byte | 0X5000 | OFF |
| Walsh coding | 18000Byte | NO | OFF |

FIG. 45C

Items of module use log table

Module name
Module size
Version
Storage state
Assignment state

Example of contents of module use log table

| Module name | Module size | Version | Storage state | Assignment state |
|---|---|---|---|---|
| QPSK modulation | 10200Byte | 2.1 | 0X1000 | ON |
| Correlator | 15300Byte | 1.3 | 0X4000 | ON |
| Convolution coding | 12900Byte | 3.1 | 0X5000 | OFF |
| PN coding | 25000Byte | 2.3 | 0X3000 | OFF |
| Walsh coding | 18000Byte | 1.8 | 0X8000 | OFF |

Items of module use log table

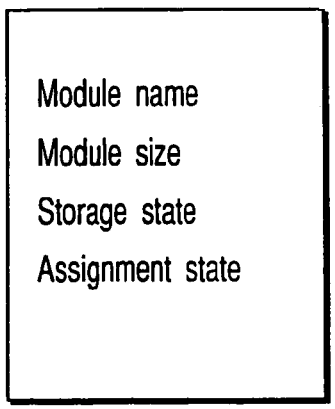

FIG. 50A

Example of contents of module use log table

| Module name | Module size | Storage state | Assignment state |
|---|---|---|---|
| QPSK modulation | 10200Byte | 0X1000 | ON |
| Correlator | 15300Byte | 0X4000 | ON |
| Convolution coding | 12900Byte | 0X5000 | OFF |
| PN coding | 25000Byte | 0X3000 | OFF |

FIG. 50B

Display example of log information

| Currently stored modules ||||
|---|---|---|---|
| No. | Module name | Module size | State |
| 1 | Internet connection | 586400Byte | In use |
| 2 | Mail system | 74500Byte | In use |
| 3 | Moving image reproduction | 32900Byte | In use |
| 4 | Ringing tone increase | 15000Byte | - |
| 5 | GSP system | 38000Byte | - |
| Which module do you want to delete ? (input number) → ||||

FIG. 50C

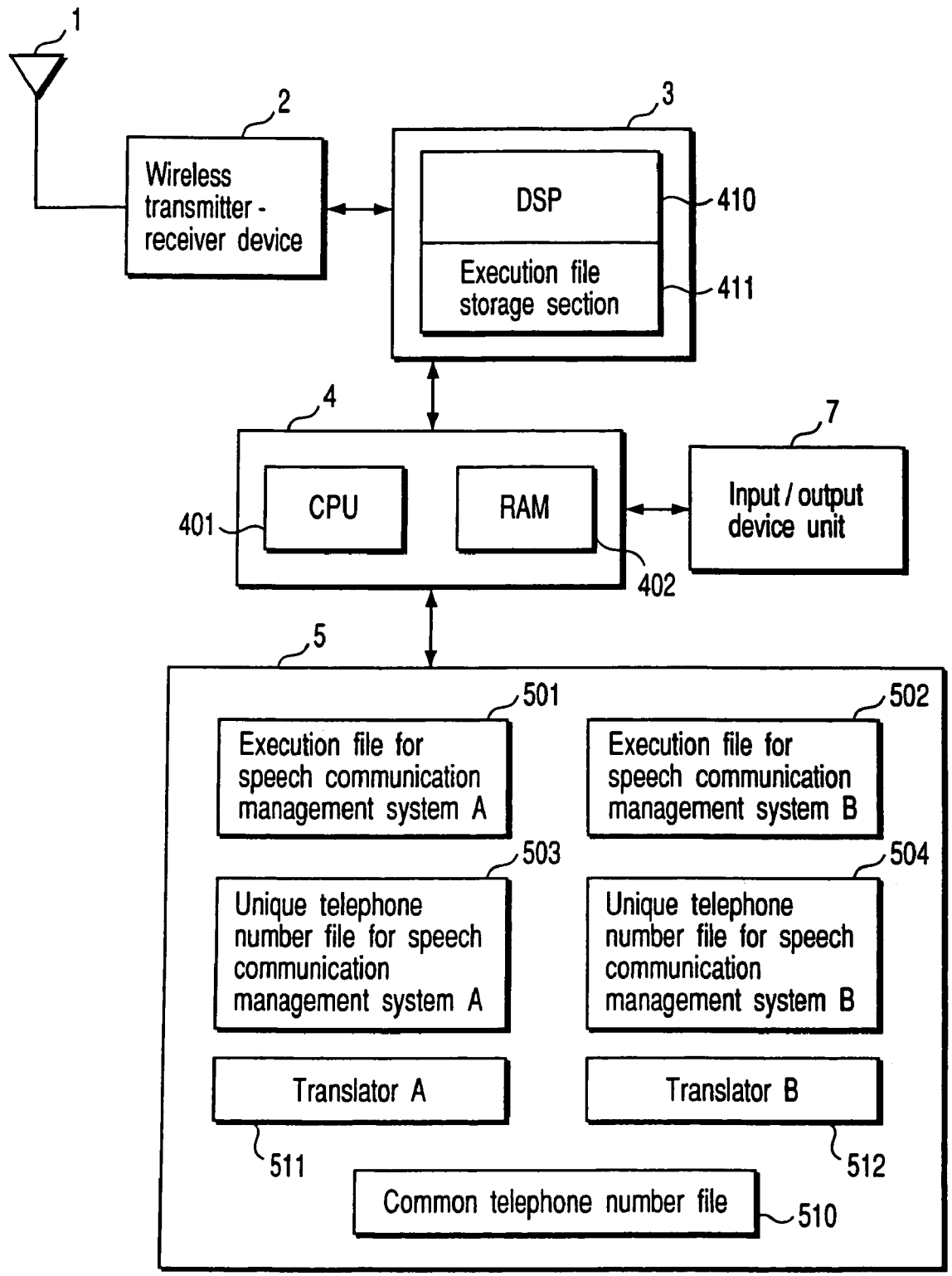
F I G. 51

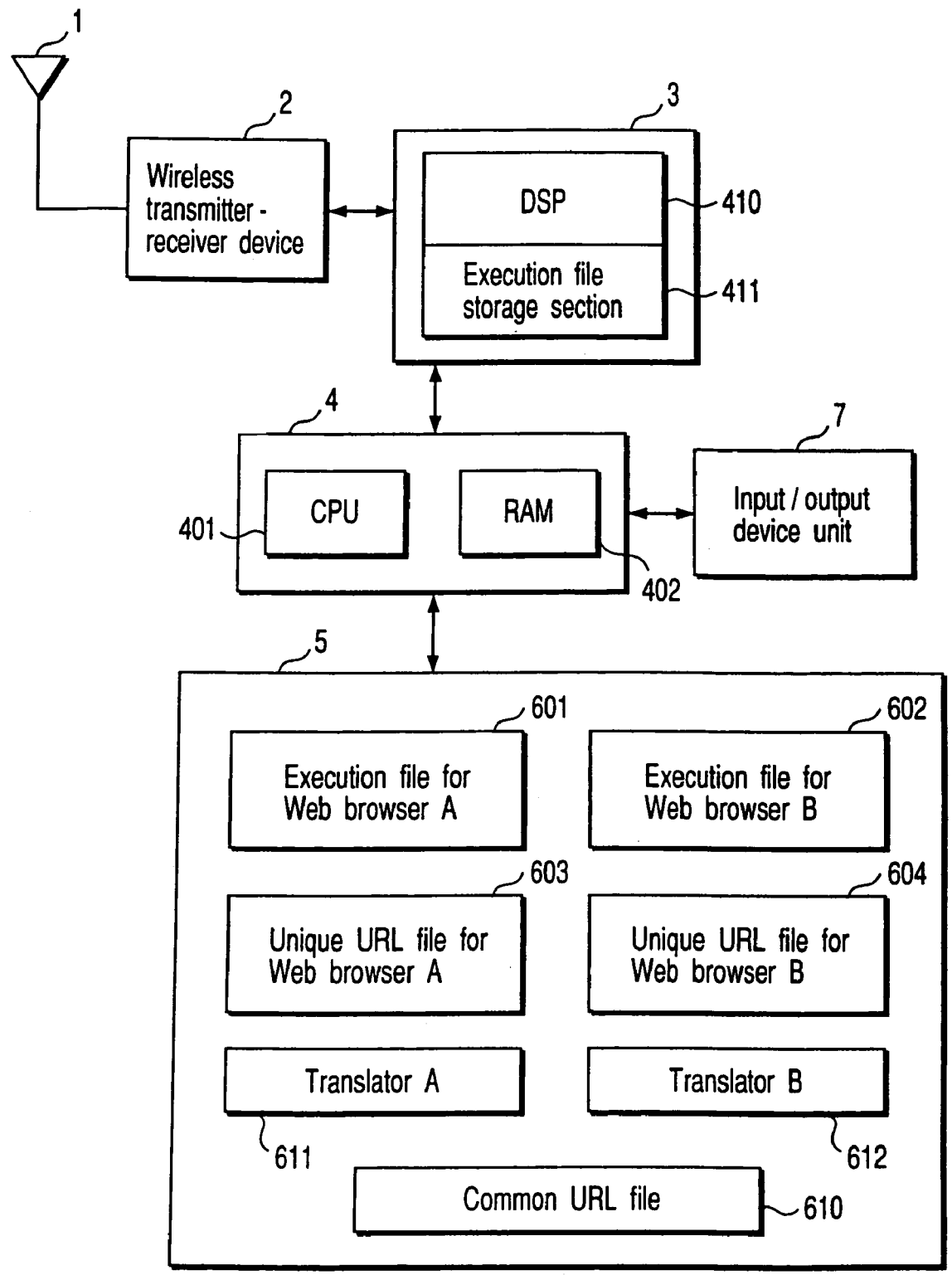
F I G. 53

METHOD FOR CONNECTING A MOBILE RADIO COMMUNICATION APPARATUS TO A PLURALITY OF RADIO COMMUNICATION SYSTEMS

CROSS-REFERENCE TO RELATED APPLICATIONS

This application is a divisional of and claims priority under 35 U.S.C. §120 to U.S. application Ser. No. 10/053, 544, filed Jan. 24, 2002 now U.S. Pat. No. 7,092,733, and is based upon and claims the benefit of priority from the prior Japanese Patent Applications No. 2001-017071, filed Jan. 25, 2001, No. 2001-022161, filed Jan. 30, 2001, No. 2001-045313, filed Feb. 21, 2001, No. 2001-046736, filed Feb. 22, 2001, and No. 2001-048496, filed Feb. 23, 2001, the entire contents of all of which are incorporated herein by reference.

BACKGROUND OF THE INVENTION

1. Field of the Invention

The present invention relates to a mobile radio communication apparatus capable to a plurality of radio communication systems.

2. Description of the Related Art

Currently, along with the tremendous popularization of radio communication systems, a plurality of radio communication systems with different standards are being in use. Generally, mobile radio communication apparatuses are prepared for the respective mobile radio communication systems. Recent mobile radio communication apparatuses are required to be able to cope with not only conventional speech communications but also various application services such as e-mail, data communication, and Web (world wide web) browsing. Hence, a strong demand has arisen for a so-called single multimode terminal apparatus which can cope with a plurality of radio communication systems and various application services.

As a technique for implementing a multimode terminal apparatus, a SDR (Software Defined Radio) has been proposed. The SDR realizes at least some of signal processing operations necessary for transmission/reception by software processing using a programmable device such as a DSP (Digital Signal Processor). A SDR unit can cope with various radio communication systems or various application services by exchanging software. For example, speech communication can be shifted to data communication. Alternatively, a radio communication system can be handed off from the W-CDMA scheme to the cdma 2000 scheme. The basic idea of such the SDR is presented by, e.g., Jpn. Pat. Appln. KOKAI Publication No. 9-331579. However, how to implement the apparatus in consideration of various situations is not sufficiently disclosed in this prior art.

For example, for a radio communication system, the digital information transmission rate is being increased. Accordingly, the standard is also frequently changed. Every time the standard is changed, the SDR unit must be designed and developed. A section that handles a baseband signal in the SDR unit, i.e., a so-called modem section processes a large amount of data. In addition, required specifications including a processing delay are strict. For these reasons, the design of a modem section is changed every time the standard of a radio communication system is changed. The above-described programmable device can flexibly cope with such a change in design by changing software. However, a programmable device such as a DSP may be unable to sufficiently cope with high-speed processing of a broadband radio communication signal.

The SDR unit occupies many resources of a terminal apparatus to cope with various radio communication systems and application services by switching software. To cope with a new radio communication system or to add an application service function, a free resource must be prepared. A resource management that optimally distributes one resource to a radio communication system or communication service is also required. Especially, a mobile radio communication apparatus for mobile communication is required to be compact and to save power consumption. Since the resource amount is restricted, resource management is important. A resource means a processor such as a CPU or DSP, hardware such as a memory or a RAM (Random Access Memory), the processing capability of a processor, or the like.

With a general design concept of a mobile radio communication apparatus, resources are permanently assigned to a plurality of signal processing operations. When this concept is applied to the SDR unit, the resource utilization efficiency greatly decreases because the wireless unit must cope with a plurality of radio communication systems or a plurality of application services. Resource management for a computer is mainly specialized to memory areas. Resource management based on a hardware space or resource management according to a wireless quality is not taken into consideration.

In the SDR unit, a software module is downloaded through a communication channel and stored in a storage device, as described in, e.g., Jpn. Pat. Appln. KOKAI Publication No. 9-331579. When software module download is repeated to make the SDR unit to cope with a new communication service, the amount of modules stored in the storage device increases. The capacity of the storage device in the SDR unit is finite. Practically, at the time of download, unnecessary modules must be deleted from already stored modules. To cope with a new version of a module, updating a module stored in the storage device must also taken into consideration. In deleting updating a module, it is inefficient to refer to the name or version of each module in the storage device to determine a module to be deleted or updated. A mechanism which efficiently manages modules is demanded to be implemented.

In various applications described above, which can be processed by the SDR unit, generally, a list of Web pages to be browsed by the user of the SDR unit or a list of telephone numbers and e-mail addresses of specific communication partners of the user is displayed on a menu. However, in the SDR unit capable of coping with a plurality of radio communication systems, generally, when an adapted radio communication system is changed, such list files cannot be used. Each radio communication system provides unique application services established by a communication service company that operates the system. This system also provides a browser and mail system having unique specifications.

The specifications of application services change depending on the radio communication system. Hence, a list file of Web pages or telephone numbers and mail addresses must be prepared for each radio communication system. This is because an application service unique to a radio communication system uses a file format unique to the application service. For this reason, in the SDR unit, a list file of Web pages or telephone numbers and mail addresses described in a file format corresponding to a certain radio communication system cannot be used for another radio communication system. When the radio communication system to be used is changed, the user of the SDR unit must newly create a list file for an application service of the radio communication system. In addition, the user must independently manage list files for a plurality of potential radio communication systems.

BRIEF SUMMARY OF THE INVENTION

It is an object of the present invention to provide a mobile radio communication apparatus which properly and efficiently manages the resource of a signal processing device.

According to an aspect of the present invention, there is provided a mobile radio communication apparatus comprises a wireless transmitter-receiver device configured to perform transmission/reception of a radio signal; a signal processing device including a resource to which functions are defined, wherein the resource handles at least a modem function and a protocol function, and configured to perform a signal processing necessary in the transmission/reception by use of the resource; and a controller that controls the signal processing device to redefine, to the resource, another modem function and another protocol function corresponding to respective one of the mobile communication systems.

BRIEF DESCRIPTION OF THE SEVERAL VIEWS OF THE DRAWING

FIG. 10 is a block diagram showing further details of the structure of the signal processing device shown in FIG. 9;

FIG. 21 is a block diagram illustrating a layer structure in a conventional base station;

FIG. 22 is a block diagram illustrating a layer structure in a base station according to the fifth embodiment;

FIG. 23 is a diagram illustrating an example of the structure of a table referred to by the base station to grasp the resource of the terminal;

FIG. 24 is a diagram illustrating an example of the resource list used by the TRC shown in FIG. 22;

FIG. 25 is a block diagram illustrating the base station and the layer structure of the terminal according to the fifth embodiment;

FIG. 26 is a diagram illustrating an example of the messages sent by the TRC to RRC to grasp the resource of the terminal in FIG. 22;

FIG. 27 is a diagram illustrating an example of the resource use station table sent from the terminal MT to the base station BS in FIG. 25;

FIG. 34 is a flowchart illustrating the rewrite procedure of the module in the resource of the signal processing device shown in FIG. 29, in correspondence with the illustration made in FIG. 33;

FIG. 36 is a flowchart illustrating an example of the operation of the mobile radio communication apparatus according to the seventh embodiment;

FIG. 41A is a diagram showing an example of the list of items described in the module administration table shown in FIG. 40B;

FIGS. 41B and 41C are diagrams respectively showing examples of contents of the module use log table before and after the renewal of each item presented in FIG. 41A;

FIG. 43A is a diagram showing another example of the list of items described in the module administration table shown in FIG. 40B;

FIGS. 43B and 43C are diagrams respectively showing examples of contents of the module use log table before and after the renewal of each item presented in FIG. 43A;

FIG. 45A is a diagram showing another example of the list of items described in the module use log table shown in FIG. 40B;

FIGS. 45B and 45C are diagrams respectively showing examples of contents of the module use log table before and after the renewal of each item presented in FIG. 43A;

FIG. 50A is a diagram showing another example of the list of items described in the module use log table shown in FIG. 40B;

FIG. 50B is a diagram showing an example of contents of the module use log table for each items presented in FIG. 47A;

FIG. 50C is a diagram showing an example of display information of the module use log table presented in FIG. 50B;

FIG. 51 is a block diagram showing an example of the structure of a mobile radio communication apparatus according to the eleventh embodiment of the present invention;

FIG. 53 is a block diagram showing an example of the structure of a mobile radio communication apparatus according to the twelfth embodiment of the present invention;

DETAILED DESCRIPTION OF THE INVENTION (First Embodiment)

Figure 1A:
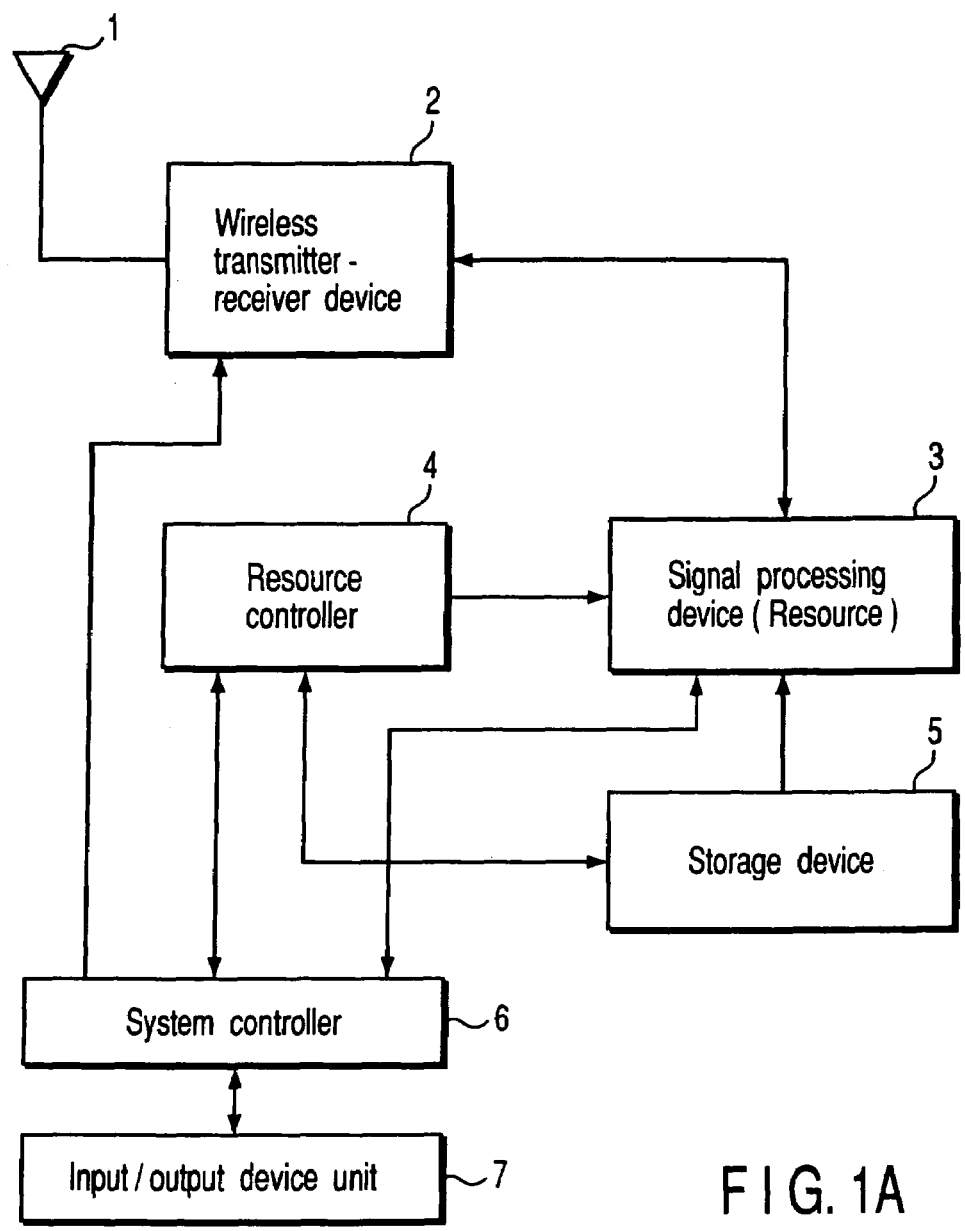
FIG. 1A is a block diagram showing the structure of a mobile radio communication apparatus according to the first embodiment of the present invention.

Referring to FIG. 1A, a mobile radio communication apparatus according to this embodiment receives an RF (Radio Frequency) signal from a base station (not shown) through an antenna 1 and transmits the RF signal to the base station through the antenna 1. A reception signal from the antenna 1 is converted into a digital reception IF (Intermediate Frequency) signal by a wireless transmitter-receiver device 2 and supplied to a signal processing device 3. A digital transmission IF signal generated by the signal processing device 3 is converted into a transmission RF signal by the wireless transmitter-receiver device 2 and supplied to the antenna 1.

Figure 1B:
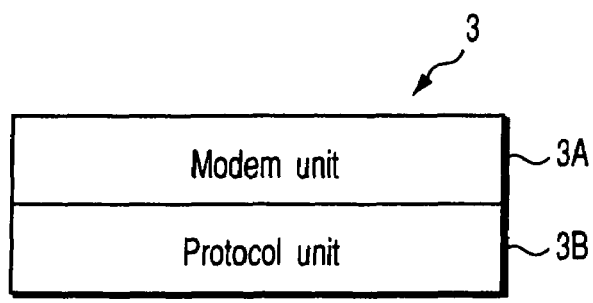
FIG. 1B is a schematic diagram illustrating the functions of the signal processing device shown in FIG. 1A.

The signal processing device 3 includes hardware resources such as a processor, memory, and logic circuit, which are formed into an LSI (Large-Scale Integrated) circuit, and mainly executes processing of a modem unit 3A and protocol unit 3B necessary for transmission/reception, as shown in FIG. 1B. Processing in the modem unit 3A (also called a baseband unit) is signal processing in a region (baseband region) close to the wireless transmitter-receiver device 2. A specification of the modem unit 3A and protocol 3B is defined, for example, by TS25 series of $3^{rd}$ Generation Partnership Project (3GGP™) as for W-CDMA (Wideband code-division multiple access) system and by TS05 series of 3GGP™ as for GSM (Global system for mobile communication).

More specifically, processing in the modem unit 3A includes processing of demodulating a sampled digital IF (Intermediate Frequency) signal output from the wireless transmitter-receiver device 2 to generate a reception baseband signal and processing of modulating transmission data to generate a transmission baseband signal. Processing in the protocol unit 3B (also called an L2/L3 protocol unit) is protocol processing determined in accordance with a radio communication system in which the mobile radio communication apparatus is used.

The resource of the signal processing device 3 is controlled by a resource controller 4. This control makes it possible to immediately cope with a change in function or specifications of the mobile radio communication apparatus along with a change in use condition whereby hand-over control corresponding to movement between different radio communication systems can easily be realized. More specifically, when the resource controller 4 executes software change control or logic circuit arranging method change control, or both the control operations for the resource of the signal processing device 3, the function of the mobile radio communication apparatus is changed to a desired function. As described above, when the resource controller 4 adaptively controls the resource of the signal processing device 3, the resource in a restricted amount can be effectively used.

Of the resource of the signal processing device 3, a region for which software processing suffices is realized by a general-purpose processor and memory. A region for which a high processing speed is required is realized by a hardware circuit such as a DSP (Digital Signal Processor) or PLD (Programmable Logic Device). A DSP executes desired signal processing in accordance with a program read out from a storage device 5 under the control of the resource controller 4. A PLD executes desired processing by describing a circuit arrangement in accordance with a program read out from the storage device 5 under the control of the resource controller 4.

The storage device 5 holds software (a program and modules as components of the program) used by the signal processing device 3, processing data such as reception data or transmission data, and databases such as a telephone directory and address book. The storage device 5 reads/writes a necessary program or data under the control of the resource controller 4 or a system controller 6 which controls the entire structure in the mobile radio communication apparatus. A program read out from the storage device 5 is described in the signal processing device 3. As the storage device 5, a compact hard disk drive device or a semiconductor memory such as an FRAM (Ferroelectric Random Access Memory) is used.

An input/output unit 7 connected to the system controller 6 includes various input/output devices which interface to the user of the mobile radio communication apparatus, such as a microphone for speech input, a speaker for speech output, a keyboard, and a display. The keyboard is used for dial key/function key operation, text input, and editing operation. On the display, incoming call information, contents, menus, and the like are displayed. The input/output unit 7 also has an MPEG interface for moving image compression/expansion processing and a USB interface for serial input/output to/from an external device. These components of the input/output unit 7 are connected by an internal bus. The internal bus is connected to the system controller 6.

Figure 2:
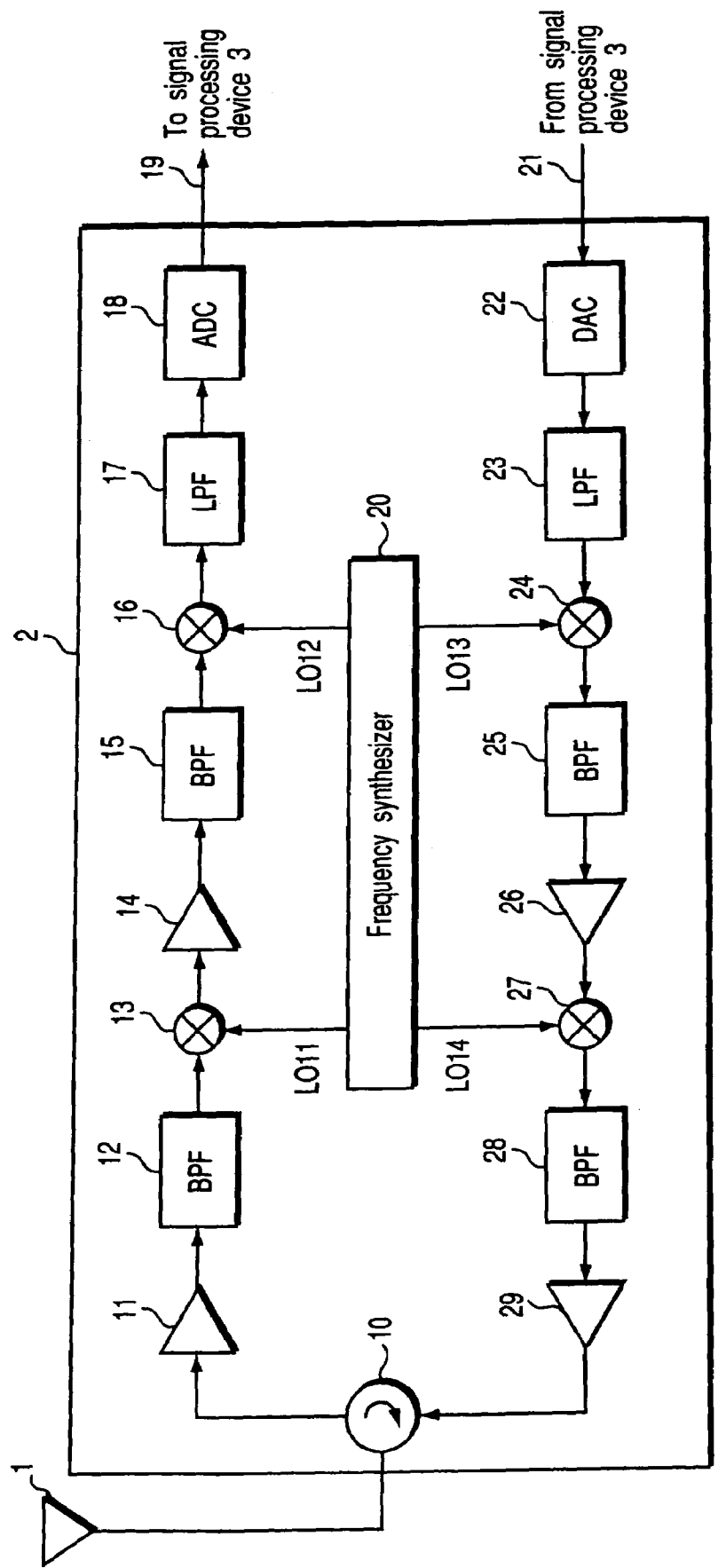
FIG. 2 is a block diagram showing an example of the structure of the wireless transmitter-receiver device shown in FIG. 1A.

FIG. 2 shows a detailed arrangement of the wireless transmitter-receiver device 2 shown in FIG. 1. The reception system will be described. An RF reception signal from the antenna 1 is guided to a low-noise amplifier 11 by a transmission/reception changeover switch (or duplexer) 10. The RF signal amplified to a predetermined level by the LNA 11 is input to a mixer 13 through a BPF (bandpass filter) 12, mixed with a first local signal LO11 for reception from a frequency synthesizer 20, and thus down-converted. The output signal from the mixer 13 is input to a mixer 16 through an IF amplifier 14 and bandpass filter 15, mixed with a second local signal LO12 for reception from the synthesizer 20, and thus down-converted to a predetermined intermediate frequency. The output signal from the mixer 16 is input to an A/D converter 18 through a low-pass filter 17 and converted into a digital IF signal 19. The IF signal 19 is input to the signal processing device 3.

In the transmission system, a digital IF signal output from the signal processing device 3 is converted into an analog signal by a D/A converter 22. The signal is input to a mixer 24 through a low-pass filter 23, mixed with a first local signal LO21 for transmission from the synthesizer 20, and thus up-converted. The output signal from the mixer 24 is input to a mixer 27 through a bandpass filter 25 and IF amplifier 26, mixed with a second local signal LO22 for transmission from the synthesizer 20, and thus up-converted to a predetermined RF frequency. The RF output signal from the mixer 27 is amplified by a power amplifier 29 through a bandpass filter 28. Then, the signal is guided to the antenna 1 through the switch 10 and radiated from the antenna 1 as a radio wave.

Figure 3A:
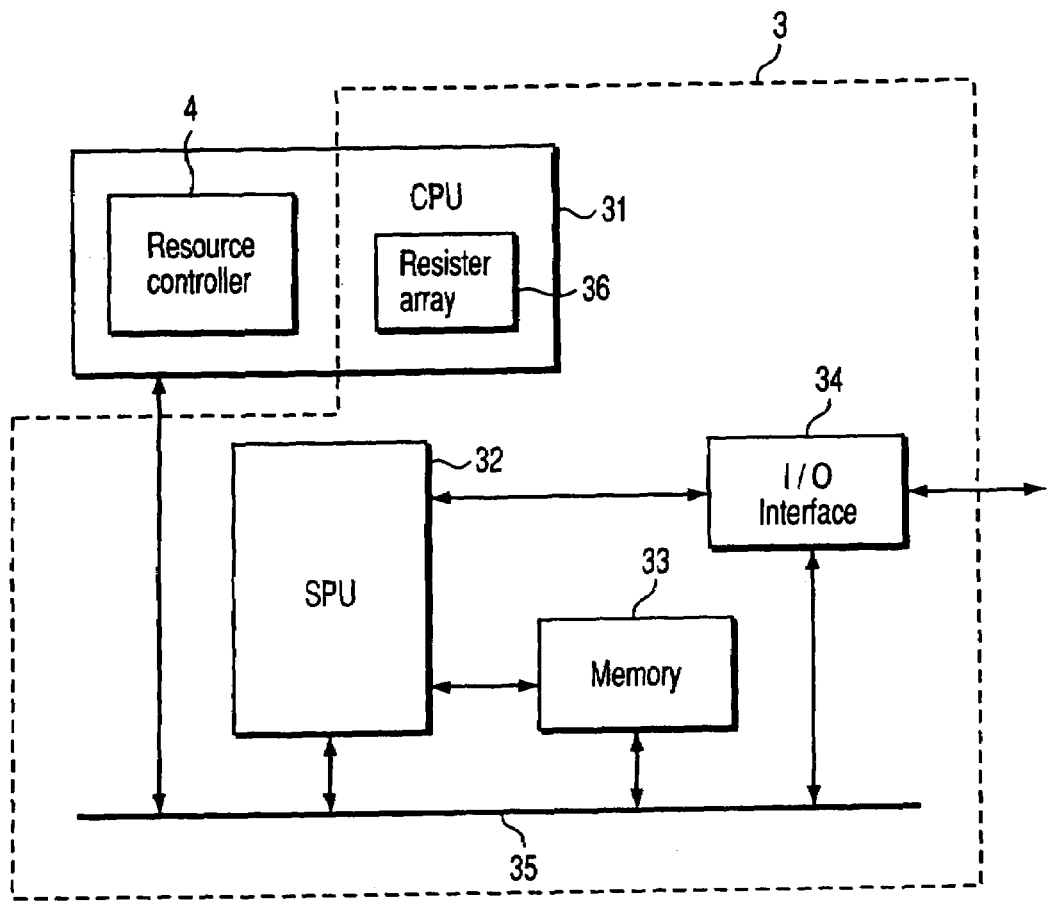
FIG. 3A is a block diagram showing an example of the structure of each of the signal processing device and resource controller shown in FIG. 1A.

The signal processing device 3 shown in FIG. 1 includes a general-purpose processor (CPU) 31, signal processing unit (SPU) 32, memory 33, and input/output interface 34, as shown in, e.g., FIG. 3A. The CPU 31 executes processing in accordance with a program given in advance, or transmits a predetermined instruction and data to the SPU 32 to cause it to execute advanced signal processing. Conversely, the CPU 31 can change processing contents in accordance with an instruction or trigger from the SPU 32. When the resource controller 4 installs programs in the CPU 31 and SPU 32, the signal processing functions of the CPU 31 and SPU 32 are defined. Furthermore, processing operations to be distributed to the CPU 31 and SPU 32 are determined by the resource controller 4. Referring to FIG. 3A, the resource controller 4 is implemented by the program that runs on the CPU 31. However, the resource controller 4 may be implemented by a sequencer on a DSP or logic circuit.

The SPU 32 is a programmable dedicated processor specialized to signal processing. More specifically, at least one of a DSP and PLD is used. The SPU 32 executes signal processing using the memory 33 as a work memory. The SPU 32 receives a signal to be processed or outputs a processed signal from or to the wireless transmitter-receiver device 2 and system controller 6 through the external interface 34. Detailed examples of contents of processing executed by the SPU 32 are "correlation operation", "complex operation", "maximum value detection", "memory address conversion", "sequencer", "high-speed input/output processing", "cumulative addition", and "function operation".

A case wherein a wireless signal processing apparatus according to this embodiment is applied to a CDMA (Code-Division Multiple Access) system will be described in detail. A resource (despread circuit resource) formed from, e.g., a plurality of logic circuits to execute despread processing in the CDMA system for the SPU 32 or for both the SPU 32 and CPU 31 in the signal processing device 3 is prepared. The resource is controlled by the resource controller 4. The CDMA system requires a function of a RAKE receiver which operates at a finger timing corresponding to multipath transmission and a function of periodically searching for a finger timing. Finger timing search is performed in consideration of a mobile communication environment where the multipath timing varies. These functions are realized by a despread circuit including a correlation circuit. Conventionally, separate despread circuits are permanently assigned to the functions, respectively.

According to this embodiment, with resource management by the resource controller 4, the despread circuit resource used for RAKE reception can easily be used for search processing at a predetermined period or as needed in accordance with the communication quality or the like. In this way, high-quality communication is ensured using a smaller circuit scale. In the CDMA receiver which receives a plurality of code channels, the despread circuit resource is assigned to each channel by resource management by the resource controller 4 in accordance with connection/disconnection of a code channel. Thus, RAKE reception of a plurality of channels can be realized using a finite despread circuit resource, and the circuit scale can be made small.

Figure 3B:
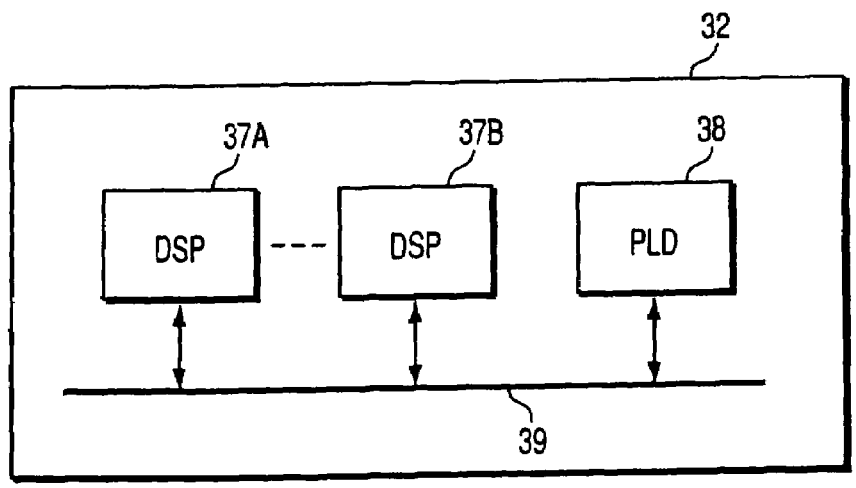
FIG. 3B is a block diagram showing an example of the structure of the SPU (signal processing unit) shown in FIG. 3A.

As shown in FIG. 3B, the SPU 32 includes, e.g., a plurality of DSPs 37A and 37B and a PLD 38. These components are connected by an internal bus 39. Both the DSPs 37A and 37B and the PLD 38 can execute the processing of the despread circuit resource. In this arrangement, the processing capability or MIPS value of each of the DSPs 37A and 37B and PLD 38 corresponds to part of the resource of the signal processing device 3. In the example of the CDMA system, when it is assumed that the processing capability of one despread circuit is 10 [MIPS], a DSP having a processing capability of 100 [MIPS] can be handled as a despread resource equivalent to 10 despread circuits.

To realize the functions (e.g., RAKE reception, multipath search, neighboring cell search, and multi-channel reception) of the mobile radio communication apparatus applied to the CDMA system, the resource controller 4 assigns the total resource of the signal processing device 3 such that the resources of the DSPs 37A and 37B are assigned to all functions required at that time. For example, when a resource corresponding to 15 despread circuits in total is required, the resource controller 4 causes the PLD 38 to bear a processing capability of 100 [MIPS] equivalent to the capability of 10 despread circuits and causes the DSP 37A or 37B to bear a processing capability of 50 [MIPS] equivalent to the capability of the remaining five despread circuits.

As described above, in the mobile radio communication apparatus according to this embodiment, a function can be reconstructed with a high degree of freedom. For this reason, the cost and development period necessary for addition of a function can be reduced. The resource distribution of the signal processing device 3 is not limited to use in a single radio communication system. For example, a CDMA system and TDMA (Time-Division Multiple Access) system, a TDMA system and FDMA (Frequency-Division Multiple Access) system, or an FDMA system and CDMA system have common processing elements. The resource distribution of the signal processing device 3 can be executed in accordance with the same procedure as described above for processing that is common and does not conflict in time between such different radio communication systems.

The signal function of the modem unit 3A shown in FIG. 1B, which is included in the signal processing device 3, can be freely reconstructed. This is useful when the mobile radio communication apparatus is used while moving between the service areas of different radio communication systems. That is, the mobile radio communication apparatus can optimally select a usable radio communication system in accordance with the radio wave reception state or the degree of radio channel congestion at the movement destination and execute communication under the selected system. With this arrangement, roaming or hand-over is facilitated.

Figure 4:
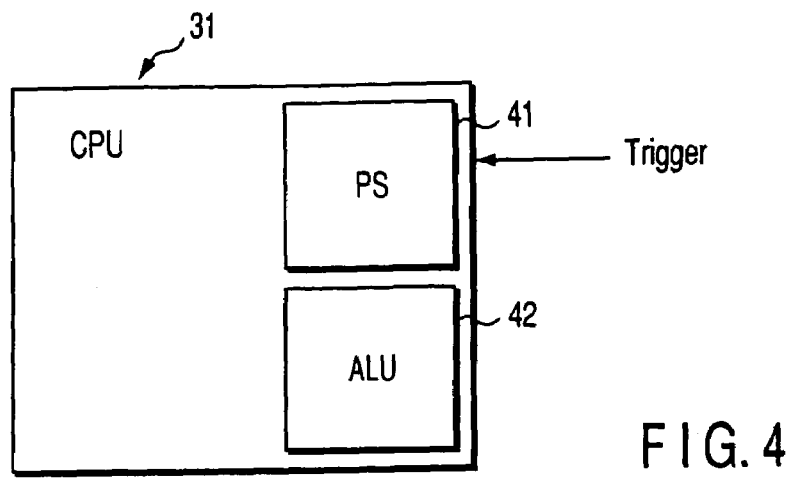
FIG. 4 is a block diagram showing an example of the structure of the CPU (central processing unit) shown in FIG. 3A.

As shown in FIG. 4, the general-purpose processor (CPU) 31 functions as a program sequencer (PS) 41 which manages program execution and an arithmetic and logic unit (ALU) 42. The signal processing unit (SPU) 32 shown in FIG. 3A executes signal processing in accordance with the start or end of self-processing or a programmed sequence and supplies a trigger signal or interrupt signal to the CPU 31. The trigger signal or interrupt signal supplied to the CPU 31 is detected by the PS 41. The CPU 31 can recognize the state of the SPU 32, e.g., "end of signal processing" and change the contents of processing of the ALU 42 on the basis of the recognition result. As described above, when the CPU 31 and SPU 32 are made to cooperate and selectively execute processing, complex arithmetic operation can be executed at a high speed.

Figure 5:
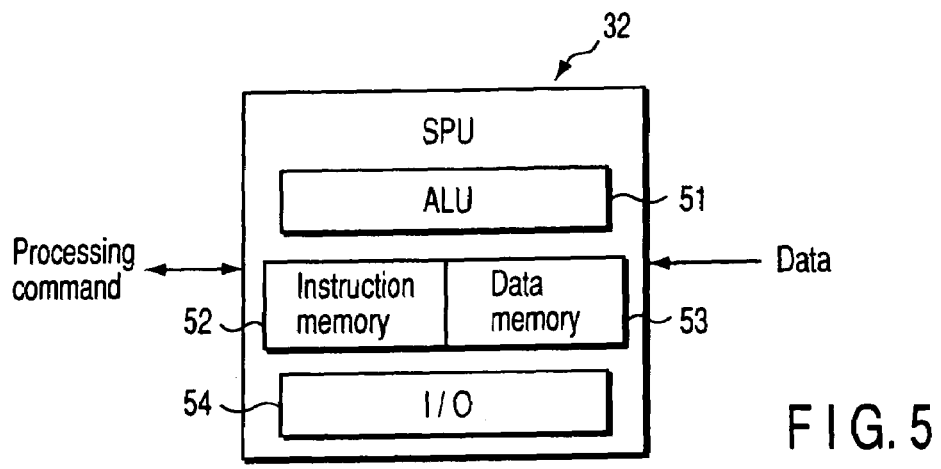
FIG. 5 is a block diagram showing another example of the structure of the SPU shown in FIG. 3A.

As shown in FIG. 5, the SPU 32 has an arithmetic and logic unit (ALU) 51, instruction memory 52, data memory 53, and input/output interface 54. The ALU 51 executes advanced signal processing such as "correlation operation", "complex operation", "array conversion", "maximum value detection", "memory address conversion", "sequencer", and "high-speed input/output" in accordance with input data from an external device, data in the memory 33, and a processing instruction or data from the CPU 31. A processing result from the ALU 51 is written in the data memory 53, a memory or register in the CPU 31, memory 33, or input/output interface 34. Advanced signal processing that is heavy for the CPU 31 is executed by the SPU 32 serving as a dedicated processor. This reduces the load on the CPU 31 and increases the processing speed.

Figure 6:
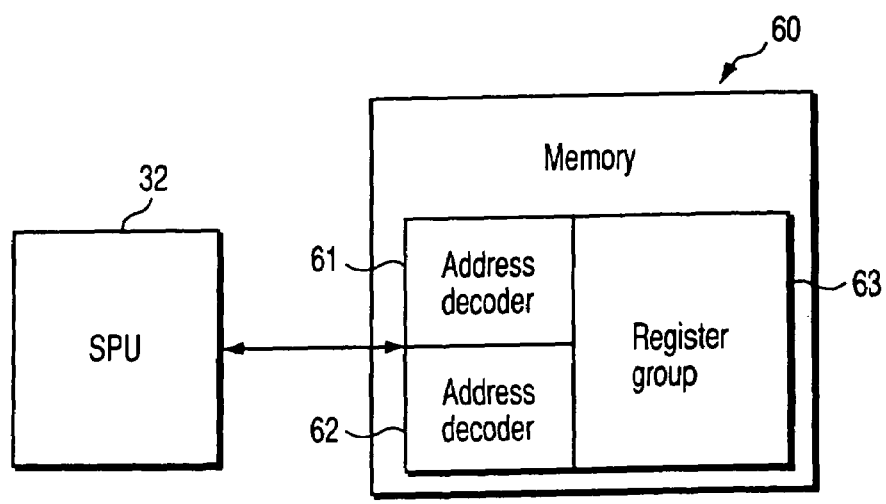
FIG. 6 is a block diagram showing an example of the structure of the address conversion circuit for the SPU shown in FIG. 3A.

FIG. 6 shows an address conversion circuit for the SPU 32. The address conversion circuit is formed from two address decoders 61 and 62 in a memory 60. Predetermined conversion patterns are written in the address decoders 61 and 62, respectively. One of the address decoders 61 and 62 is selected in accordance with an instruction from the SPU 32, and the decoding contents are switched. A register group 63 in the memory 60 comprises memory cells in the memory such as a RAM (Random Access Memory). The decoding contents of a write address decoder prepared in a normal RAM and those of a read address decoder are identical. Hence, to realize, by a normal RAM, bit array conversion processing such as bit interleaving included in processing by the SPU 32, an address must be calculated for every read.

According to FIG. 6, when the address decoders 61 and 62 are used as a write address decoder and read address decoder, respectively, such address calculation can be omitted. For this reason, conversion processing such as interleaving whose processing amount is enormous can be executed at a high speed. The address decoders 61 and 62 may be formed from devices such as rewritable RAMs, and an address conversion table may be written in each device. Since this arrangement can cope with a plurality of conversion patterns, flexible processing coping with various patterns can be realized by a simple arrangement.

As shown in FIG. 3A, data transmission/reception between the CPU 31 and the SPU 32 can also be directly executed through a register array 36 in the CPU 31. The register array 36 is directly accessed from the SPU 32. That is, the SPU 32 can directly write a self-data output in the register array 36 or directly read out data from the register array 36. The CPU 31 can receive contents of the register array 36 or write data in the register array 36. When the register array 36 is used for data transmission/reception between the CPU 31 and the SPU 32, the CPU 31 only need to access the register array 36 independently of the operation state of the SPU 32 in transmitting/receiving data. Hence, data transfer processing in the CPU 31 can be executed at a high speed, and processing of the signal processing device 3 can be executed at a high speed.

Operation performed when the signal processing device 3 shown in FIG. 3 receives, by the input/output interface 34, a digitized reception IF signal from the wireless transmitter-receiver device 2 and processes the signal will be described. When a reception signal is to be processed by only the CPU, most of the arithmetic capability of the CPU is consumed by only the input/output processing. Only the remaining capability of the CPU can be assigned to other processing. According to the signal processing device 3 shown in FIG. 3A, when input/output processing is executed by the SPU 32 without using the CPU 31, the processing capability of the CPU 31 can be assigned to processing other than the input/output processing.

The reception IF signal received by the input/output interface 34 is sequentially received by the SPU 32. If fixed processing is necessary, the SPU 32 executes predetermined signal processing. The processing result from the SPU 32 is written in the register array 36. The CPU 31 executes necessary processing using data written in the memory 33 or register array 36. As described above, when input/output processing and signal processing are assigned to the SPU 32, the load on the CPU 31 can be reduced. In other words, the processing load on the signal processing device 3 is distributed to the CPU 31 and SPU 32, thereby realizing high-speed signal processing in the entire signal processing device 3. To further distribute the load, a plurality of CPUs may be prepared, and processing to be executed by the CPU 31 shown in FIG. 3A may be distributed to the CPUs.

Other embodiments of the present invention will be described below. In the following embodiments, the basic arrangement of a mobile radio communication apparatus is the same as in the first embodiment. Variations of components or operation form of the mobile radio communication apparatus will be disclosed.

(Second Embodiment)

Figure 7:
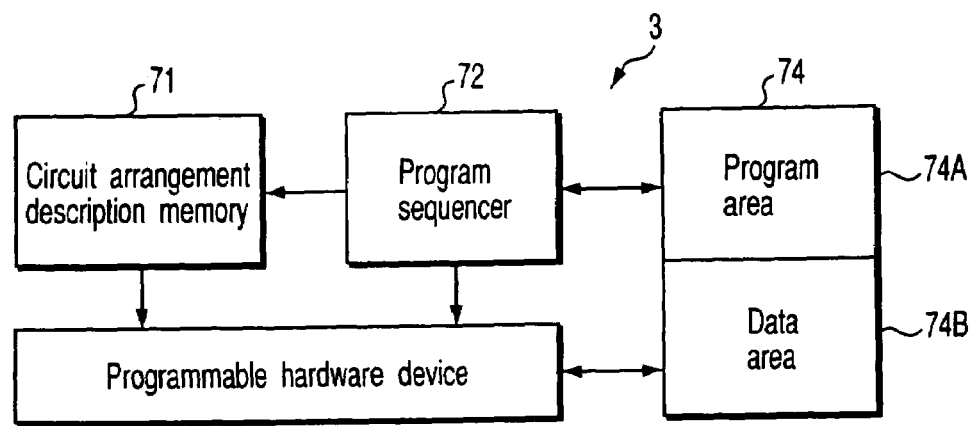
FIG. 7 is a block diagram showing an example of the structure of the signal processing unit of a mobile radio communication apparatus according to the second embodiment of the present invention.

A signal processing device 3 shown in FIG. 7 has a circuit arrangement description memory 71, program sequencer 72, programmable hardware device 73, and memory 74. The programmable hardware device 73 is hardware capable of redefining a circuit arrangement such as a PLD or FPGA (Field Programmable Gate Array). The programmable hardware device 73 is a set of various logic circuits which perform basic arithmetic operation of signal processing. The programmable hardware device 73 may be a device which can programmably change the combination of various logic circuits by a switch to realize a predetermined processing function.

In a general processor such as a CPU or DSP, the circuit arrangement of an internal ALU portion is fixed. To realize processing contents by an instruction set given to a processor, a dedicated circuit corresponding to each instruction set is formed as an ALU. In this embodiment, however, processing that is normally executed by an ALU is realized by the programmable hardware device 73 capable of redefining the circuit arrangement.

The circuit arrangement description memory 71 stores, as programs, circuit arrangement descriptions necessary for the programmable hardware device 73 to realize desired processing. More specifically, the circuit arrangement description memory 71 stores not only circuit arrangement descriptions necessary for hardware to realize basic processing such as "four arithmetical operations", "data transfer", or "bit shift", which is included in a normal ALU, but also circuit arrangement descriptions necessary for hardware to realize processing such as "correlation arithmetic operation", "complex multiplication processing", "maximum value detection processing", or "absolute value arithmetic operation", which is executed by a normal processor in a plurality of steps, and a circuit arrangement description that indicates a combination of basic arithmetic processing operations. Every time a new signal processing function of the signal processing device 3 is added, the circuit arrangement description of the programmable hardware device 73 is changed to realize the signal processing function using the circuit arrangement description memory 71.

A number of programs used to execute such a circuit arrangement description on the memory 71 are stored in a program area 74A of the memory 74. A necessary program is read out from the block area 74A and supplied to the circuit arrangement description memory 71 under the control of the program sequencer 72. With this operation, the circuit arrangement of the programmable hardware device 73 is redefined.

According to this embodiment, processing of the signal processing device 3 is realized by the programmable hardware device 73 capable of redefining the circuit arrangement. Hence, processing, which is executed by a normal processor for executing software processing in several ten to several hundred steps, can be executed in several cycles at a high speed. In addition, the mobile radio communication apparatus can flexibly cope with definition of various signal processing functions.

(Third Embodiment)

Figure 8:
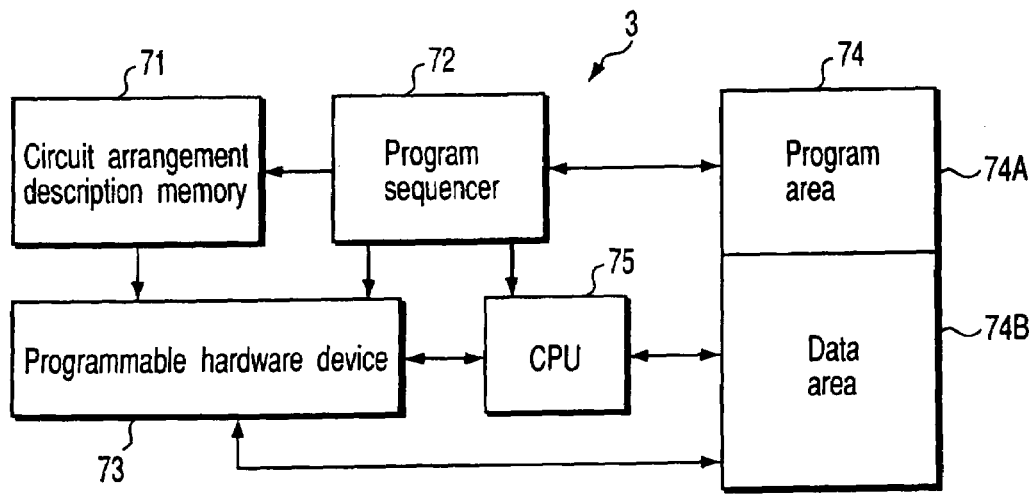
FIG. 8 is a block diagram showing an example of the structure of the signal processing unit of a mobile radio communication apparatus according to the third embodiment of the present invention.

In a signal processing device 3 shown in FIG. 8, a CPU 75 is added to the arrangement shown in FIG. 7. A circuit arrangement description memory 71, program sequencer 72, programmable hardware device 73, and memory 74 are the same as those described with reference to FIG. 7. In this case, the program sequencer 72 also has a function of selecting a device in correspondence with processing contents to cause the programmable hardware device 73 to execute predetermined complex signal processing and to cause the CPU 75 to execute normal signal processing and a function of simultaneously operating the programmable hardware device 73 and CPU 75 to execute parallel processing.

Especially, in signal processing in a modem unit 3A shown in FIG. 1B, the program sequencer 72 executes a resource management program from a resource controller 4 whereby processing operations to be distributed to the programmable hardware device 73 and CPU 75 are determined in accordance with a signal processing function that the signal processing device 3 should have. In accordance with this determination, a circuit arrangement description selected from the circuit arrangement description memory 71 is supplied to the programmable hardware device 73. Simultaneously, an execution designation about processing to be distributed to the CPU 75 is supplied from the program sequencer 72 to the CPU 75.

Under the above control by the program sequencer 72, signal processing that is complex and heavy for the CPU 75 is executed by the programmable hardware device 73 serving as a processor dedicated to signal processing. The remaining processing operations are executed by the CPU 75. Hence, high-speed processing becomes possible. In addition, the mobile radio communication apparatus can easily cope with a signal processing function to be held by the signal processing device 3 or a change in design. Furthermore, the time required for development of a new mobile radio communication apparatus can be shortened.

(Fourth Embodiment)

Figure 9:
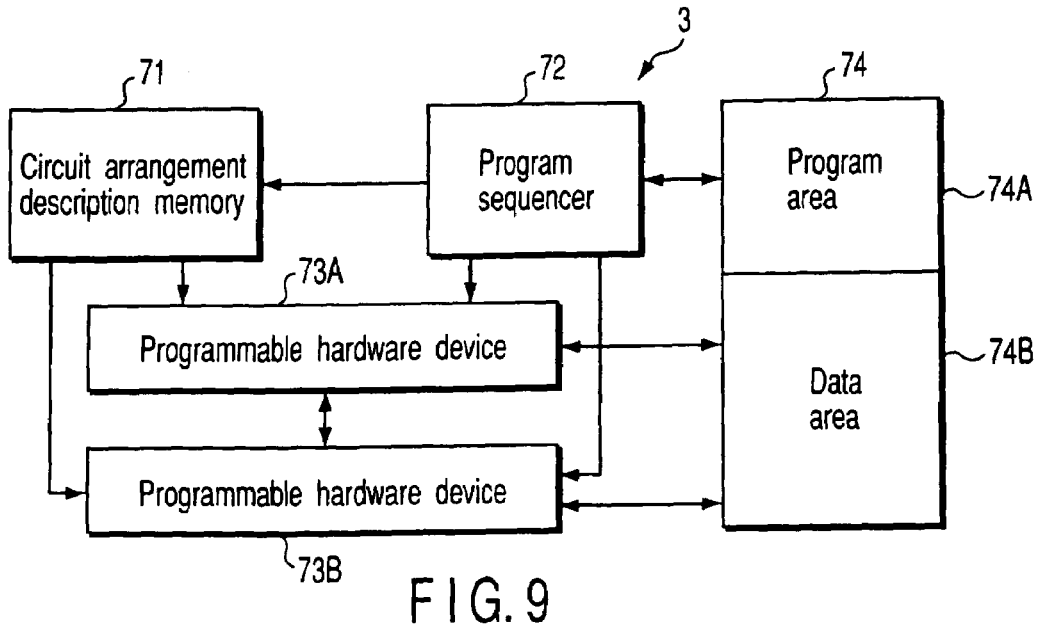
FIG. 9 is a block diagram showing an example of the structure of the signal processing unit of a mobile radio communication apparatus according to the fourth embodiment of the present invention.

A signal processing device 3 shown in FIG. 9 is different from the arrangement shown in FIG. 7 in that the device has two programmable hardware devices 73A and 73B. A program sequencer 72 has an additional function of executing control to distribute processing operations to the programmable hardware devices 73A and 73B. With this arrangement, the processing function of the signal processing device 3 can be changed with a higher degree of freedom. In addition, more complex signal processing can be executed. The arrangement of this embodiment may be extended to prepare three or more programmable hardware devices.

FIG. 10 shows details of the signal processing device 3 shown in FIG. 9. A program memory 80 and data memory 81 corresponds to program areas 74A and 74B in a memory 74. A control circuit 92 corresponds to the program sequencer 72. A circuit arrangement description memory 83 corresponds to a circuit arrangement description memory 71. An SPU 84 corresponds to a programmable hardware device 73. An instruction or data from an external device, i.e., a resource controller 4 or system controller 6 in FIG. 1A is received by the signal processing device 3 through an input register group 85, transferred to and temporarily held by a register group 86, supplied to an output register group 87, and transferred to the SPU 84.

Assume that, e.g., the following processing programs are stored in the data memory 81.

$$a = A + B \quad \text{(i)}$$

$$b = C \times D \quad \text{(ii)}$$

$$(a,b) = (A,B) * (C,D) \quad \text{(iii)}$$

These processing programs (i), (ii), and (iii) represent addition, multiplication, and complex multiplication, respectively. X and Y of (X,Y) represent the elements of the real and imaginary parts of a complex number, respectively. * represents a complex multiplication.

A circuit arrangement description to realize each arithmetic operation is recorded in the circuit arrangement description memory 83. A control circuit 82 accesses the circuit arrangement description memory 83 in accordance with the contents of the programs stored in the program memory 80, thereby rewriting the circuit arrangement description of the SPU 84 serving as a programmable hardware device. In the above-described examples of processing programs, an addition circuit, multiplication circuit, and complex multiplication circuit are formed in the SPU 84. Signal processing to be executed by the SPU 84 is not limited to addition/subtraction/multiplication. Any other processing such as correlation arithmetic operation or maximum/minimum value determination can be executed if it can be described by a circuit arrangement. As processing becomes complex, the processing efficiency is improved by changing the hardware configuration dedicated to the processing. Hence, the processing speed can be further increased.

(Fifth Embodiment)

Figure 11:
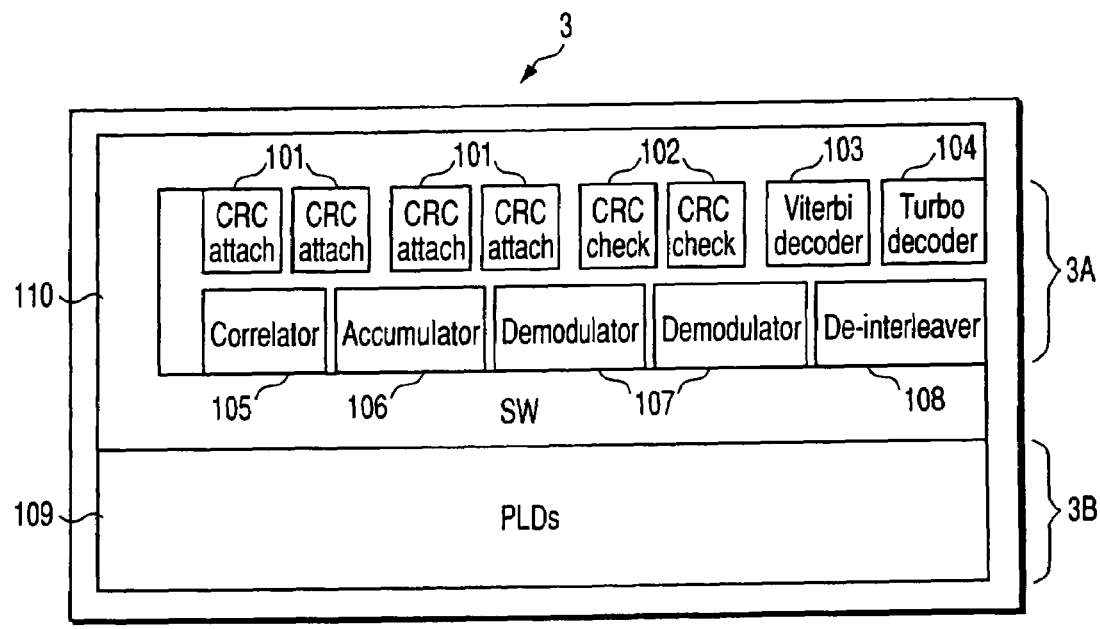
FIG. 11 is a block diagram showing an example of the structure of the signal processing unit of a mobile radio communication apparatus according to the fifth embodiment of the present invention.

As shown in FIG. 11, a signal processing device 3 according to the fifth embodiment of the present invention has, as a hardware resource, an area 3A where signal processing function redefinition is impossible, an area 3B where it is possible, and a switch unit (SW) 110. Logic circuits that are frequently used, such as CRC attach blocks 101, CRC check blocks 102, Viterbi decoder 103, turbo decoder 104, correlator 105, accumulator 106, demodulators 107, and de-interleaver 108 are mounted in the unredefinable area 3A. The redefinable area 3B is formed from a plurality of PLDs 109, i.e., components of an FPGA. The switch unit 110 switches connection between the areas 3A and 3B and connection between the respective blocks in the area 3B under the control of a resource controller 4.

Figure 12:
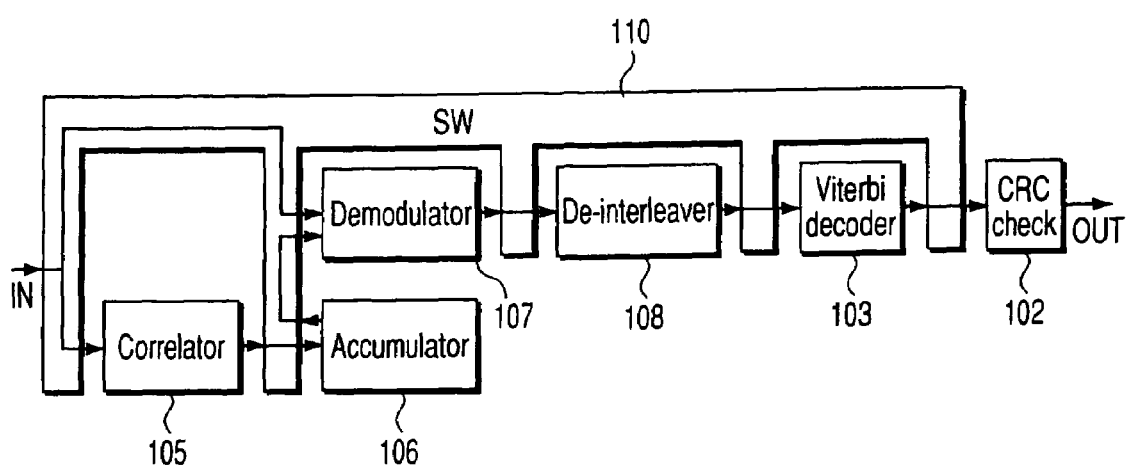
FIG. 12 is a diagram illustrating a connection state for one of the radio communication systems of the signal processing device shown in FIG. 11.
Figure 13:
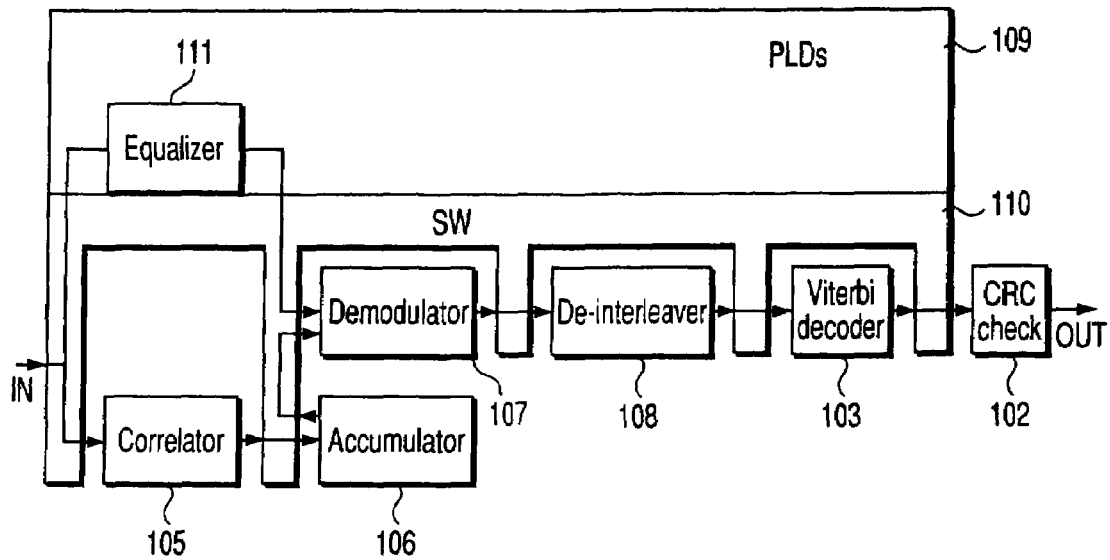
FIG. 13 is a diagram illustrating a connection state for another one of the radio communication systems of the signal processing device shown in FIG. 11.

FIGS. 12 and 13 show connection states corresponding to a single radio communication system, which are realized by switching the switch unit 110 of the signal processing device 3 shown in FIG. 11. A reception signal input to the signal processing device 3 is input to the correlator 105 and demodulator 107. The output signal from the correlator 105 is input to the accumulator 106. The output signal from the accumulator 106 is input to the demodulator 107. The output signal from the demodulator 107 becomes the output signal from the signal processing device 3 through the de-interleaver 108, Viterbi decoder 103, and CRC check block 102. In FIG. 13, an equalizer 111 whose function is assigned to the PLD 109 is added to the arrangement shown in FIG. 12. The input signal is input to the demodulator 107 through the equalizer 111.

Figure 14:
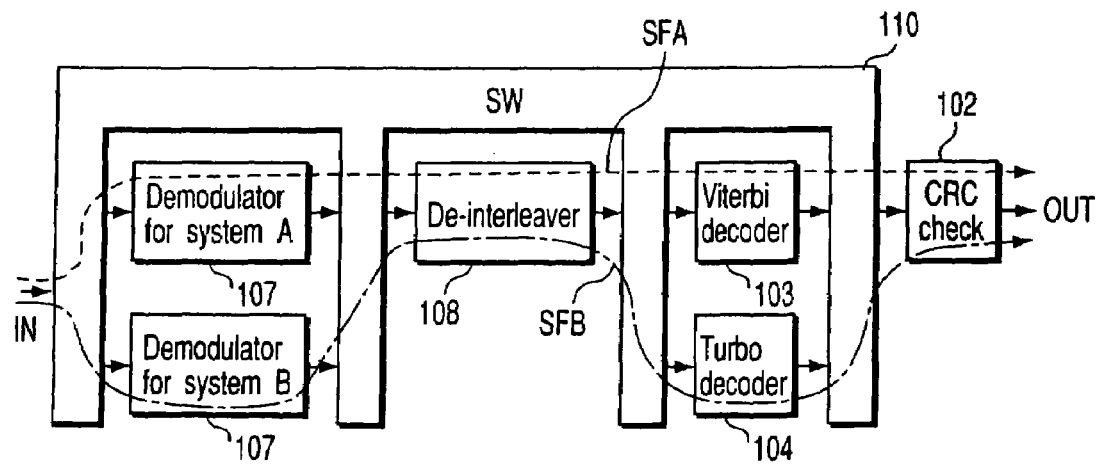
FIG. 14 is a diagram illustrating connection states for two of the radio communication systems of the signal processing device shown in FIG. 11.

FIG. 14 shows a connection example in the signal processing device 3, which can cope with two radio communication systems A and B. The demodulators 107 are shared by both the systems A and B. In either the system A or B, the output signal from the demodulator 107 is input to the de-interleaver 108. The output signal from the de-interleaver 108 is input to the Viterbi decoder 103 in the system A or to the turbo decoder 104 in the system B. The output signal from the Viterbi decoder 103 or turbo decoder 104 becomes the output signal from the signal processing device 3 through the CRC check block 102.

The resource size of the signal processing device 3 and, more particularly, the size of the areas 3A and 3B changes depending on the mobile radio communication apparatus. In a mobile radio communication apparatus having some application service functions installed, many signal processing functions are already defined in the resource of the signal processing device 3. The residual resource amount of the signal processing device 3 changes every moment in accordance with the use situation of the mobile radio communication apparatus.

Figure 15:
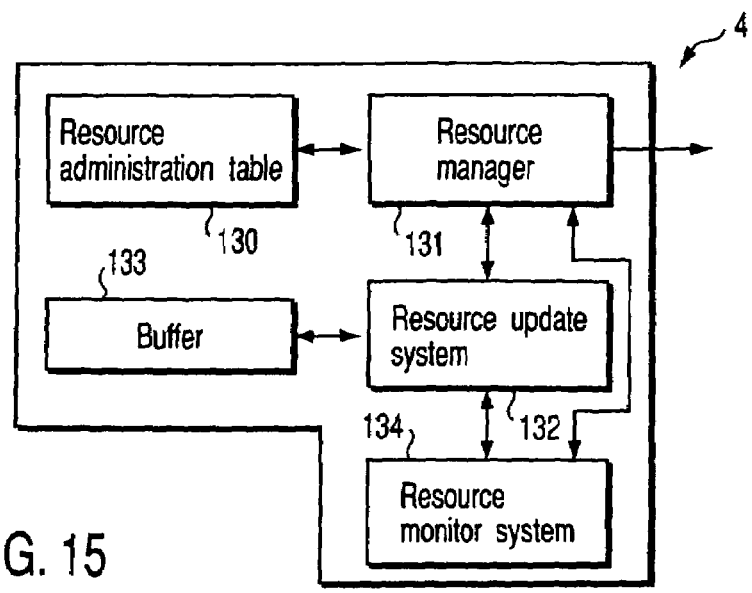
FIG. 15 is a block diagram showing an example of the structure of the resource controller of the mobile radio communication apparatus according to the fifth embodiment.

The resource controller 4 has a resource administration table 130, a resource manager 131, an update system 132 that updates the resource of the signal processing device 3, a buffer 133 that temporarily stores various data, and a resource monitor system 134 that monitors the use situation of the resource of the signal processing device 3, as shown in FIG. 15.

The resource manager 131 updates the resource administration table 130 serving as a resource use situation list on the basis of a monitor result from the resource monitor system 134. The resource manager 131 grasps the residual resource amount in the redefinable area 3B of the signal processing device 3 by looking up the resource administration table 130 or on the basis of the monitor result from the resource monitor system 134. The resource manager 131 grasps a resource amount required in the redefinable area 3B to define a new signal processing function that should be additionally defined to the resource of the signal processing device 3, on the basis of arrangement description information for realizing the function. In the resource manager 131, a new signal processing function is additionally defined in the redefinable area 3B for the resource of the signal processing device 3 using the resource update device 132 in accordance with the required resource amount and residual resource amount.

According to this embodiment, even in an environment wherein the resource of the signal processing device 3 of each mobile radio communication apparatus is different from the resource use situation, a new signal processing function can be efficiently added in accordance with the resource use situation that changes every moment. That is, optimum resource distribution can be done by adding a new signal processing function using information of the situation of resource already used by the mobile radio communication apparatus.

Figure 16:
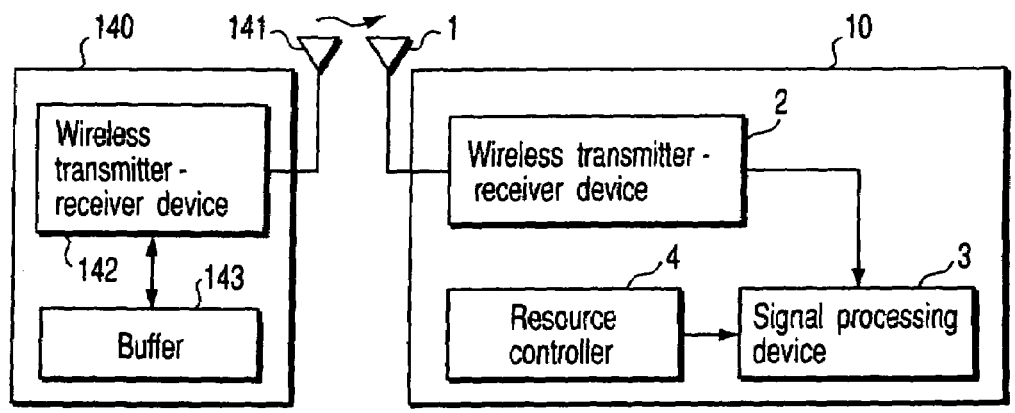
FIG. 16 is a block diagram showing an example of the structure of radio communication systems which contains the mobile radio communication apparatus according to the fifth embodiment as a terminal.

FIG. 16 shows the arrangement of a radio communication system including a mobile radio communication apparatus 10 according to this embodiment as a terminal. In this radio communication system, an arrangement description information providing apparatus 140 is present in a base station. The arrangement description information providing apparatus 140 provides to the mobile radio communication apparatus 10 information (to be referred to as arrangement description information hereinafter) that describes the arrangement of a signal processing function to be additionally defined to the resource of the signal processing device 3 in the mobile radio communication apparatus 10.

To provide arrangement description information to the mobile radio communication apparatus 10 by radio communication in this example, the arrangement description information providing apparatus 140 has an antenna 141, a wireless transmission/reception device 142, and a buffer 143 for storing arrangement description information. Communication between the mobile radio communication apparatus 10 and the arrangement description information providing apparatus 140 may be wired communication. For example, a service center which updates the function of the mobile radio communication apparatus 10 uses the arrangement description information providing apparatus 140 as an apparatus for updating the function.

The mobile radio communication apparatus 10 has an antenna 1, wireless transmitter-receiver device 2, signal processing device 3, resource controller 4, storage device 5, system controller 6, and input/output unit 7, as shown in FIG. 1A. The resource controller 4 has the resource administration table 130, resource manager 131, resource update system 132, buffer 133, and resource monitor system 134 for monitoring the use situation of the resource of the signal processing device 3, as shown in FIG. 15.

In the arrangement description information providing apparatus 140, arrangement description information corresponding to a signal processing function to be newly added to the radio communication apparatus 10 is read out from the buffer 143. The readout arrangement description information is transmitted to the mobile radio communication apparatus 10 by the wireless transmission/reception device 142. The arrangement description information transmitted to the mobile radio communication apparatus 10 is received by the wireless transmitter-receiver device 2. On the basis of the received arrangement description information, the resource controller 4 grasps the resource amount necessary for the signal processing device 3 to realize the desired signal processing function. On the basis of the resource use situation monitored by the resource monitor system 134, the resource controller 4 grasps the residual resource amount that is not used in the signal processing device 3. The resource controller 4 optimally distributes the resource to the signal processing function to be additionally defined to the resource of the signal processing device 3 in accordance with the required resource amount and residual resource amount.

Figure 17:
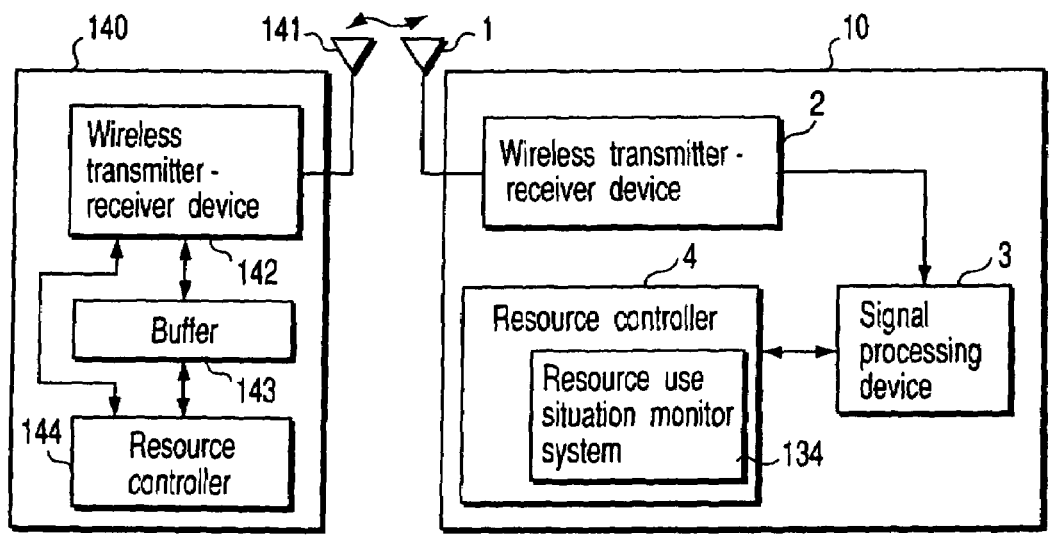
FIG. 17 is a block diagram showing another example of the structure of radio communication systems which contains the mobile radio communication apparatus according to the fifth embodiment as a terminal.

FIG. 17 shows another arrangement of the radio communication system including the mobile radio communication apparatus 10 according to this embodiment. The arrangement description information providing apparatus 140 has a resource controller 144 in addition to the antenna 141, wireless transmission/reception device 142, and buffer 143 described with reference to FIG. 16. To additionally define a new signal processing function to the resource of the signal processing device 3 in the mobile radio communication apparatus 10, information representing the use situation of the resource of the signal processing device 3, which is monitored by the resource monitor system 134, is transmitted to the arrangement description information providing apparatus 140 through the antenna 1 by the wireless transmitter-receiver device 2.

In the arrangement description information providing apparatus 140, arrangement description information representing the signal processing function to be newly additionally defined in the signal processing device 3 is read out from the buffer 143. On the basis of the arrangement description information, the resource controller 144 grasps the resource amount necessary to additionally define the new signal processing function to the resource of the signal processing device 3. In addition, on the basis of the resource use situation monitored by the resource monitor system 134, the resource controller 144 grasps the residual resource amount of the signal processing device 3. The resource controller 144 obtains, by arithmetic operation, optimum resource distribution for the signal processing function to be additionally defined to the resource of the signal processing device 3, and outputs resource distribution designation information. The resource distribution designation information is transmitted to the mobile radio communication apparatus 10 through the antenna 141 by the wireless transmission/reception device 142.

The resource distribution information transmitted to the mobile radio communication apparatus 10 is received by the wireless transmitter-receiver device 2 through the antenna 1 and transferred to the resource controller 4. The resource controller 4 optimally distributes the resource to the signal processing function to be additionally defined to the resource of the signal processing device 3 in accordance with the resource distribution information. As described above, arithmetic operation for resource distribution is executed in the arrangement description information providing apparatus 140. That is, arithmetic operation necessary to add a new signal processing function to the resource of the signal processing device 3 in the mobile radio communication apparatus 10 is executed outside the mobile radio communication apparatus 10. Since the amount of arithmetic operation executed by the resource controller 4 in the mobile radio communication apparatus 10 decreases, the mobile radio communication apparatus 10 can be made inexpensive. That is, since processing required for resource distribution of the signal processing device 3 in the terminal is assisted by the base station, the processing load on the terminal, which is required for resource distribution, can be reduced.

Figure 18:
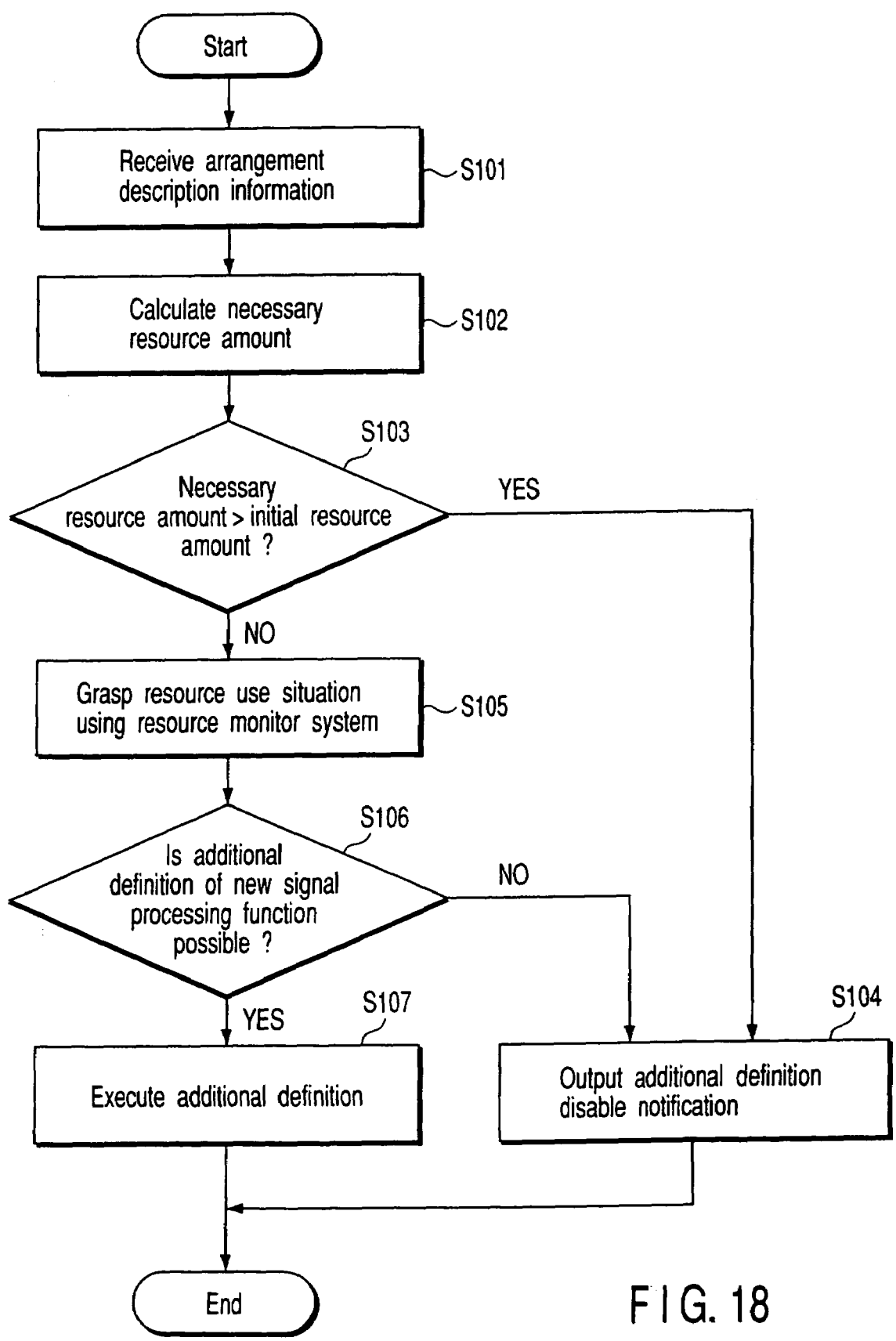
FIG. 18 is a flowchart illustrating an example of the operation of the radio communication systems shown in FIG. 17.

The operation of this embodiment will be described with reference to FIGS. 18 to 20. Referring to FIG. 18, first, the mobile radio communication apparatus 10 receives arrangement description information transmitted from the arrangement description information providing apparatus 140 (step S101). In the mobile radio communication apparatus 10, the resource controller 4 obtains the resource amount required to additionally define a signal processing function to the signal processing device 3 using the received arrangement description information (step S102). The necessary resource amount is compared with the resource amount (initial resource amount) of the signal processing device 3 at the time of delivery of the mobile radio communication apparatus 10 (step S103). If the necessary resource amount is larger than the initial resource amount, the arrangement description information providing apparatus 140 is notified that the signal processing function cannot be additionally defined (step S104).

When the necessary resource amount is smaller than the initial resource amount, the resource controller 4 grasps the current resource use situation, e.g., the residual resource amount of the signal processing device 3 by the resource monitor system 134 (step S105). The residual resource amount is compared with the necessary resource amount to determine whether a new signal processing function can be additionally defined in the signal processing device 3 (step S106). If YES in step S106, the new signal processing function is defined to the resource of the signal processing device 3 by the resource update system 132 (step S107). In step S107, resource assignment of a signal processing function already defined in the signal processing device 3 is changed as needed. If NO in step S106, the arrangement description information providing apparatus 140 is notified of it (step S140). Processing in step S103 may be omitted.

Figure 19:
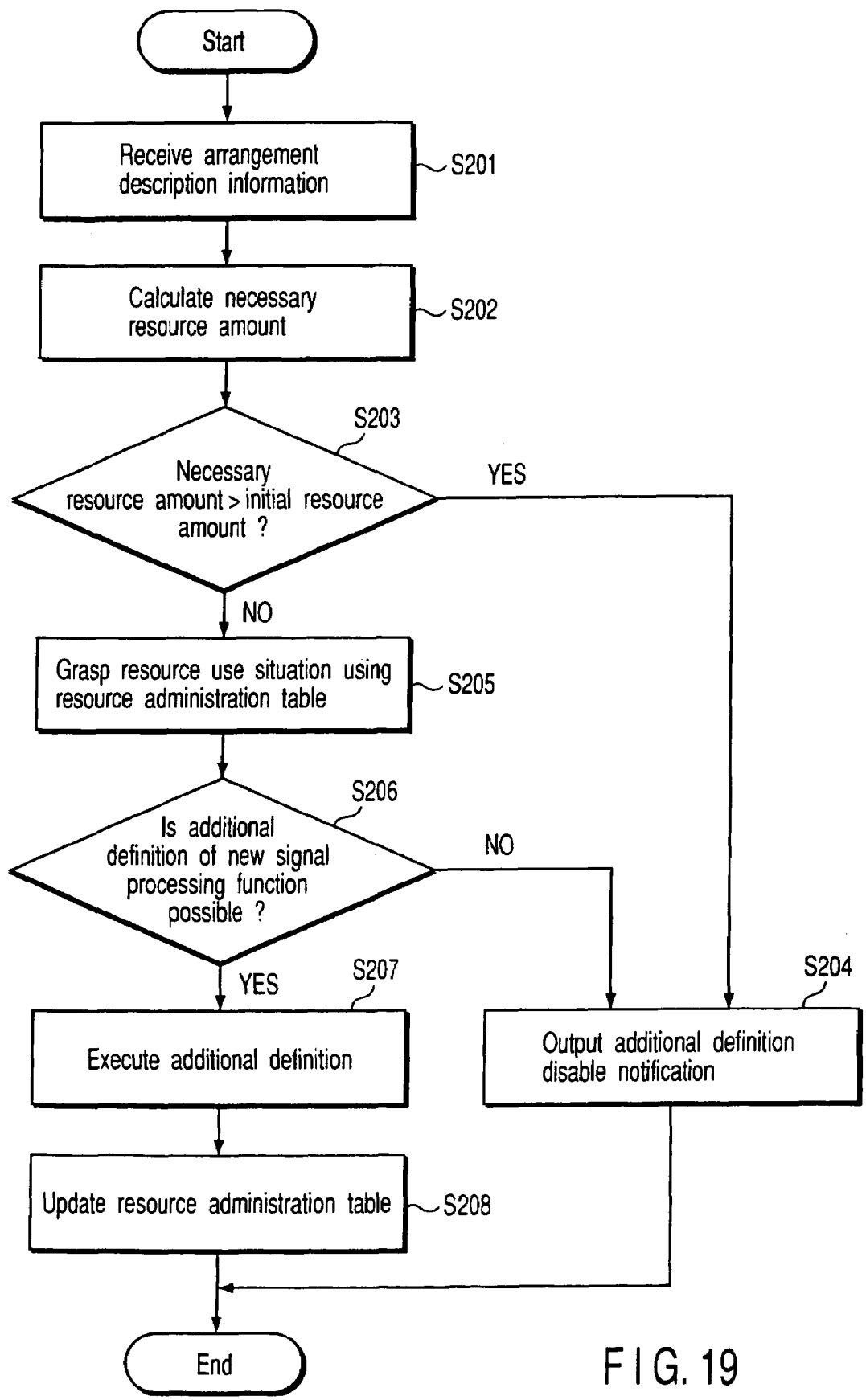
FIG. 19 is a flowchart illustrating another example of the operation of the radio communication systems shown in FIG. 17.

Referring to FIG. 19, processing in steps S201 to S204 is the same as that in steps S101 to S104 of FIG. 18. In step S205, the current resource use situation, e.g., the residual resource amount of the signal processing device 3 is grasped by looking up the resource administration table 130. In step S206, it is determined whether a new signal processing function can be additionally defined in the signal processing device 3. If YES in step S206, the new signal processing function is defined to the resource of the signal processing device 3 by the resource update system 132 (step S207). Accordingly, the resource administration table 130 is updated (step S208).

Figure 20:
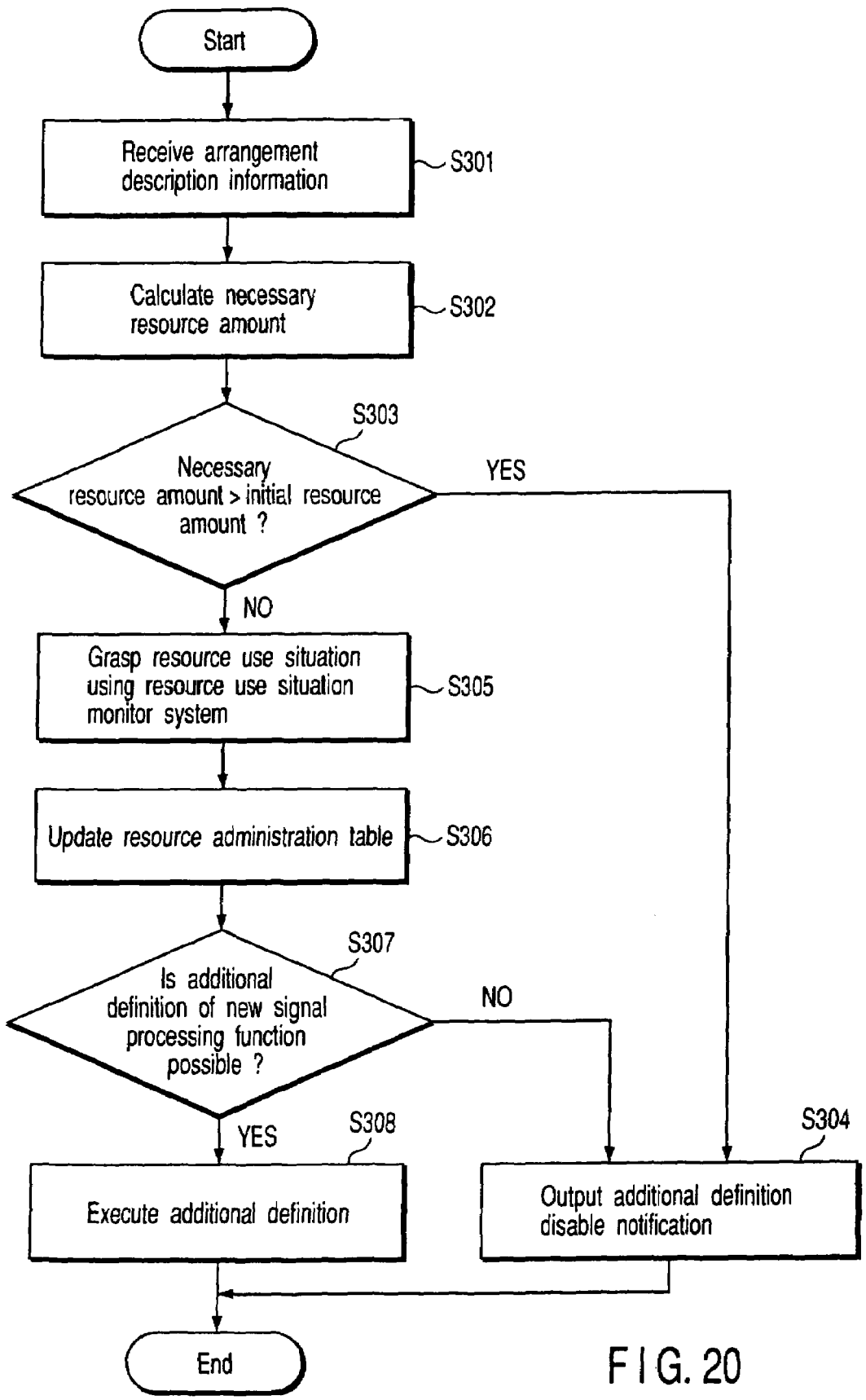
FIG. 20 is a flowchart illustrating still another example of the operation of the radio communication systems shown in FIG. 17.

Referring to FIG. 20, processing in steps S301 to S305 and processing in steps S307 and S308 are the same as that in steps S201 to S204 and that in steps S206 and S207 of FIG. 19. In FIG. 20, after processing in step S305 and before a new signal processing function is additionally defined to the resource of the signal processing device 3 in step S307, the resource administration table 130 is updated in step S306.

As described above, the resource size of the signal processing device 3 generally changes depending on each mobile radio communication apparatus. Accordingly, the structure and size of the unredefinable area 3A and redefinable area 3B shown in FIG. 11 also change depending on each mobile radio communication apparatus. Hence, to efficiently distribute the resource to the signal processing function of the signal processing device 3, details of the resource of the signal processing device 3, e.g., the numbers of the CRC attach blocks 101 and CRC check blocks 102 in FIG. 11 and the like must be grasped.

In the radio communication system shown in FIG. 17, the resource controller 144 is arranged in the arrangement description information providing apparatus 140, i.e., an apparatus other than the mobile radio communication apparatus 10 having the signal processing device 3. If the resource controller 144 is to execute arithmetic operation necessary to additionally define a new signal processing function to the resource of the signal processing device 3, the resource controller 144 must be able to grasp details of the resource of the signal processing device 3.

Using, as an example, the radio communication system shown in FIG. 17 in which the arrangement description information providing apparatus 140 is arranged on the base station and the mobile radio communication apparatus 10 serves as a terminal, a method of grasping at the base station details of the resource (to be referred to as a terminal resource hereinafter) of the signal processing device 3 in the mobile radio communication apparatus 10 will be described.

As shown in FIG. 21, a layer structure (L1/L2: layer 1/layer 2) in a conventional base station has a data link control (DLC) and physical layer (PHY). The DLC has a media access control (MAC), error control block (EC), and radio resource controller (RRC). At the base station, the error control block (EC) receives data sent from an upper layer and executes signal processing to impart resilience against any error generated in the wireless transmitter-receiver device. The signal output from the error control block (EC) is sent to the media access control (MAC). The signal output from the MAC is sent to the physical layer (PHY). In the PHY, signal processing for modulation is executed to generate an RF signal to be used for wireless transmission. The EC, MAC, and PHY are controlled by the radio resource controller (RRC). Conversely, when the base station is to receive a transmission signal from a terminal, processing is executed in an order reverse to the above-described signal flow.

FIG. 22 shows a layer structure in the base station of the radio communication system according to this embodiment. Referring to FIG. 22, a controller that controls a terminal resource is newly added to the L1/L2 structure shown in FIG. 21. More specifically, a TRC (Terminal Resource Control) is added as a component of the DLC (Data Link Control). The TRC independently communicates with the RRC (Radio Resource Control) to acquire the machine number or model information of the terminal. That is, the TRC acquires the machine number or model information of the terminal by monitoring communication between the terminal and the base station.

As a method of grasping the resource of the terminal from the machine number or model information, a table is used. FIG. 23 shows an example of such a table. In this table, a resource list indicating details of the terminal resource is referred to. In the resource list, functional block names and the quantities of the blocks are described, as shown in FIG. 24. In addition, remarks representing that, e.g., simultaneous use is impossible are described. As described above, the resource is divided into the unredefinable area 3A and redefinable area 3B.

The TRC grasps the resource amount necessary to define a desired signal processing function to the terminal resource using the information of the source list as shown in FIG. 24, obtains optimum resource distribution by arithmetic operation, and outputs resource distribution designation information. The resource distribution designation information is transmitted from the base station to the terminal. The table shown in FIG. 23 is updated every time a new terminal is released.

FIG. 25 shows the layer structures of the base station (BS) and terminal (MT) according to this embodiment. The base station BS has the TRC, and the terminal MT has a resource controller (RC). The TRC has the resource list of each terminal. The terminal resource changes depending on the terminal. The RC has a resource administration table that indicates the use situation of each terminal resource. The ratio of the unredefinable area to the redefinable area of the terminal resource changes depending on the terminal. The terminal resource use situation is monitored by the resource monitor system.

The TRC arranged in the base station BS communicates with the RC arranged in the terminal MT to acquire information of use situation of the terminal resource from the terminal. To grasp the use situation of the terminal resource, the TRC transmits, e.g., a message as shown in FIG. 26 to the RRC. Upon receiving this message, the RRC in the base station BS requests the RC arranged in the terminal MT to declare the use situation of the terminal resource to the base station. Upon receiving this request, the RC in the terminal MT updates the terminal resource use situation table and transmits the table to the base station BS. The TRC in the base station BS has the resource list of the terminal MT. The TRC grasps the type and quantity of the resource of the terminal MT by the list. Hence, the resource use situation table sent from the terminal MT to the base station BS is simplified to a table that describes only numerical values in accordance with a predetermined order, as shown in FIG. 27. Upon receiving the resource use situation table, the RRC transmits a message shown in FIG. 28 to the TRC arranged in the base station.

With the above procedure, the TRC can grasp the use situation of the terminal resource. The resource of the terminal is grasped on the basis of information such as a machine number or terminal model, and the terminal resource use situation is acquired from the terminal. On the basis of these pieces of information, the TRC obtains, by arithmetic operation, optimum resource distribution necessary for a function to be newly added, and outputs resource distribution designation information. This resource distribution designation information is transmitted from the base station to the terminal.

In a terminal capable of changing signal processing functions, the resource use amount gradually changes. That is, some of functions set in the terminal once may become unnecessary. Hence, when the resource administration table is updated at the time of adding a function, resource management based on latest information can be done.

To send a notification representing that addition of a signal processing function is impossible to the terminal, in, e.g., the radio communication system shown in FIG. 16, a mechanism for transmitting a notification representing that additional definition of a function is impossible from the mobile radio communication apparatus 10 to the arrangement description information providing apparatus 140 is added. In additionally defining signal processing functions, the resource amount may be too small to additionally define all the signal processing functions. In this case, the base station can grasp that additional definition of a new signal processing function is impossible on the terminal side. Upon grasping this information, the base station transmits arrangement description information to additionally define minimum signal processing functions corresponding to the residual resource amount on the terminal side. When minimum signal processing functions are additionally defined, the service as the radio communication system can improve.

(Sixth Embodiment)

Figures 28, 29:
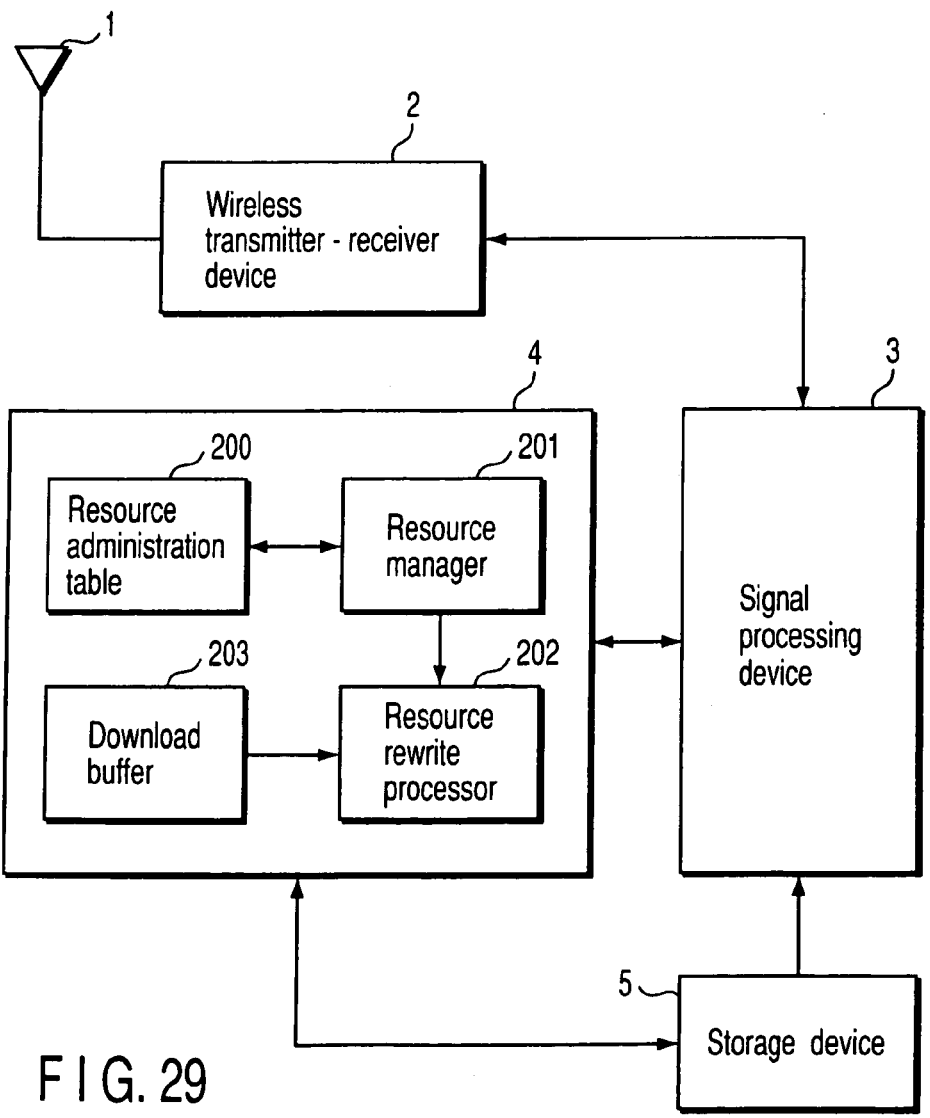
FIG. 28 is a diagram illustrating an example of the message which is sent to the TRC by the RRC which has received the resource use station table in the base station BS in FIG. 25.
FIG. 29 is a block diagram showing the structure of a mobile radio communication apparatus according to the six embodiment of the present invention.

FIG. 29 shows a mobile radio communication apparatus according to the sixth embodiment of the present invention. Like the above embodiments, this mobile radio communication apparatus has an antenna 1, wireless transmitter-receiver device 2, signal processing device 3, resource controller 4, and storage device 5. A system controller 6 and input/output unit 7 shown in FIG. 1A are not illustrated in FIG. 29.

The signal processing device 3 is formed from a processor such as a CPU or DSP that executes signal processing by software or a programmable hardware device such as a PLD. A case wherein the signal processing device 3 is formed from a processor will be exemplified. The processor has a storage area such as a RAM area where an execution program is loaded. The processor executes signal processing by loading a module group that forms a program for signal processing in the storage area. A module here means a compiled execution format file. Each signal processing function is formed as software or a module.

The storage device 5 stores a program and data files. Especially, as a program, a module group with specifications assumed in the signal processing device 3 is stored. With this arrangement, a module group necessary for the mobile radio communication apparatus to shift to another mode, e.g., a mode for receiving another channel can be read out from the storage device 5 and transferred to the signal processing device 3.

Figure 30:
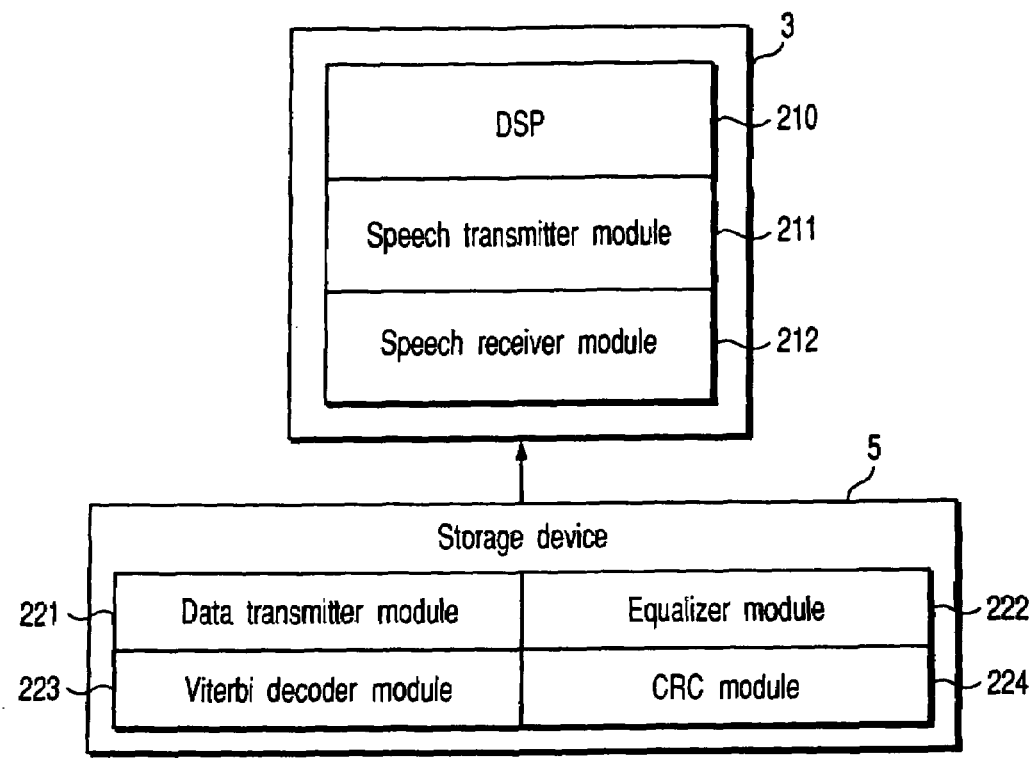
FIG. 30 is a diagram showing an example of the storage area and contents of the storage device of the signal processing device shown in FIG. 29.

FIG. 30 shows examples of the contents in the storage area of the signal processing device 3 and in the storage device 5. The signal processing device 3 has a DSP 210 as a processor. A speech transmitter module 211 and speech receiver module 212 are loaded in the storage area. The storage device 5 stores a data transmitter module 221, equalizer module 222, Viterbi decoder module 223, and CRC module 224.

The resource controller 4 has a resource administration table 200, resource manager 201, resource rewrite processor 202, and download buffer 203. Information of the storage position of a module executable in the signal processing device 3 is stored in the resource administration table 200. The resource manager 201 controls (a) the order of exchanging modules in resource, (b) determination whether the modules are to be exchanged, and (c) timing of exchange. The resource rewrite processor 202 rewrites the module in the processor of the signal processing device 3, in accordance with a designation from the resource manager 201. The download buffer 203 temporarily stores an externally downloaded module.

The basic operation of the mobile radio communication apparatus according to this embodiment is the same as in the above-described embodiments. Operation unique to this embodiment will be described below. Assume that the wireless transmission path between the mobile radio communication apparatus and a base station (not shown) degrades due to shadowing, i.e., putting the mobile radio communication apparatus in a shadow, and a desired communication quality cannot be obtained. The communication quality is detected by, e.g., a field measuring function of the wireless transmitter-receiver device 2.

If the desired communication quality is not obtained, the resource controller 4 determines that an equalizer module need be newly added to the resource of the signal processing device 3 to improve the communication quality. In the resource controller 4, The resource manager 201 executes control to add an equalizer module to the resource on the basis of the determination if the signal processing device 3 has a sufficient residual resource amount. The resource manager 201 recognizes whether an equalizer module is present in the storage device 5 by looking up the resource administration table 200. When the equalizer module 222 is present in the storage device 5, as shown in FIG. 30, the resource controller 4 loads the equalizer in the signal processing device 3 as the execution file of the processor serving as the signal processing device 3. If no equalizer module is present in the storage device 5, the resource controller 4 issues a download request to acquire the module and stores it in the download buffer 203.

When the module necessary for the signal processing device 3 in the mobile radio communication apparatus is not stored in the storage device 5, the download request is output to, e.g., a base station which has, as a service area, an area where the mobile radio communication apparatus is currently located. The base station transfers the received download request to a network (not shown). The network transmits, through the base station, the requested module to the mobile radio communication apparatus that has issued the download request.

In this way, when the program held in the storage area of the processor serving as the signal processing device 3 is exchanged, a necessary signal processing function is defined in the signal processing device 3. As a program, a necessary module is fetched, as needed. With this arrangement, any wasteful use of resource by a normally unnecessary module resident in the storage area of the processor, i.e., unnecessary occupation of the memory resource can be suppressed. Hence, the mobile radio communication apparatus can cope with roaming or hand-off between different radio communication systems while effectively using the resource with a finite capacity.

A more detailed example of operation of the mobile radio communication apparatus according to this embodiment will be described next. First, a case wherein the type of communication is switched, e.g., a state wherein the mobile radio communication apparatus is used for speech communication is changed to a state wherein the mobile radio communication apparatus is used for data communication such as Web browsing will be described.

When the type of communication is to be switched from, e.g., speech communication to data communication, a module for speech communication, e.g., speech CODEC module becomes unnecessary. Instead, a module with TCP/IP newly becomes necessary. The resource manager 201 checks whether a TCP/IP module is present in the storage device 5 by looking up the resource administration table 200. If a TCP/IP module is present in the storage device 5, the module is loaded to the storage area of the processor as an execution file of the processor serving as the signal processing device 3. The unnecessary speech communication module such as a speech CODEC module is cleared from the storage area of the processor.

If no TCP/IP module is present in the storage device 5, the resource manager 201 acquires the module by download described above. The acquired TCP/IP module is stored in the storage device 5 and then written in the resource administration table 200. The resource manager 201 checks again whether a TCP/IP module is present in the storage device 5 by looking up the resource administration table 200. If a TCP/IP module is present in the storage device 5, the module is loaded to the storage area of the processor as an execution file. This processing enables subsequent data communication.

Figure 31:
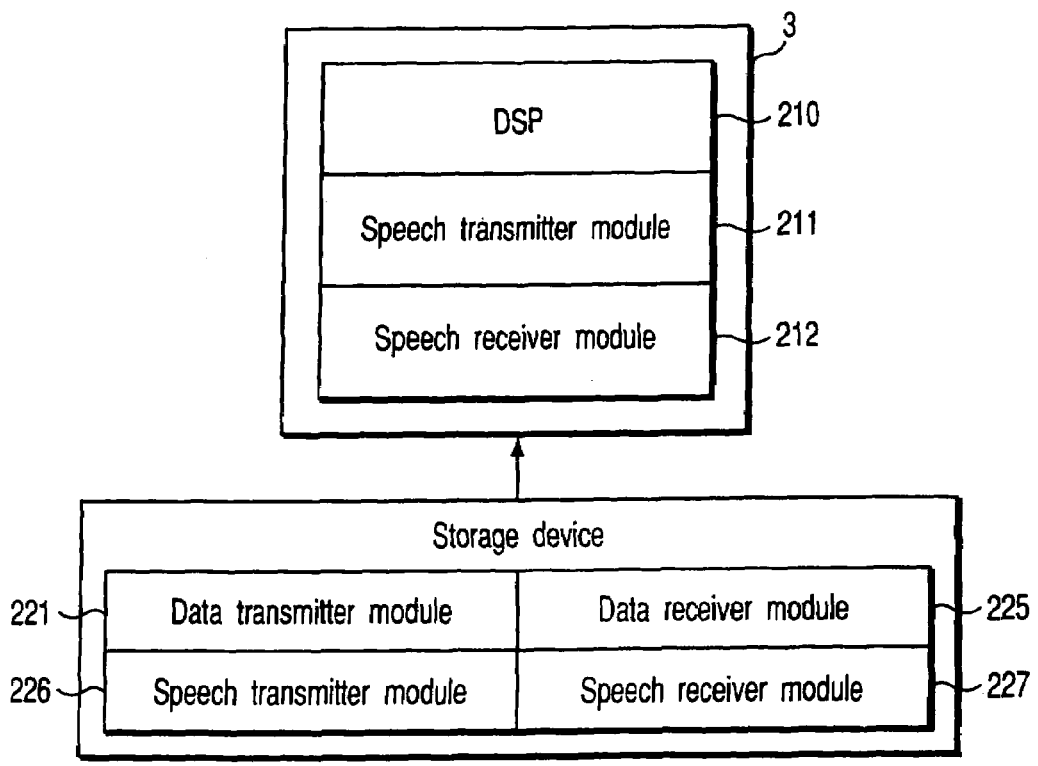
FIG. 31 is a diagram showing another example of the storage area and contents of the storage device of the signal processing device shown in FIG. 29.
Figure 32:
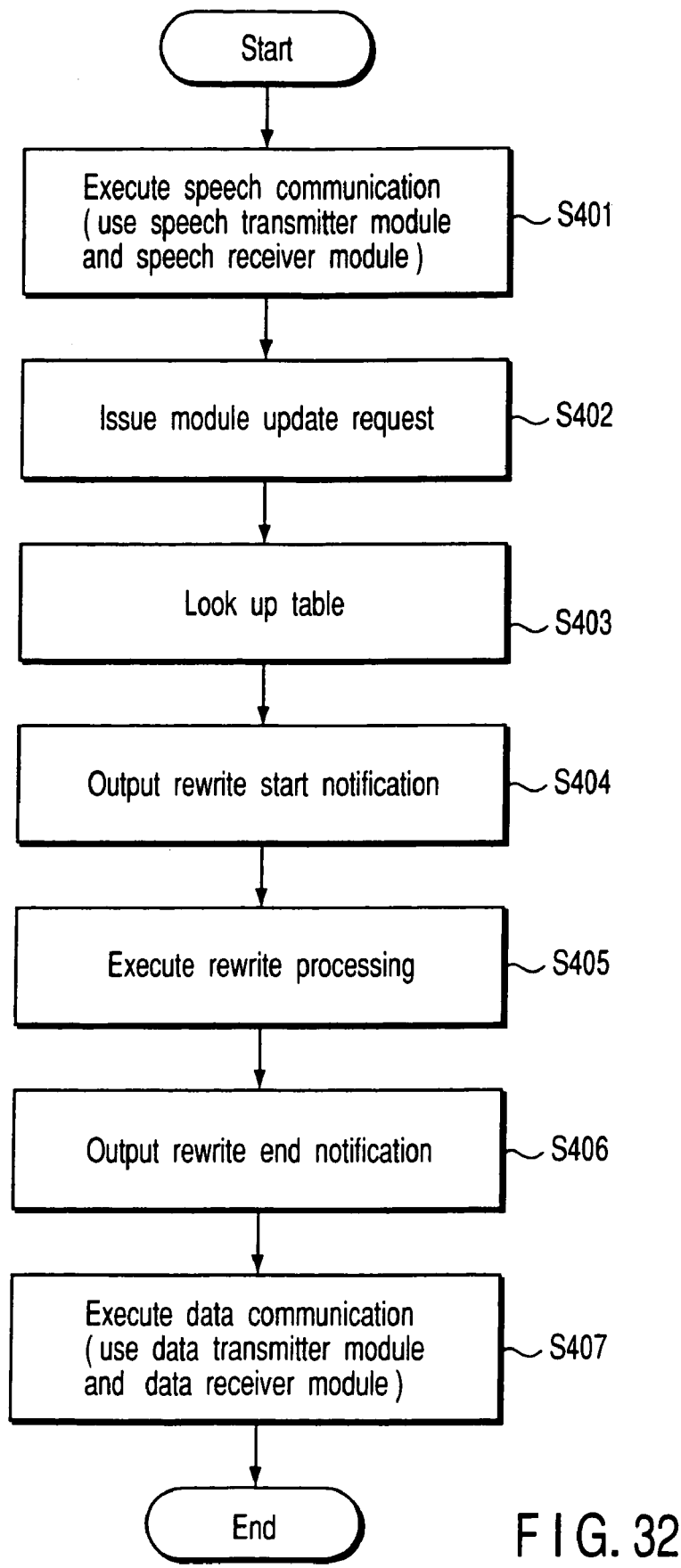
FIG. 32 is a flowchart illustrating the rewrite procedure of the module in the resource of the signal processing device shown in FIG. 29, in correspondence with the illustration made in FIG. 31.

This operation will be described with reference to FIGS. 31 and 32. As shown in FIG. 31, the speech transmitter module 211 and speech receiver module 212 are loaded to the storage area of the signal processing device 3, like FIG. 30. The storage device 5 stores the data transmitter module 221, data receiver module 225, speech transmitter module 226, and speech receiver module 227.

In step S401, the DSP 210 executes signal processing for speech communication using the speech transmitter module 211 and speech receiver module 212. In this state, assume that the user of the mobile radio communication apparatus operates the input/output unit 7 shown in FIG. 1A to input a designation of a shift to data communication. The resource controller 4 receives this designation and outputs a resource update request (step S402). The resource manager 201 checks whether a data communication module is present in the storage device 5 by looking up the resource administration table 200 (step S403). If no data communication module is present in the storage device 5, a download request is output. If a data communication module is present, the DSP 210 is notified of the start of rewrite (step S404). The DSP 210 stops executing a module currently present in the storage area.

Next, the resource controller 4 deletes the speech transmitter module and speech receiver module, which are currently present in the storage area of the DSP 210, using the rewrite processor 202. The resource controller 4 also loads the data transmitter module and data receiver module from the storage device 5 and writes them in the storage area of the DSP 210 (step S405). When rewrite processing by the rewrite processor 202 is ended, the resource controller 4 notifies the DSP 210 of the end of rewrite (step S406). Upon receiving the rewrite end notification, the DSP 210 executes the data transmitter module and data receiver module in the storage area to execute signal processing for data communication (step S407).

In this way, the modules in the storage area of the DSP 210 (the resource of the DSP 210) are exchanged under the control of the resource controller 4. With this arrangement, the signal processing function of the DSP 210 can be changed from the speech communication function to the data communication function whereby the signal processing function can be exchanged efficiently using the capacity-restricted storage area of the DSP 210. Hence, occupation of the memory resource by an unnecessary module can be suppressed.

Figure 33:
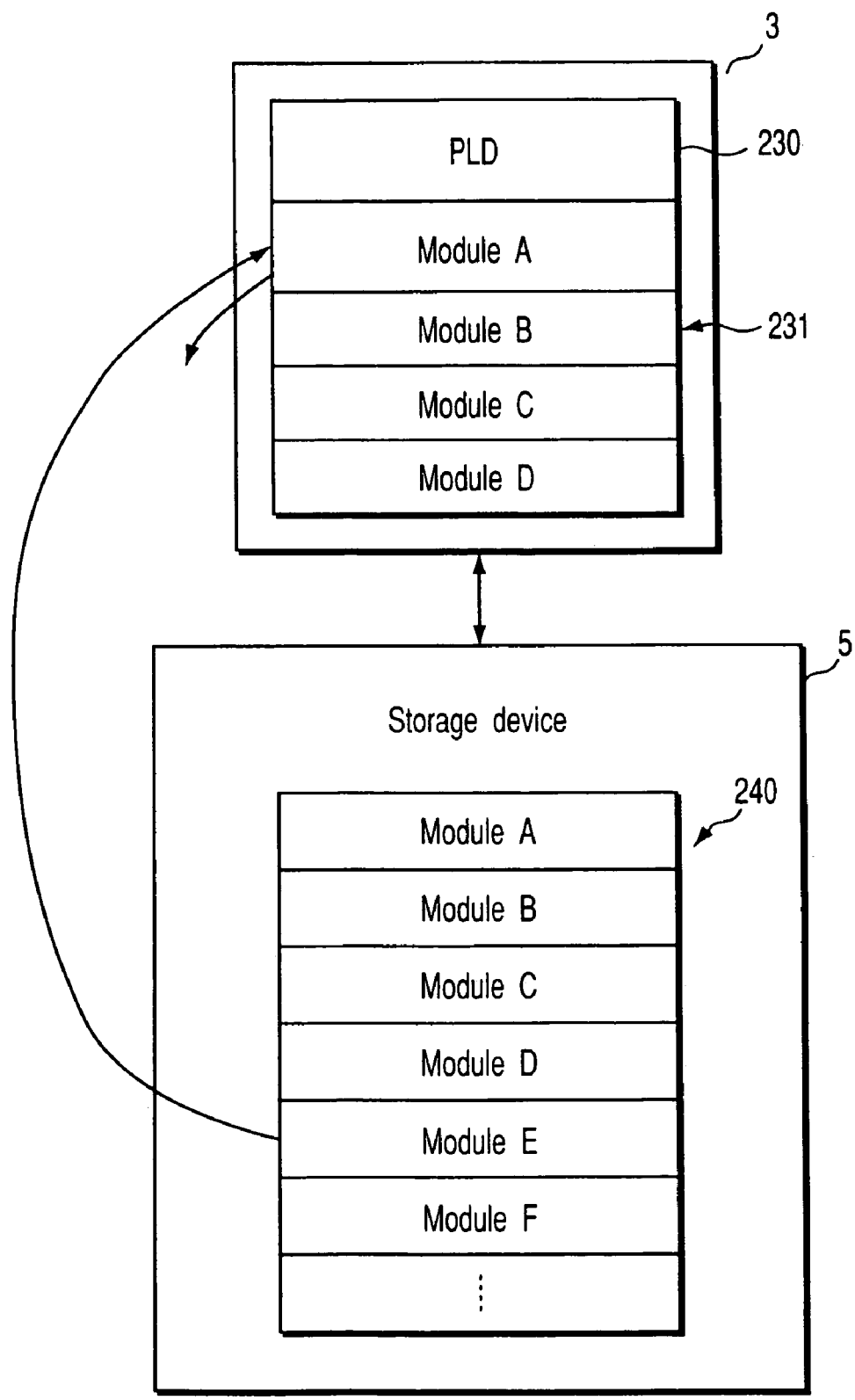
FIG. 33 is a diagram showing still another example of the storage area and contents of the storage device of the signal processing device shown in FIG. 29.

According to an example shown in FIG. 33, not a DSP but a programmable hardware device capable of a programmable rewrite, e.g., a PLD 230 is used as the signal processing device 3. The PLD 230 is operated by a module group 231 (e.g., modules A, B, C, and D). The storage device 5 stores a module group 240 (e.g., modules A, B, C, D, E, F, . . . ) which are assumed to be used in the PLD 230. A module here means a module of a circuit arrangement program (circuit arrangement description) which makes, e.g., the layout/wiring diagram of the PLD.

Operation will be described with reference to FIG. 34. First, the PLD 230 is executing signal processing using the modules A, B, C, and D that form a circuit arrangement for signal processing for speech communication (step S501). In this state, assume that the user who wants data communication operates the input/output unit 7 show in FIG. 1A to input a designation of a shift to data communication. Upon receiving this designation, the resource controller 4 outputs a resource update request (step S502). The modules B, C, and D are assumed to be modules used to form a circuit arrangement related to signal processing necessary for both speech communication and data communication.

That the modules B, C, D, and E are necessary for data communication is stored in advance. The resource controller 4 checks the current module arrangement in the PLD 230 to know that the module A must be replaced with the module E. The resource manager 201 in the resource controller 4 looks up the resource administration table 200 (step S503) to check whether the module E required to form a circuit arrangement for signal processing for data communication is present in the storage device 5 (step S504).

If the module E is in the storage device 5, the resource manager 201 designates the rewrite processor 202 to rewrite the module A in the module group 231 held by the PLD 230 to the module E. Upon receiving this rewrite designation, the rewrite processor 202 notifies the PLD 230 of the start of a module rewrite (step S505). Then, the PLD 230 stops executing processing using the circuit arrangement of the currently held modules. Next, the rewrite processor 202 discards the module A held by the PLD 230, and instead, reads out the module E from the storage device 5 and replaces the module A with the module E (step S506).

When module rewrite processing for the PLD 230 by the rewrite processor 202 is ended, the resource controller 4 notifies the PLD 230 of the end of the rewrite (step S507). Upon receiving the rewrite end notification, the PLD 230 forms a circuit arrangement using the newly held module group 231 (modules B, C, D, and E) and executes signal processing for data communication using the circuit arrangement (step S508).

If it is determined in step S504 that the module E is not present in the storage device 5, the resource controller 4 outputs a download request (step S509). In accordance with this request, the module E is downloaded and temporarily held by the download buffer 203. After that, the PLD 230 is notified of the start of a rewrite in step S505 (step S505). In step S506, the module E held by the download buffer 203 is read out by the rewrite processor 202 and written in the PLD 230. While download is progressing or immediately after download is ended, the downloaded module E can be written in the PLD 230. Hence, speech communication can be changed to data communication in a short time. The module acquired by download is not only temporarily stored in the download buffer 203 but also stored in the storage device 5 as needed and used later.

(Seventh Embodiment)

In the sixth embodiment, in switching a signal processing function of a signal processing device 3, of a plurality of necessary modules, a module required to realize a new signal processing function is replaced with an unnecessary module. Instead, module groups each including a set of modules required for an application purpose may be prepared, and a whole module group may be replaced to switch a signal processing function. With this arrangement, the signal processing function of the signal processing device 3 can be switched at a high speed.

Figure 35:
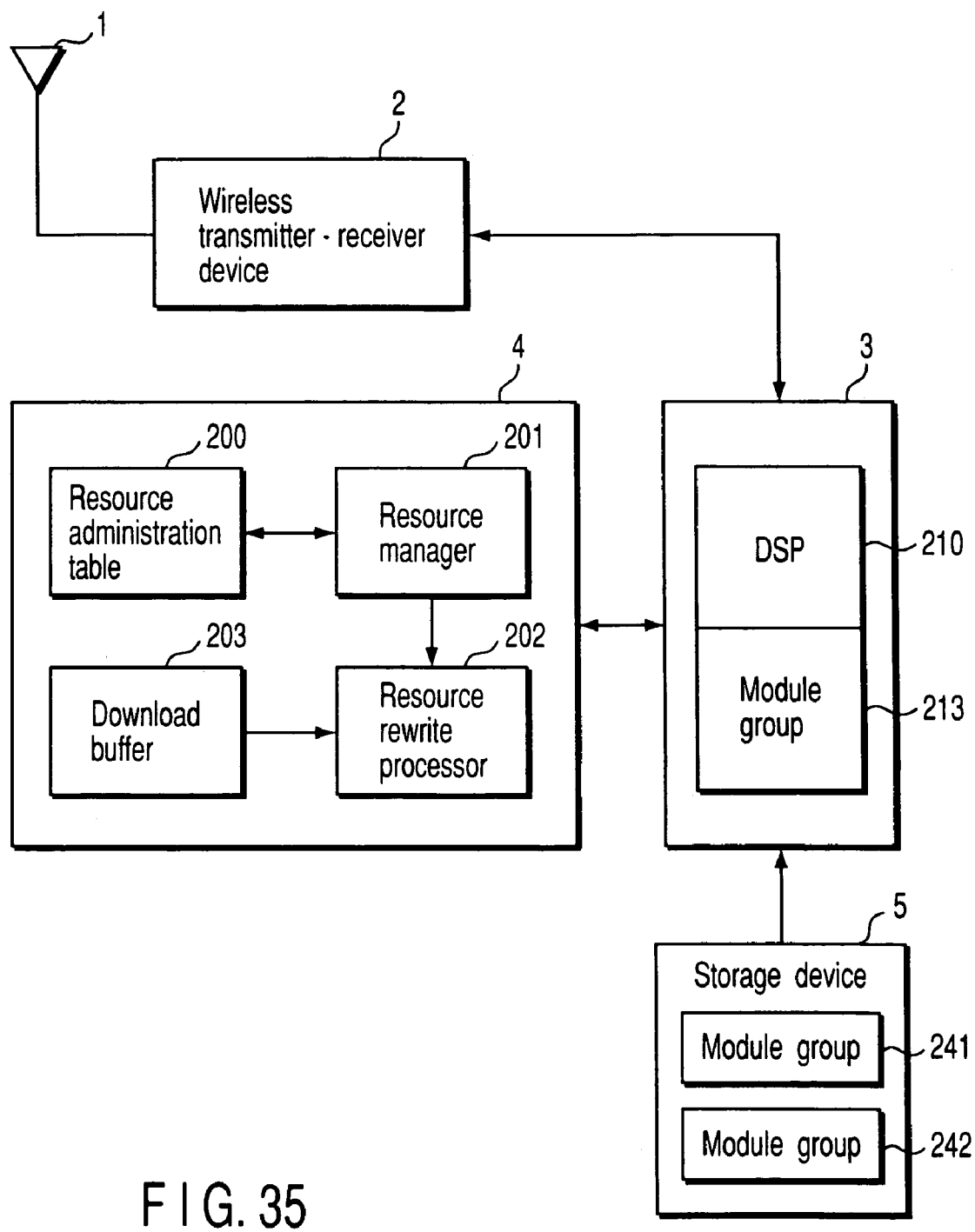
FIG. 35 is a block diagram showing an example of the structure of a mobile radio communication apparatus according to the seventh embodiment of the present invention.

FIG. 35 shows a mobile radio communication apparatus according to the seventh embodiment, which replaces module groups. This mobile radio communication apparatus can be adapted to a plurality of different radio communication systems. Hence, a storage device 5 stores module groups 241 and 242 for executing communication signal processing in different radio communication systems. These module groups 241 and 242 can be updated by exchanging the storage device 5. A DSP 210 of the signal processing device 3 operates by loading a module group 213.

Assume that the mobile radio communication apparatus is currently communicating with a base station under a radio communication system X. In this state, assume that communication with the base station under a radio communication system Y need be performed for, e.g., hand-over. In this case, a resource manager 201 determines that the mobile radio communication apparatus must communicate with the radio communication system Y and controls the order of exchanging resources, determination whether a resource is to be exchanged, and timing of exchange. The resource manager 201 designates a rewrite processor 202 to release a module that is not used in the system X and write a module for the system Y. Upon receiving this designation, the rewrite processor 202 executes module rewrite processing from the storage device 5 to the DSP 210.

The radio communication system X is currently being used. For this reason, of the module groups for the system X, which are written in the storage area of the DSP 210, modules which are being used must be maintained. A module that is not used is checked and released from the storage area of the DSP 210. A module for the system Y is written in a storage area serving as a resultant residual resource. With this operation, the mobile radio communication apparatus can communicate under both the radio communication systems X and Y.

Operation performed when in a state wherein the DSP 210 is executing signal processing using modules X1, X2, X3, and X4 for communication under the system X, the module X1 is released and a module Y1 is loaded to execute communication under the system Y will be described with reference to FIG. 36.

First, in step S601, the modules X1, X2, X3, and X4 for communication under the system X has been written in the storage area of the DSP 210. The DSP 210 is executing signal processing using the modules X1, X2, X3, and X4. In this state, when, e.g., hand-over occurs, the resource controller 4 generates a module update request (step S602). Upon receiving the module update request, the resource manager 201 checks whether a module group for the communication system Y is present in the storage device 5 and also checks the arrangement of the module group for the communication system X by looking up a resource administration table 200 (step S603).

The resource manager 201 determines a module necessary for communication under the radio communication system Y, which module in the module group for the radio communication system X should be exchanged, and the order of exchanging the resource. As a result, the resource manager 201 determines that the module X1 is unnecessary, the module Y1 is necessary, and the module Y1 should be written after the module X1 is deleted. The resource manager 201 designates the rewrite processor 202 to rewrite the module X1 in the module group 213 held by the DSP 210 to the module Y1. Upon receiving this designation, the rewrite processor 202 notifies the DSP 210 of the start of a module rewrite (step S604). The DSP 210 stops executing processing by the currently held modules.

Next, the rewrite processor 202 discards the module X1 in the module group 213 held by the DSP 210. Instead, the rewrite processor 202 reads out the module Y1 from the storage device 5 and replaces the module X1 with the module Y1 (step S605). When the rewrite processing is ended, the resource controller 4 notifies the DSP 210 of the end of the rewrite (step S606). Upon receiving this notification, the DSP 210 executes signal processing for data communication using the held module group 213 (modules X2, X3, X4, and Y1) (step S607).

In this way, when modules in the DSP 210 are exchanged under the management by the resource controller 4, communication that has been executed under only the communication system X can be executed under the communication systems X and Y by effectively using the module storage area (memory resource with a finite capacity) of the DSP 210. Hence, hand-over can easily be realized.

Another operation example of this embodiment will be described with reference to FIG. 37. Assume that a mobile radio communication apparatus is communicating under a radio communication system U. When the mobile radio communication apparatus is going to do hand-over to execute communication under another radio communication system V at the boundary between cells (i.e., service areas), modules are partially exchanged such that the resource of the DSP 210 serving as a signal processing device used in the radio communication system U is gradually used in the radio communication system V. With this arrangement, soft hand-over can be done between different radio communication systems.

More specifically, modules loaded to the DSP 210 and occupied in the system U are gradually occupied in the system V. As for a module for the system V, if the module is stored in the storage device 5 in advance, the stored module is used. Otherwise, the module is acquired by download.

Figure 37:
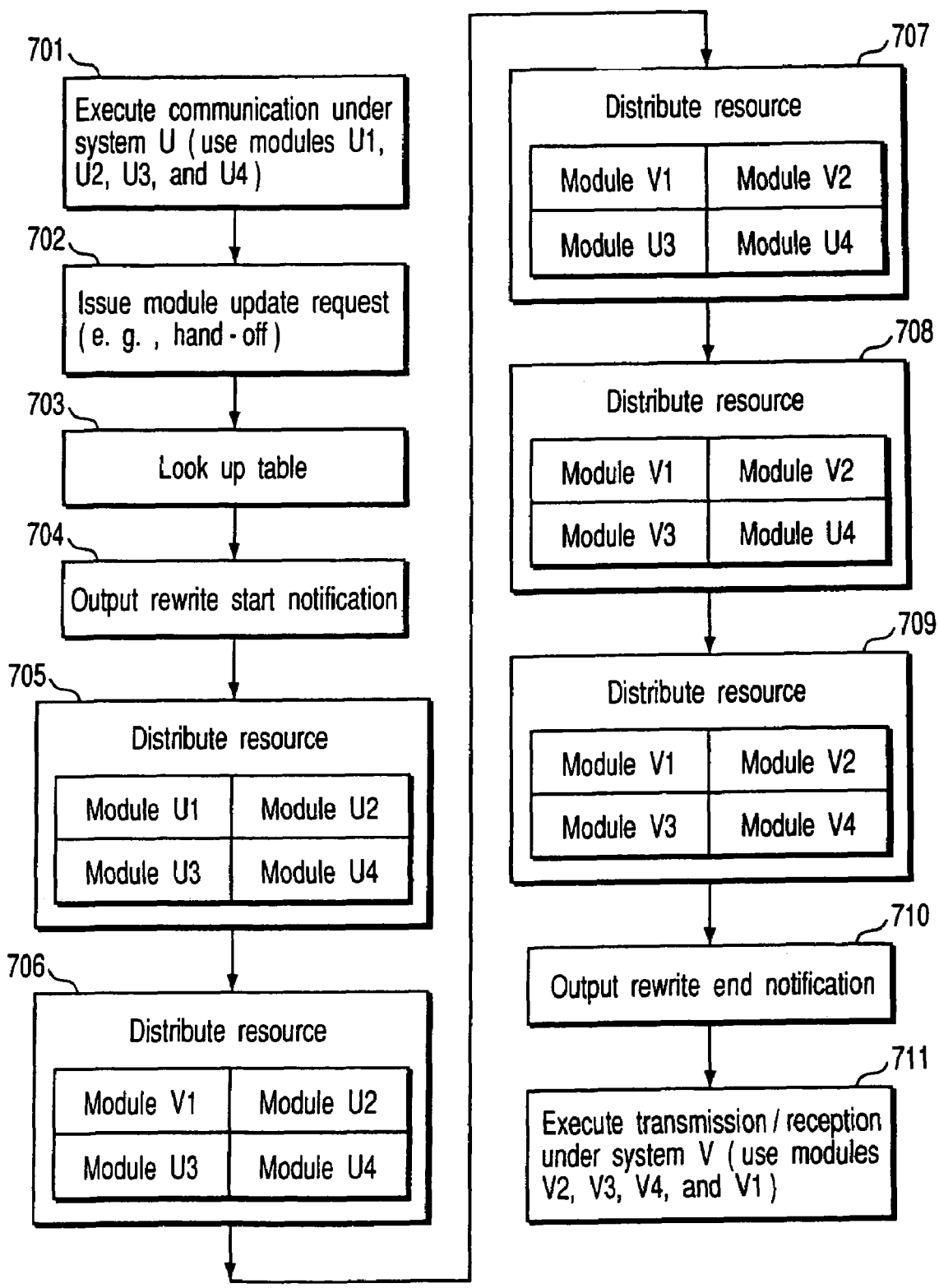
FIG. 37 is a flowchart illustrating another example of the operation of the mobile radio communication apparatus according to the seventh embodiment.

Referring to FIG. 37, in a state wherein communication is being executed under the radio communication system U (step S701), assume that hand-off occurs and a module update request is generated (step S702). In step S701, modules U1, U2, U3, and U4 have been written in the storage area of the DSP 210 as the module group 213, and the DSP 210 is executing signal processing using these modules.

The resource manager 201 determines the order of exchanging the resource, whether a module is to be exchanged, and the timing of exchange by looking up the resource administration table 200 which stores the storage location of a module executable in the DSP 210. The resource manager 201 notifies the rewrite processor 202 and DSP 210 of the start of a rewrite on the basis of the determination (steps S703 and S704). The DSP 210 stops executing processing by the currently held module group 213. At this time, the module group 213 already written in the DSP 210 comprises the modules U1, U2, U3, and U4 all of which are used for signal processing for communication under the system U and includes no modules for signal processing for communication under the system V.

The rewrite processor 202 releases the storage area of the module U1 first to gradually rewrite the module group 213 written in the DSP 210 under the control of the rewrite processor 202. The rewrite processor 202 writes a module V1 read out from the storage device 5 in the released area (step S706). Next, the rewrite processor 202 releases the storage area of the module U2 and writes a module V2 read out from the storage device 5 in the released area (step S707). In a similar manner, the rewrite processor 202 releases the storage area of the module U3 and writes a module V3 read out from the storage device 5 in the released area (step S708). Next, the rewrite processor 202 releases the storage area of the module U4 and writes a module V4 read out from the storage device 5 in the released area (step S709).

In this way, the module rewrite for the storage area of the DSP 210 is gradually executed by the rewrite processor 202 under the control by the resource manager 201. When all necessary modules are rewritten, the resource manager 201 notifies the DSP 210 of the end of the rewrite (step S710). Upon receiving this notification, the DSP 210 executes data communication processing using the currently held module group 213 (modules V1, V2, V3, and V4) (step S711).

In this way, the module group 213 in the DSP 210 is gradually exchanged in correspondence with a requested signal processing function under the management of the resource controller 4. Hence, soft hand-over between different radio communication systems can be executed while effectively utilizing the module storage area (memory resource with a finite capacity) of the DSP 210, i.e., while suppressing occupation of resource by an unnecessary resource.

(Eighth Embodiment)

Figure 38:
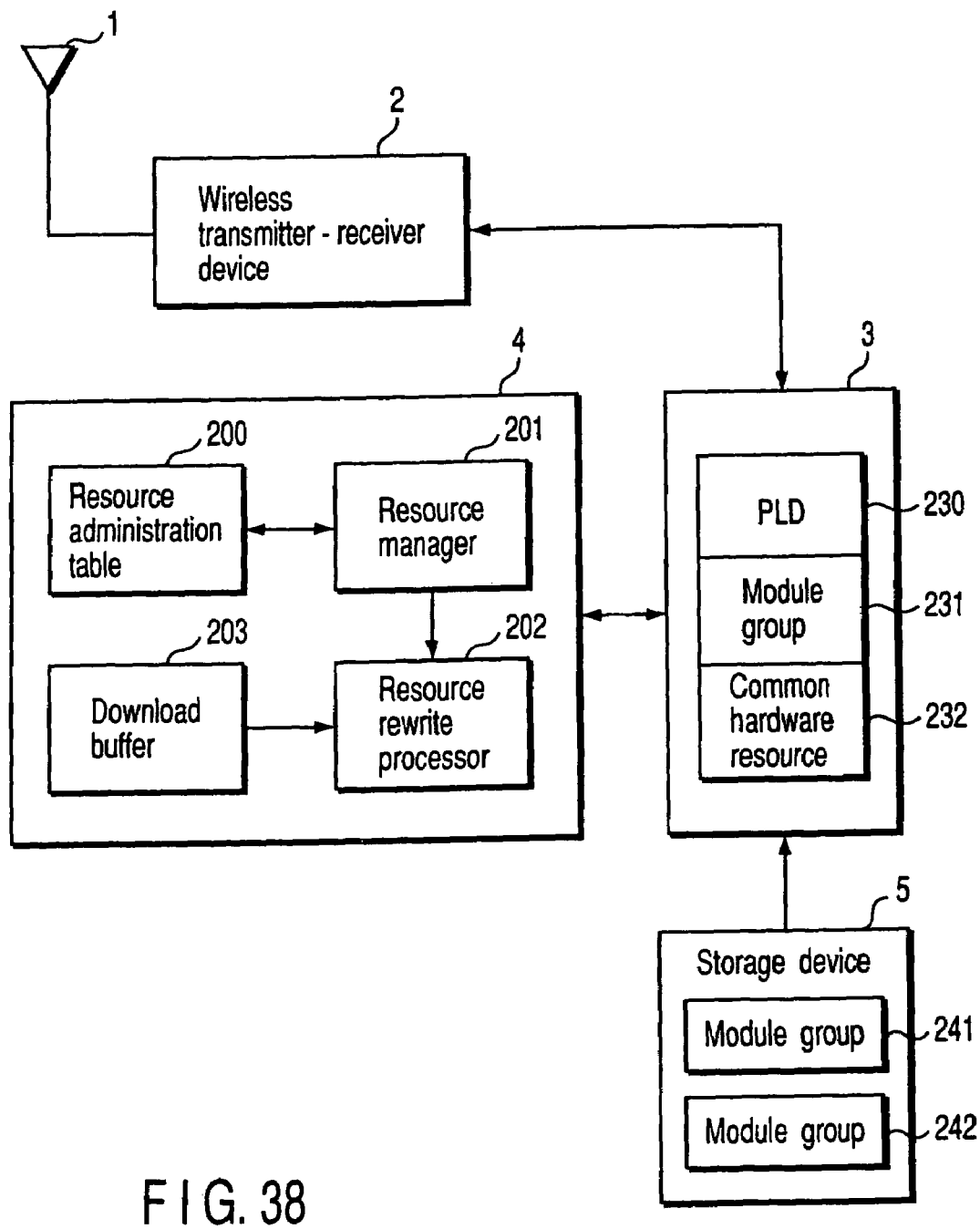
FIG. 38 is a block diagram showing an example of the structure of a mobile radio communication apparatus according to the eighth embodiment of the present invention.

As shown in FIG. 38, in a mobile radio communication apparatus according to the eighth embodiment of the present invention, a common hardware resource 232 is prepared in a signal processing device 3 using a programmable hardware device, e.g., a PLD 230. The common hardware resource 232 may be hardware different from the PLD 230. Alternatively, the common hardware resource 232 may be part of the PLD 230, e.g., the unredefinable area 3A shown in FIG. 11.

In a state wherein the mobile radio communication apparatus is communicating under a radio communication system, monitoring another radio communication system may be required. In such a case, in this embodiment, some modules in a module group 231 loaded to the PLD 230 are released, and some modules for the radio communication system to be newly monitored are written. The procedures of release and write are the same as those described in the seventh embodiment.

The common hardware resource 232 is a device commonly used by a plurality of radio communication systems. Hence, the device 232 is commonly used under a radio communication system used by a mobile radio communication apparatus for communication and under another radio communication system to be monitored. When the common hardware resource 232 is used, the processing load on the resource of the PLD 230 is reduced.

Even in an arrangement wherein a programmable hardware device such as the PLD 230 is used as the signal processing device 3, when a radio communication system is to be monitored, a module as a circuit arrangement description for changing the circuit arrangement of the PLD 230 is loaded to the storage area of the PLD 230 or exchanged as needed, thereby suppressing occupation of the resource of the PLD 230 by an unnecessary module and effectively using the resource.

(Ninth Embodiment)

Figure 39:
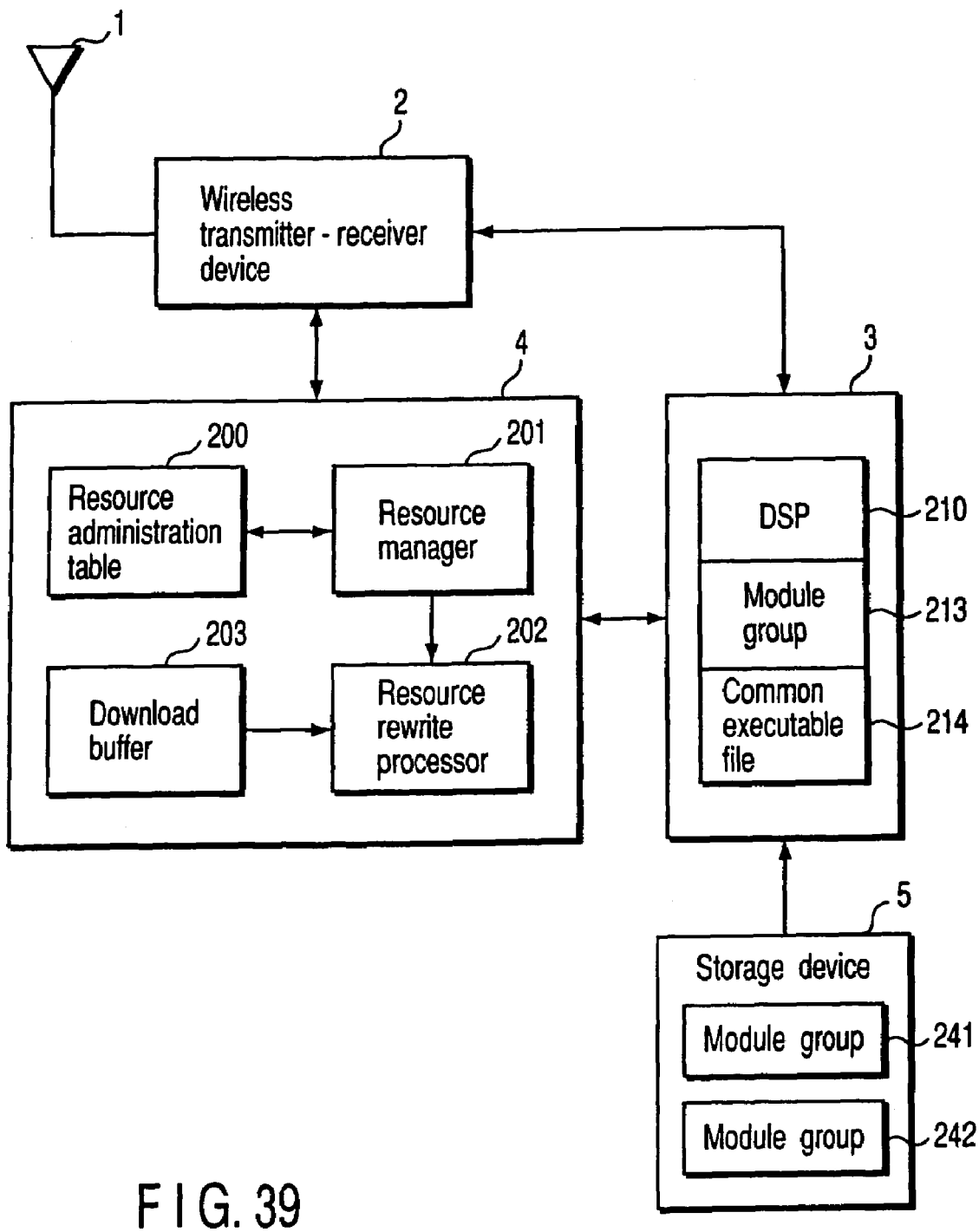
FIG. 39 is a block diagram showing an example of the structure of a mobile radio communication apparatus according to the ninth embodiment of the present invention.

In a mobile radio communication apparatus according to the ninth embodiment of the present invention shown in FIG. 39, an execution file 214 common to a plurality of radio communication systems is stored in a signal processing device 3. As described in the eighth embodiment, assume that, in a state wherein the mobile radio communication apparatus is communicating under a radio communication system, another radio communication system need be monitored. In this case, like the procedure described in the seventh embodiment, some modules in a module group 213 loaded to a DSP 210 are released, and some modules for the radio communication system to be newly monitored are written.

The fixed common execution file 214 is commonly used by radio communication systems. Hence, the execution file 214 is commonly used under a radio communication system used by a mobile radio communication apparatus for communication and under another radio communication system to be monitored. When the common execution file 214 is used, the processing load on the resource of the DSP 210 is reduced.

(10th Embodiment)

Figure 40A:
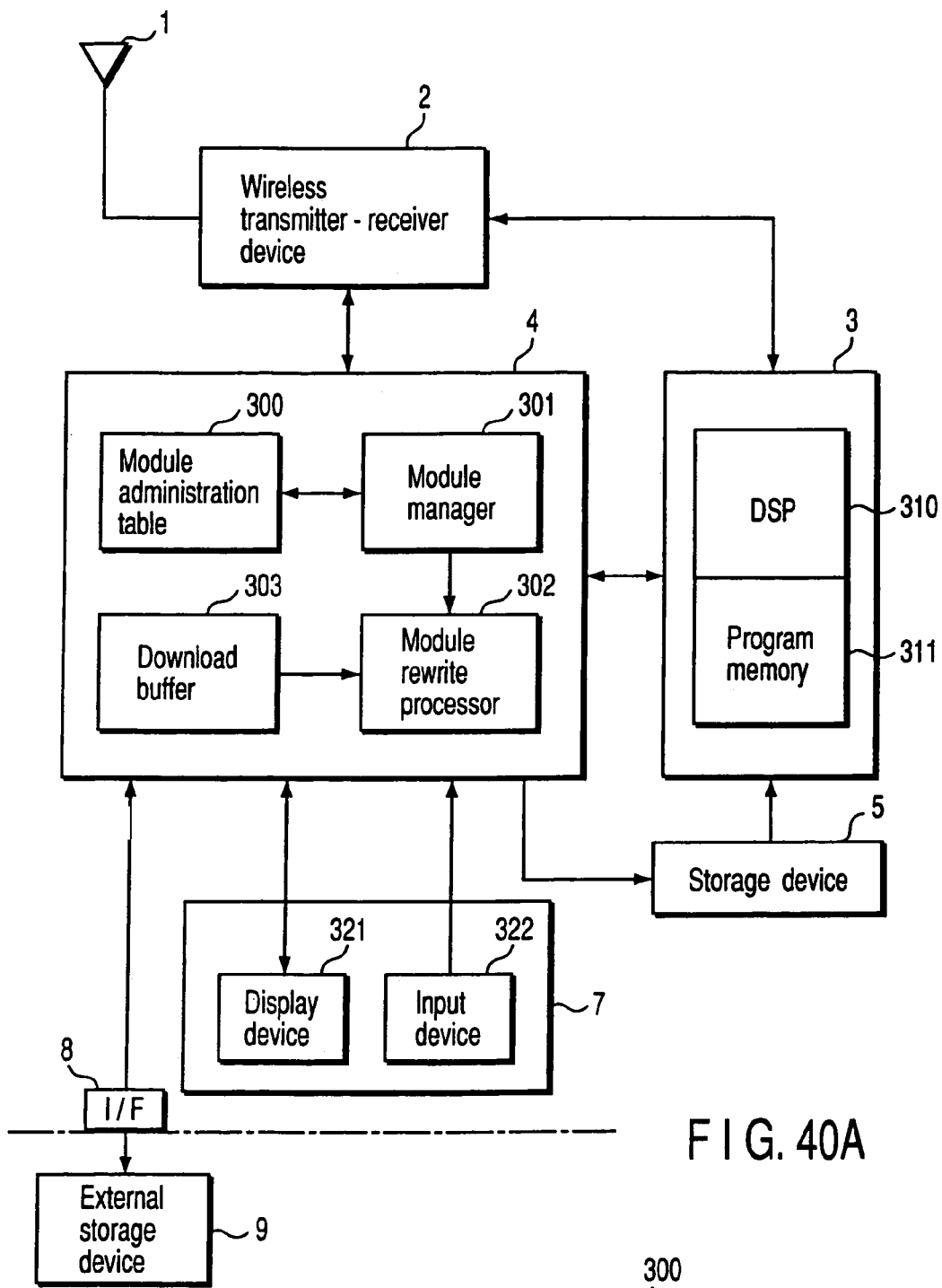
FIG. 40A is a block diagram showing an example of the structure of a mobile radio communication apparatus according to the tenth embodiment of the present invention.

In a mobile radio communication apparatus according to the 10th embodiment of the present invention shown in FIG. 40A, a resource controller 4 has a module administration table 300, module manager 301, module rewrite processor 302, and download buffer 303. In this example, a signal processing device 3 has a DSP 310 and program memory 311 which stores a program (to be referred to as a processing module hereinafter) indicating the signal processing procedure of the DSP 310. The signal processing device 3 may be implemented not by the DSP but by a programmable hardware device such as a PLA or FPGA. In that case, a software module that describes the circuit arrangement of the programmable hardware device is stored in the program memory as a processing module.

Figure 40B:
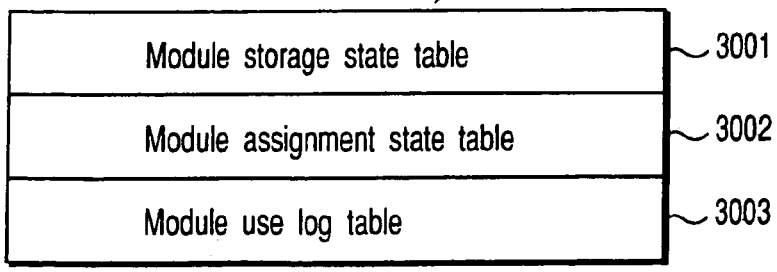
FIG. 40B is a diagram showing an example of the structure of the module administration table shown in FIG. 40A.

In the module administration table 300, the storage state of each processing module to be used in the mobile radio communication apparatus, the processing module assignment state to the resource of the signal processing device 3, and a processing module use log are recorded, updated, and used by the resource controller 4 itself. The module administration table 300 has at least a module storage state table 3001, module assignment state table 3002, and module use log table 3003, as shown in FIG. 40B. The processing module storage state is managed by the module storage state table 3001. The processing module assignment state to the resource is managed by the module assignment state table 3002. Information of processing module use log including information of the module assignment state to the resource and storage information is managed by the module use log table 3003. The module manager 301 records the information of processing module use log in the module administration table 300 and stores, deletes, or updates processing modules using the module administration table 300.

The download buffer 303 is a buffer area used to temporarily store a processing module when the processing module is downloaded from a radio channel. The module rewrite processor 302 assigns a processing module from a storage device 5 to the signal processing device 3 or outputs a processing module rewrite start/end notification in accordance with a designation from the module manager 301. The signal processing device 3 assigned a processing module by the module rewrite processor 302 reads out the assigned processing module from the storage device 5 and executes a signal processing procedure described in the processing module.

FIG. 40A shows a display device 321 and input device 322 as components of an input/output unit 7. An interface 8 and external storage device 9 which can be connected to the mobile radio communication apparatus through the interface 8 are prepared as needed.

The operation of the mobile radio communication apparatus according to this embodiment will be described next. Assume that the signal processing device 3 has the DSP 310 and program memory 311, as shown in FIG. 40A. Assume that at a site where the user of the mobile radio communication apparatus is located, two types of radio communication systems (system A and system B) provide services, and these radio communication systems can be used by the mobile radio communication apparatus.

Assume that the user of the mobile radio communication apparatus inputs to specify the use of a desired radio communication system, e.g., system A by operating keys of the display device 321. System A use specifying information generated by this operation is received by the resource controller 4. The resource controller 4 recognizes the storage state of each processing module required under the specified system A and the assignment states to the resource of the signal processing device 3 by looking up the module administration table 300. If the necessary processing module is not present, a download request of the absent processing module is generated.

The download request generated by the resource controller 4 is transmitted from a wireless transmitter-receiver device 2 to a base station through, e.g., a control channel prepared as a channel common to the respective radio communication systems. In the base station, the processing module indicated by the received download request is read out from a server in the base station or a server provided on a network to which the base station is connected, and transmits the processing module to the mobile radio communication apparatus as a request source.

The processing module transmitted from the base station to the mobile radio communication apparatus is received by the wireless transmitter-receiver device 2 and transferred to the resource controller 4. The thus received, i.e., downloaded processing module is temporarily held by the download buffer 303 and then transferred to and stored in the storage device 5 by the resource controller 4.

Next, in the resource controller 4, a processing module assignment request is output from the module manager 301 to the module rewrite processor 302. In accordance with the processing module assignment request, the module rewrite processor 302 reads out a necessary processing module from the storage device 5 and writes the processing module in the program memory 311 of the signal processing device 3. In the signal processing device 3, the DSP 310 executes the processing module written in the program memory 311, thereby realizing signal processing defined by the processing module. Hence, the user of the mobile radio communication apparatus can use the new function by the processing module written in the program memory 311.

In controlling to read out a necessary processing module from the storage device 5 and write the processing module in the program memory 311, the module manager 301 effectively uses the finite memory capacity of the program memory 311 in the following way. The order of exchanging processing modules in the program memory 311, whether a processing module is to be exchanged, and the exchange timing are controlled by looking up the contents of the module use log table 3003 recorded in the module administration table 300. The module manager 301 also controls to delete an unnecessary processing module in various processing modules held by the storage device 5 or upgrade a held processing module. As a result of the control, if a processing module required for the next processing operation in the signal processing device 3 is not present in the program memory 311, the module manager 301 generates a processing module assignment request. The processing module assignment request is supplied to the module rewrite processor 302. The processor 302 writes the necessary processing module in the program memory 311. In the signal processing device 3, the processing module written in the program memory 311 is executed by the DSP 310. Thus, a function realized by the processing module written in the program memory 311 is realized by the mobile radio communication apparatus. That is, the new function by the processing module newly written in the program memory 311 is added to the mobile radio communication apparatus.

A plurality of processing modules can be written in the program memory 311 of the signal processing device 3. In the signal processing device 3, an arbitrary processing module is executed by the DSP 310 while a plurality of processing modules are held by the program memory 311. The capacity of the program memory 311 and that of the storage device 5 are finite. Since the order of exchanging processing modules in the signal processing device 3, determination whether a processing module is to be exchanged, and the timing of exchange are controlled by the module manager 301, any shortage of the capacity of the program memory 311 can be suppressed.

If every new processing module downloaded to the mobile radio communication apparatus is stored in the storage device 5, the free storage area of the storage device 5 may be too small soon. When the storage device 5 has no free storage area, a free storage area must be ensured by deleting another processing module stored in the storage device 5. In this case, it is preferable to preferentially delete a processing module unnecessary for the mobile radio communication apparatus, i.e., a processing module which will be used at a low probability in the mobile radio communication apparatus for the next processing. For this purpose, the use frequency of each processing module that was used in the past is always monitored by the module manager 301, and a monitoring result is recorded in the module use log table 3003 in the module administration table 300. The module manager 301 deletes a processing module with the minimum use frequency on the module use log table 3003. With this operation, the free storage area of the storage device 5 is ensured. A new downloaded processing module is stored in the storage device 5.

FIG. 41A shows the list of items described in the module use log table 3003 in the module administration table 300. Items of the module use log are "module name", "module size", "use frequency", "storage state", and "assignment state". "Module name" is the name of a processing module. "Module size" is the capacity of the storage device 5, which is necessary to store the processing module. "Use frequency" is the number of times of use of the processing module in the mobile radio communication apparatus. "Storage state" is information representing the storage state of the processing module in the storage area. More specifically, if the processing module is stored, an address of the program memory 311 is described. If the processing module is not stored, the "storage state" is "NO". "Assignment state" is information representing whether the processing module is assigned to the program memory 311. If the processing module is assigned, the "assignment state" is "ON". If the processing module is not assigned, the "assignment state" is "OFF". A processing module whose resource assignment state is "OFF" is stored in the storage device 5 but not assigned to the program memory 311. A processing module to be deleted is selected from processing modules whose resource assignment states are "OFF". When all processing modules are assigned to the program memory 311, a processing module which to be deleted is deleted after assignment to the program memory 311 is canceled.

FIG. 41B shows a detailed example of contents of the module use log table 3003. In this example, "QPSK modulation", "correlator", "convolution coding", "PN coding", and "Walsh coding" are exemplified as module names. Module sizes are 10,200, 15,300, 12,900, 25,000, and 18,000 bytes. Use frequencies are 320, 230, 202, 23, and 98 times. Storage positions are 0x100, 0x400, 0x5000, 0x3000, and NO (0x represents hexadecimal notation). Assignment states are ON, ON, OFF, OFF, and OFF.

Figure 42:
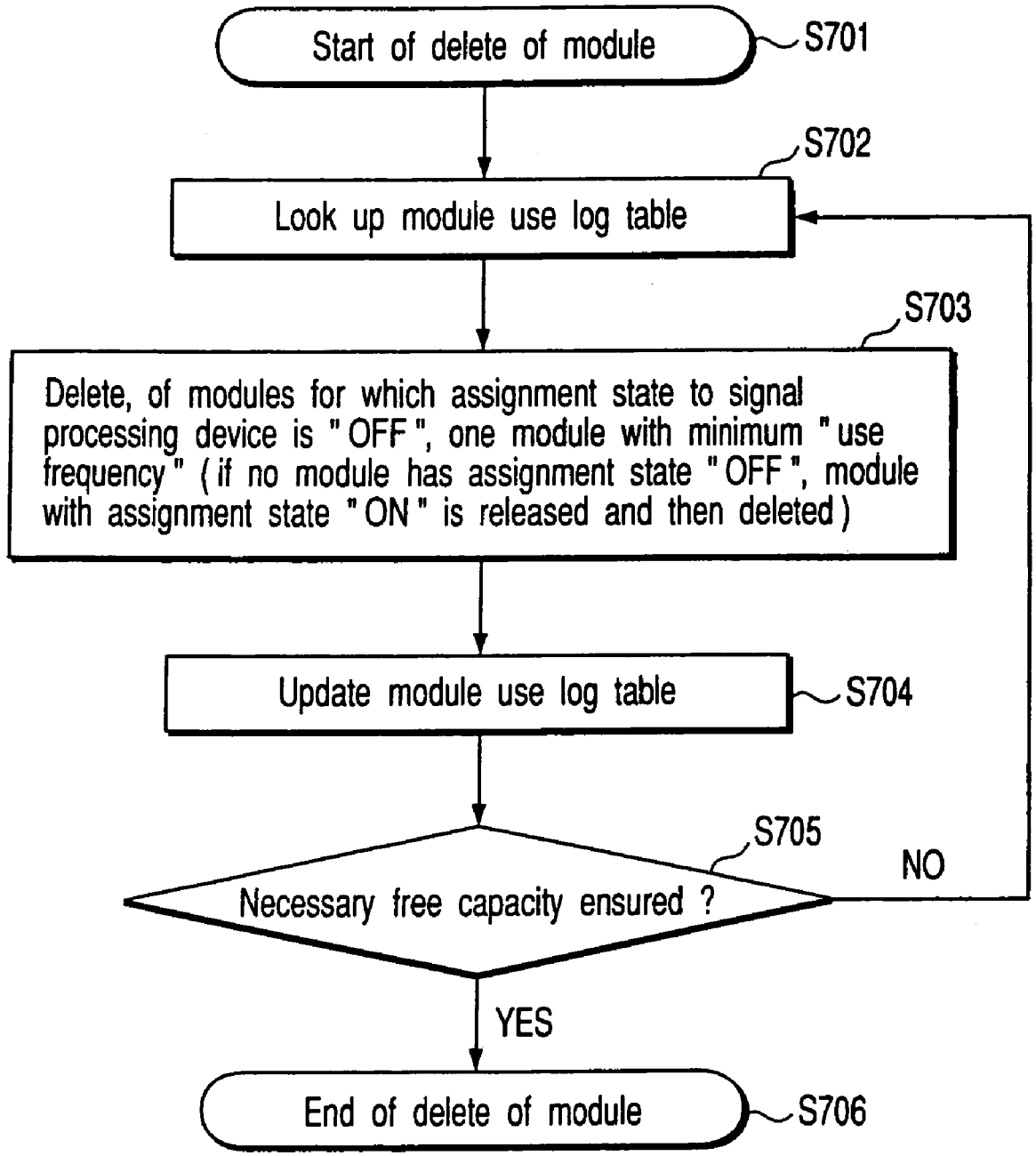
FIG. 42 is a flowchart illustrating a processing procedure for deleting unnecessary modules in the storage device shown in FIG. 40A with use of the module use log table presented in FIG. 41B.

A processing procedure of deleting an unnecessary processing module in the storage device 5 using use frequency information recorded in the module use log table 3003 shown in FIG. 41B will be described with reference to FIG. 42. This processing procedure is executed by the module manager 301. When module delete starts (step S701), "use frequency" in items recorded in the module use log table 3003 is looked up (step S702). With this looking up, a processing module with the minimum "use frequency" is detected from the processing modules with assignment state "OFF". A designation to delete that processing module from the storage device 5 is supplied to the resource controller 4. The resource controller 4 deletes the processing module for which delete is designated from the storage device 5 (step S703). The module manager 301 deletes the log information of the deleted processing module from the module use log table 3003 (step S704). The operation in steps S702 to S704 is repeated until it is determined in step S705 that a necessary free capacity is ensured.

For example, according to the example of contents of the module use log table 3003 shown in FIG. 41B, of "convolution coding", "PN coding", and "Walsh coding" which are processing modules with assignment state "OFF", "Walsh coding" has the minimum "use frequency". Hence, the processing module of "Walsh coding" is deleted. The log information of the processing module of "Walsh coding" is deleted from the module use log table 3003. When a necessary capacity is ensured in the storage device 5, delete of processing modules is ended (step S706). As a result, the contents of the module use log table 3003 shown in FIG. 41B are updated to those shown in FIG. 41C.

With this procedure, the module manager 301 deletes processing modules. Processing modules with high use frequencies, i.e., processing modules which will probably be used for the next processing are stored in the storage device 5. Since a processing module which will probably be used need not often be downloaded, the processing load on the mobile radio communication apparatus is reduced.

A case wherein the module use log table shown in FIGS. 43A to 43C is used will be described next. As shown in FIG. 43A that shows the list of items described in the module use log table 3003, the items of the module use log are the same as in FIG. 41A except that "use frequency" is replaced with "latest use date/time". More specifically, "latest use date/time" is a latest time stamp when a processing module read out from the storage device 5 is written in the program memory 311. As shown in FIG. 43B, the example of contents of the module use log table 3003 shown in FIG. 43B is the same as in FIG. 41B except that 2005/04/14, 2005/12/21, 2003/05/04, 2005/02/03, and 2005/08/14 are written as "latest use date/time".

Figure 44:
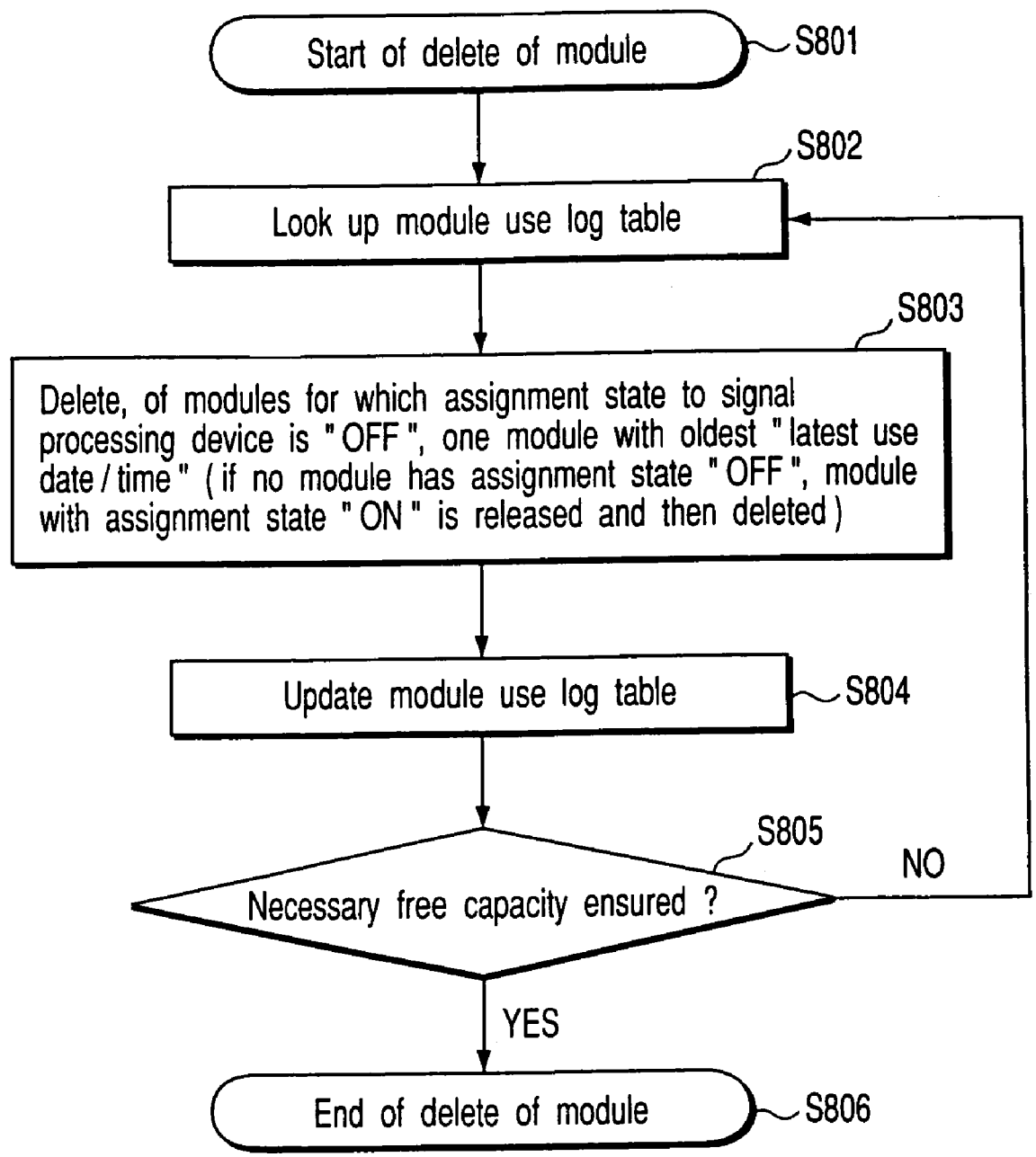
FIG. 44 is a flowchart illustrating a processing procedure for deleting unnecessary modules in the storage device shown in FIG. 40A with use of the module use log table presented in FIG. 43B.

A processing procedure of deleting an unnecessary processing module in the storage device 5 using latest use date/time information recorded in the module use log table 3003 shown in FIG. 43B will be described with reference to FIG. 44. This processing procedure is executed by the module manager 301. When module delete starts (step S801), "latest use date/time" in items recorded in the module use log table 3003 is looked up (step S802). With this looking up, a processing module with the oldest "latest use date/time" is detected from the processing modules with assignment state "OFF". A designation to delete that processing module from the storage device 5 is supplied to the resource controller 4. The resource controller 4 deletes the processing module for which delete is designated from the storage device 5 (step S803). The module manager 301 deletes the log information of the deleted processing module from the module use log table 3003 (step S804). The operation in steps S802 to S804 is repeated until it is determined in step S805 that a necessary free capacity is ensured in the storage device 5.

For example, according to the example of contents of the module use log table 3003 shown in FIG. 43B, of "convolution coding", "PN coding", and "Walsh coding" which are processing modules with assignment state "OFF", "convolution coding" has the oldest "latest use date/time". Hence, the processing module of "convolution coding" is deleted from the storage device 5. In addition, the log information of the processing module of "convolution coding" is deleted from the module use log table 3003. When a necessary capacity is ensured in the storage device 5, delete of processing modules is ended (step S806). As a result, the contents of the module use log table 3003 shown in FIG. 43B are updated to those shown in FIG. 43C.

With this procedure, the module manager 301 deletes processing modules. Processing modules with new latest use date/time, i.e., processing modules which will probably be used for the next processing are stored in the storage device 5. Since a processing module which will probably be used need not often be downloaded, the processing load on the mobile radio communication apparatus is reduced. Additionally, when the mobile radio communication apparatus is used by a user who frequently changes the use form, processing modules can be efficiently added or deleted in accordance with the use form.

A case wherein the module use log table shown in FIGS. 45A to 45C is used will be described next. As shown in FIG. 45A that shows the list of items described in the module use log table 3003, the items of the module use log are the same as in FIGS. 41A and 43A except that "use frequency" or "latest use date/time" are deleted.

A processing procedure of deleting an unnecessary processing module in the storage device 5 using module size information recorded in the module use log table 3003 shown in FIG. 45B will be described with reference to FIG. 46. This processing procedure is executed by the module manager 301. When module delete starts (step S901), "module size" in items recorded in the module use log table 3003 is looked up (step S902). With this looking up, a processing module with the largest "module size" is detected from the processing modules with assignment state "OFF". A designation to delete that processing module from the storage device 5 is supplied to the resource controller 4. The resource controller 4 deletes the processing module for which delete is designated from the storage device 5 (step S903). The module manager 301 deletes the log information of the deleted processing module from the module use log table 3003 (step S904). The operation in steps S902 to S904 is repeated until it is determined in step S905 that a necessary free capacity is ensured.

For example, according to the example of contents of the module use log table 3003 shown in FIG. 45B, of "convolution coding", "PN coding", and "Walsh coding" which are processing modules with assignment state "OFF", "Walsh coding" has the largest "module size". Hence, the processing module of "Walsh coding" is deleted from the storage device 5. In addition, the log information of the processing module of "Walsh coding" is deleted from the module use log table 3003. When a necessary capacity is ensured in the storage device 5, delete of processing modules is ended (step S906). As a result, the contents of the module use log table 3003 shown in FIG. 45B are updated to those shown in FIG. 45C.

When the module manager 301 deletes processing modules in accordance with the above procedure, processing modules each having assignment state "OFF" and large module size are sequentially deleted from the storage device 5. Hence, a necessary free storage area is ensured on the storage device 5. When a processing module having the largest size is deleted, an area equal to or more than the necessary storage area is ensured on the storage device 5 by one cycle of delete operation at a high probability. Hence, a minimum number of times of processing module delete operations suffice, and the processing load necessary for delete is reduced.

An arrangement in which a function of checking version information of each processing module to be used by the mobile radio communication apparatus and storing the information in the module use log table 3003 is added will be described next.

Figures 46, 47A, 47B:
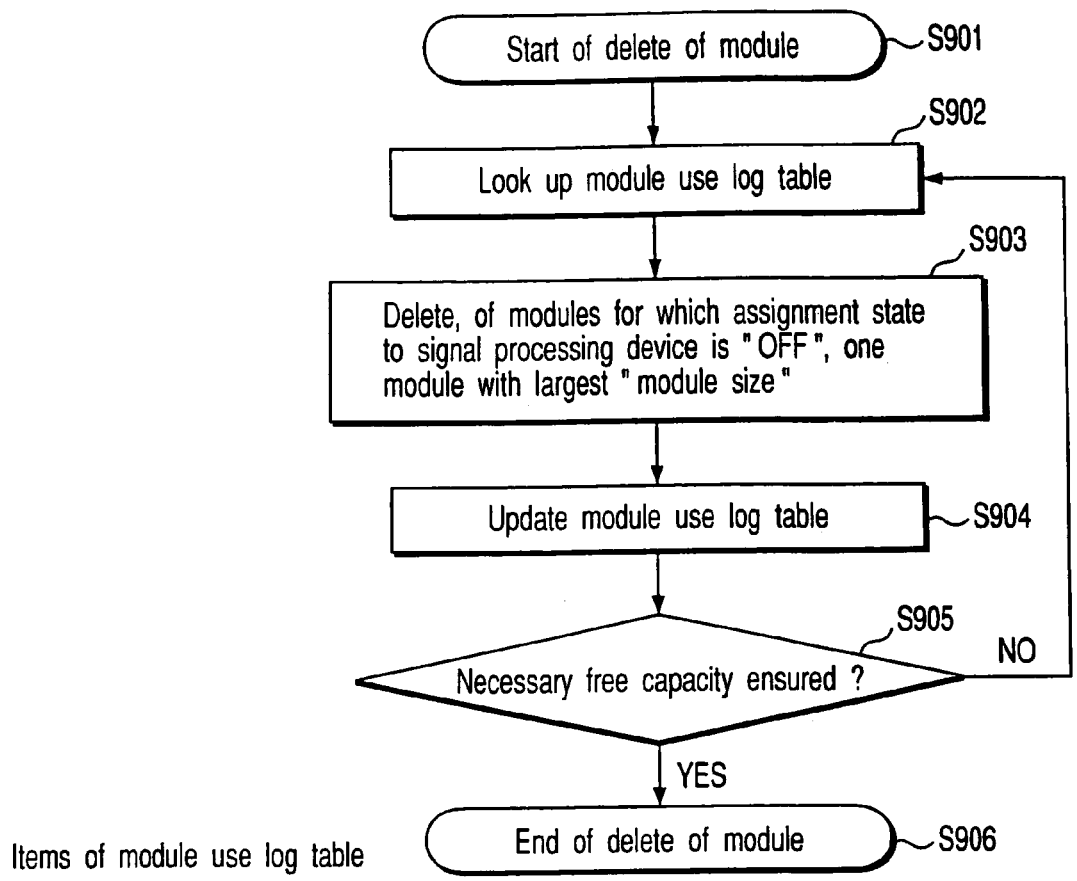
FIG. 46 is a flowchart illustrating a processing procedure for deleting unnecessary modules in the storage device shown in FIG. 40A with use of the module use log table presented in FIG. 45B.
FIG. 47A is a diagram showing another example of the list of items described in the module use log table shown in FIG. 40B.
FIG. 47B is a diagram showing an example of contents of the module use log table for each items presented in FIG. 47A.

As shown in FIG. 47A that shows the list of items described in the module use log table 3003, the items of the module use log are the same as in FIGS. 41A and 43A except that "use frequency" or "latest use date/time" is replaced with "version". "Version" is revision information of a processing module. For example, as shown in FIG. 47B, versions of "QPSK modulation", "correlator", "convolution coding", "PN coding", and "Walsh coding" are 2.1, 1.3, 3.1, 2.3, and 1.8.

Figure 48:
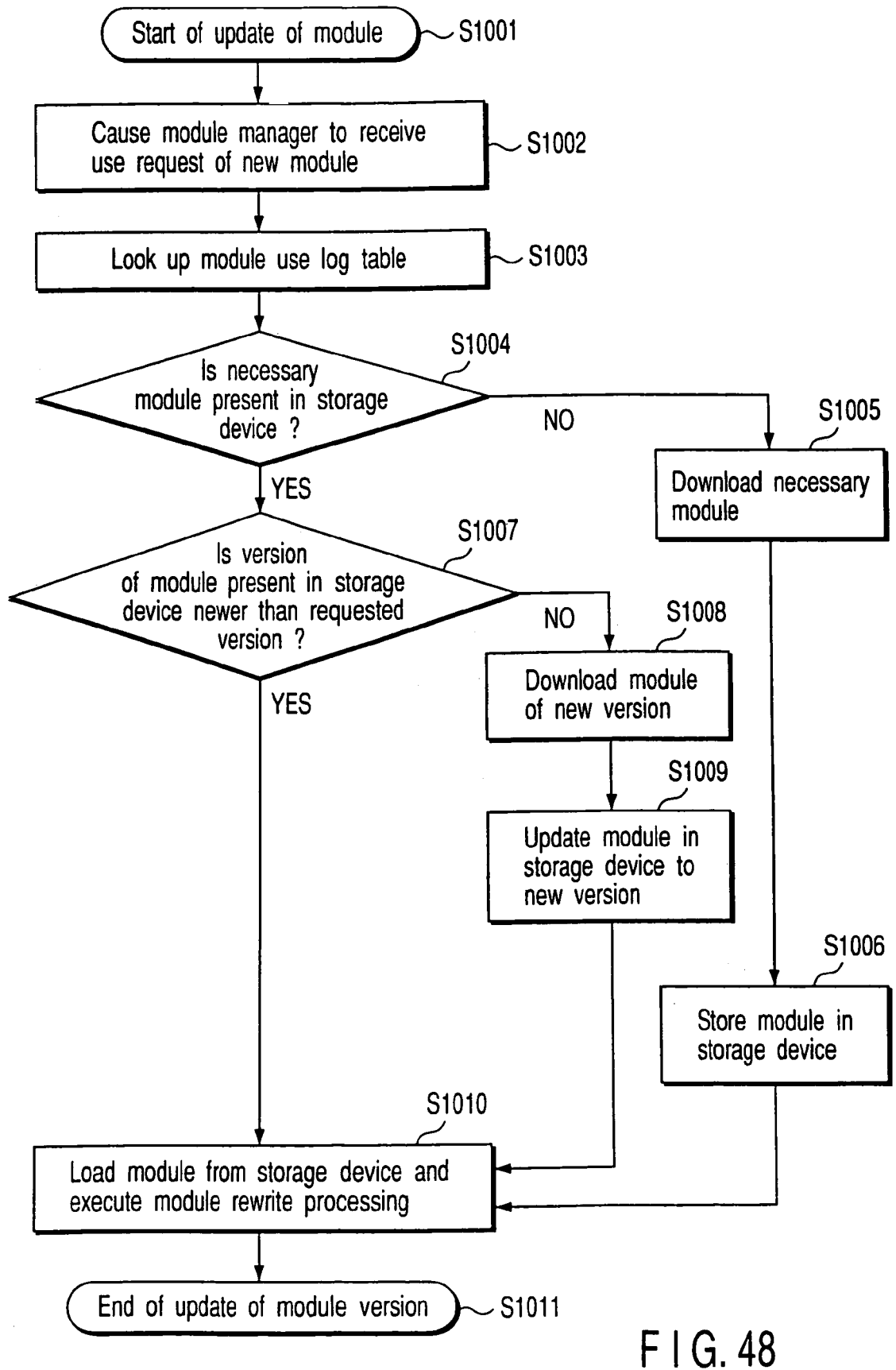
FIG. 48 is a flowchart illustrating a procedure for rewriting a module in the storage device shown in FIG. 40A with use of the module use log table presented in FIG. 43B.

A processing procedure of updating a module in the storage device 5 to a new version using version information shown in FIG. 47B will be described with reference to FIG. 48. When module update processing starts, and a module update request, i.e., a new processing module use request is input to the module manager 301 (steps S1001 and S1002), the module manager 301 looks up the contents of the module use log table 3003 in the module administration table 300 (step S1003) to check whether the necessary processing module is present in the storage device 5 (step S1004).

If the necessary processing module is not present in the storage device 5, a processing module of a necessary version is downloaded from a radio channel (step S1005) and stored in the storage device 5 (step S1006). The processing module of new version is newly stored in the storage device 5. Next, the module rewrite processor 302 writes necessary processing modules in the program memory 311, including the new processing module in the storage device 5 (step S1010).

If it is determined as a result of check in step S1004 that the necessary processing module is present in the storage device 5, the module manager 301 compares the version of the processing module in the storage device 5 with the version of the actually necessary processing module by looking up the module use log table 3003 (step S1007). As a comparison result, if the version of the processing module in the storage device 5 equals the version of the necessary processing module, the necessary processing module is loaded from the storage device 5 and written in the program memory 311 (step S1010).

If it is determined as a result of check in step S1007 that the version of the processing module stored in the storage device 5 is older, the processing module of the necessary version is downloaded from a radio channel (step S1008) and replaced with the processing module of the old version in the storage device 5 (step S1009). The processing module in the storage device 5 is updated to the processing module of new version. Next, the module rewrite processor 302 writes the necessary processing modules present in the storage device 5 in the program memory 311 (step S1010). When processing in step S1010 is executed, processing module version update processing is ended (step S1011).

In accordance with the example of contents of the module use log table 3003 shown in, e.g., FIG. 47B, consider a case wherein a convolution coding processing module which is not assigned to the program memory 311 is used. Assume that the necessary version of the convolution coding processing module is 4.0. The module manager 301 knows that the convolution coding processing module is stored in the storage device 5 by looking up the module use log table 3003. According to the module use log table 3003, the version of the convolution coding processing module stored in the storage device 5 is 3.1, i.e., older than the necessary version 4.0. The module manager 301 requests the wireless transmitter-receiver device 2 to download the convolution coding processing module of version 4.0. The convolution coding processing module of version 4.0 downloaded through the wireless transmitter-receiver device 2 is replaced with the old processing module and stored in the storage device 5. At the same time, the module use log table 3003 is updated. After that, the new processing module is assigned to the program memory 311. In this way, every time a processing module is used, the version of the necessary processing module and that of a processing module stored in the storage device 5 are compared. If the version of the processing module in the storage device 5 is older, the version is updated.

An example in which the user who uses the mobile radio communication apparatus selects a processing module to be deleted to ensure the free capacity of the storage device 5 by himself/herself will be described next. To allow the user to select a processing module to be deleted or to input a command for deleting the selected processing module by himself/herself, the display device 321 and input device 322 arranged in the input/output unit 7 are used. As the input device 322, a key input device such as a keyboard, cursor keys, or cross key, a touch panel installed on the display surface of the display device 321, or a pointing device is used. When the user sets a mode to ensure a free storage area in the storage device 5, the module names, module sizes, and current assignment states of processing modules currently held are displayed on the display device 321. The user can select and designate a processing module to be deleted by seeing the display. For this purpose, the module manager 301 has at least a function of managing the module use log table 3003 in the module administration table 300 and a function of extracting information of the module name, module size, and current assignment state of each processing module currently held by the storage device 5. The resource controller 4 has a function of displaying the pieces of information extracted by the module manager 301 on the display device 321 and a function of deleting a processing module to be deleted, which is designated by user's operation on the input device 322 in accordance with the display.

The module manager 301 has (a) a function of monitoring the presence/absence of a shortage of processing modules in the program memory 311, (b) a function of, when a shortage of processing modules occurs, controlling the order of exchanging processing modules in the program memory 311, determination whether a processing module is to be exchanged, and the exchange timing by looking up the module use log table 3003, and (c) a function of controlling delete and update of a processing module in the storage device 5. When a processing module assignment request is output from the module manager 301 to the module rewrite processor 302, the processor 302 writes, in the program memory 311, a processing module obtained by download through a radio channel or load from the storage device 5. When the signal processing procedure (processing module) which is thus written in the program memory 311 is executed by the DSP 310, a function realized by the written processing module is realized in the mobile radio communication apparatus.

Each module name in the module use log table 3003 has information of the file capacity of a corresponding processing module. The module manager 301 has a function of assigning a processing module to the program memory 311 or, when a processing module is exchanged, rewriting information of the assignment state of the processing module in the module use log table 3003 and grasping the current state by using the information of the file capacity. In accordance with this function, when a mode is set to manage the free capacity of the storage device 5, the module manager 301 acquires information to be displayed on the display device 321 by looking up the module use log table 3003. The resource controller 4 displays the information acquired by the module manager 301 on the display device 321 in a predetermined format.

An input operation result by the user from the input device 322 is recognized by the resource controller 4 serving as a CPU. On the basis of the recognition result, the resource controller 4 changes the mode to a selected mode, selects and specifies a module name, and deletes the processing module of the selected module name from the storage device 5.

The user can exchange a processing module by inputting a designation for selecting a desired radio communication system through the input device 322. When the user specifies use of a radio communication system, e.g., the system A through the input device 322, the specifying information is received by the resource controller 4. The module manager 301 knows the information of a processing module necessary in the specified system A from the module administration table 300 by looking up the module administration table 300, including the contents of the module use log table 3003. The module manager 301 knows the storage state of each processing module currently in use or the assignment state to the resource (program memory 311) of the signal processing device 3 from the information in the module administration table 300. If the absence of a processing module is recognized, the module manager 301 generates a download request about the absent processing module. The download request is sent from the resource controller 4 to the base station through the wireless transmitter-receiver device 2. In the base station, the processing module indicated by the received download request is read out from the server and transmitted to the mobile radio communication apparatus as a request source.

The processing module transmitted from the base station to the mobile radio communication apparatus is received by the wireless transmitter-receiver device 2 and transferred to the resource controller 4. The thus received, i.e., downloaded processing module is temporarily held by the download buffer 303 by the resource controller 4. At this time, the free capacity of the storage device 5 is checked by the resource controller 4. As a check result, if a capacity enough to store the processing module held by the download buffer 303 is present, the processing module is read out from the download buffer 303 and stored in the storage device 5. Accordingly, the module manager 301 updates the contents of the module use log table 3003.

If it is found by check that the storage device 5 has no sufficient free capacity, the module manager 301 deletes other processing modules stored in the storage device 5 to ensure a storage area. After that, the processing module read out from the download buffer 303 is held by the storage device 5. That is, if the free capacity of the storage device 5 is too small, or if a free capacity ensuring request is generated, the module manager 301 extracts information of all processing modules held by the storage device 5 by looking up the contents of the module use log table 3003. On the basis of the information, the module manager 301 controls the display device 321 to display the list of the module names, module sizes, and states (current use states) of the processing modules. On the basis of this display, the user can know the module names and capacities of the processing modules currently held by the storage device 5 and whether each processing module is being used. From this display, the user searches for processing modules that are not being used, i.e., that have assignment state "OFF". When processing modules with assignment state "OFF" are found, the user selects a desired module using the input device 322 and designates to delete the selected processing module. In accordance with this designation, the resource controller 4 deletes the corresponding processing module in the storage device 5. In addition, the module manager 301 deletes information related to the deleted processing module from the module use log table 3003.

Figure 49:
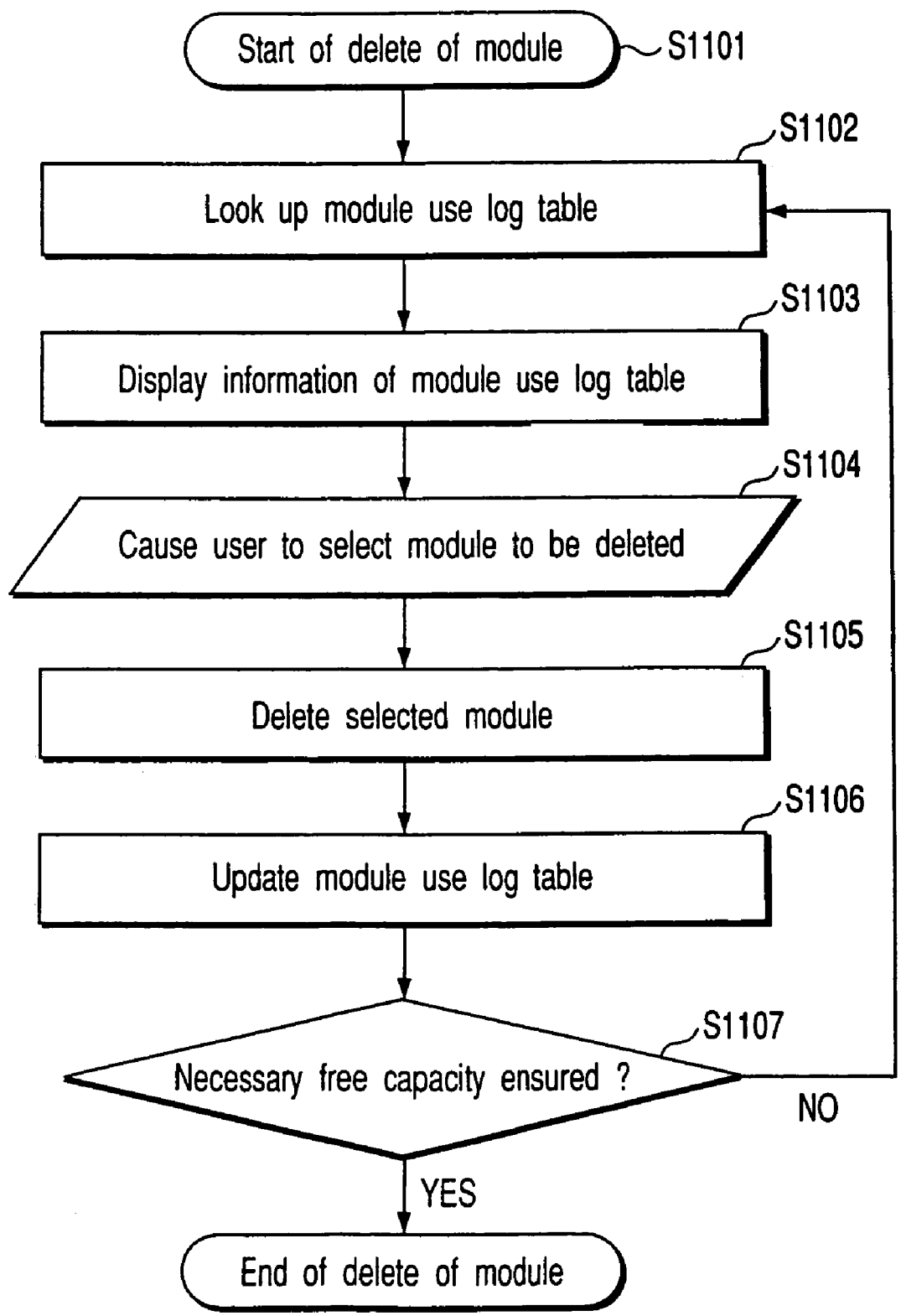
FIG. 49 is a flowchart illustrating a processing procedure in which the mobile radio communication apparatus according to the tenth embodiment is used by a user, so as to designate an unnecessary module and delete the module.

The flow of the above processing will be described with reference to FIG. 49. When the user specifies an unnecessary processing module delete mode by operating, e.g., the input device 322, the module manager 301 executes processing shown in FIG. 49. When module delete starts (step S1101), the module manager 301 looks up the module use log table 3003 (step S1102) to extract necessary information from pieces of information recorded in the table 3003 and display the extracted information on the display device 321 (step S1103). The user selects and specifies a processing module to be deleted from the display contents by operating the input device 322 (step S1104). The module manager 301 deletes the selected and specified processing module from the storage device 5 (step S1105).

FIGS. 50A and 50B show detailed examples of a list of items described in the module use log table 3003 and the contents of the table 3003, as in the above examples. FIG. 50C shows an example of a log information display window on the display device 321 in step S1103. In the example of the display window, the module names, sizes, and current states of processing modules currently stored in the storage device 5 are displayed. "State" represents whether a processing module is being used in the mobile radio communication apparatus. For a processing module that is not in use, "-" is displayed.

A processing module to be deleted is specified by inputting a number representing the name of the module to be deleted on the lowermost column of the display window shown in FIG. 50C using the input device 322. After that, when confirmation designating operation is executed, the module rewrite processor 302 controlled by the resource controller 4 deletes the specified processing module from the storage device S. As a processing module to be deleted, one of processing modules with assignment state "OFF" is preferably designated. If there is no processing module with assignment state "OFF", a module is appropriately selected from processing modules with assignment state "ON". The processing module is released and then deleted.

When the specified processing module is deleted in this above way, the module manager 301 updates the contents of the module use log table 3003 (step S1106). Operations in steps S1102 to S1106 are repeated until it is determined in step S1107 that a necessary free capacity is ensured in the storage device 5. When the necessary free capacity is ensured, processing module delete is ended (step S1108).

In this manner, pieces of information related to processing modules stored in the storage device 5 are displayed on the display device 321. When the user of the mobile radio communication apparatus selects a processing module to be deleted by himself/herself by looking up the displayed information, the signal processing function of the signal processing device 3 can be selected. Hence, the mobile radio communication apparatus can be customized to a function adapted to the user's use form.

In the above description, a processing module necessary in the mobile radio communication apparatus is supplied by download from a radio channel, i.e., from the network side through the base station. Alternatively, as shown in FIG. 40A, the large-capacity external storage device 9 may be connected to the mobile radio communication apparatus through the interface 8 to load a necessary processing module from the external storage device 9 to the storage device 5 in the mobile radio communication apparatus. With this arrangement, when an absent processing module or a processing module of a new version is necessary, the mobile radio communication apparatus can download it from a route other than a radio channel. In addition, when processing modules stored in the storage device 5 are transferred to and held by the external storage device 9, important processing modules can be backed up. As the external storage device 9, for example, a semiconductor memory card, hard disk drive, MO (magnetooptical disk drive), CD-ROM drive, CD-R/RW drive, or DVD drive can be used.

In the above description, a processing module in the storage device 5 is deleted using one of a plurality of items (e.g., use frequency, latest use date/time, and module size) recorded in the module use log table 3003 as a reference. Alternatively, the user of the mobile radio communication apparatus may select an arbitrary item to be used as a reference for processing module delete from the plurality of recorded items by himself/herself. In this case, processing modules can be managed by the user himself/herself in accordance with various use forms.

(11th Embodiment)

FIG. 51 shows a mobile radio communication apparatus according to the 11th embodiment of the present invention. In the following embodiment, for the simplicity, assume that, e.g., two radio communication systems (systems A and B) provide services, and the mobile radio communication apparatus can use an arbitrary one of the systems A and B. The systems A and B are radio communication systems provided by telecommunications carriers A and B. The mobile radio communication apparatus shown in FIG. 51 can use one telephone directory as telephone directory files having formats dedicated to application software unique to each of the systems A and B.

A signal processing device 3 has a DSP 410 and execution file storage section 411 which stores modulation/demodulation execution files (processing modules) that can be directly executed by the DSP 410. A resource controller 4 has a CPU 401 and RAM 402 which records the current management situation of the resource of the signal processing device 3. An input/output unit 7 includes a display for displaying various pieces of information for the user and an input device such as a keyboard or cursor keys which are used by the user for operation/input.

A storage device 5 stores an execution file 501 and unique telephone number file 503 for a speech communication management system A, an execution file 502 and unique telephone number file 504 for a speech communication management system B, a common telephone number file 510, a translator A 511, and translator B 512.

The unique telephone number file 503 for the speech communication management system A is described in a file format usable only in the speech communication management system A. Similarly, the unique telephone number file 504 for the speech communication management system B is described in a file format usable only in the speech communication management system B. Hence, each of the unique telephone number files 503 and 504 cannot be used in another speech communication management system.

The common telephone number file 510 is a telephone directory file (telephone number list file) described in a common file format, e.g., a text file format, unlike the unique telephone number files 503 and 504 for the systems A and B. Use of the application software in the mobile radio communication apparatus is not allowed even using the file 510.

The execution files 501 and 502 for the speech communication management systems A and B are application software for management related to speech communication and have the following functions. The execution files 501 and 502 display or search for and display telephone number lists registered in the unique telephone number files 503 and 504 serving as telephone directories for the speech communication management systems A and B by looking up the files 503 and 504, respectively. When a desired telephone number is selected and specified from the displayed telephone numbers by user operation, the execution file 501 or 502 dials the telephone number. The execution files 501 and 502 can also add a telephone number that the user wants to add to the telephone directory or delete an unnecessary telephone number. These application software programs have a function of, when the radio communication system is switched, or the unique telephone number file 503 or 504 is changed, controlling to convert the file using the translator and update the contents.

The translator A 511 and translator B 512 are software programs for converting a file format. The translator A 511 and translator B 512 are used to convert the common telephone number file 510 serving as a common list file into a list file unique to an application used in a radio communication system defined by a modulation/demodulation execution file or vice versa. More specifically, the translator A 511 has a function of converting the list file unique to the application software for the system A into the common telephone number file 510, and the common list file into the list file unique to the application software for the system A. The translator B 512 has a function of converting the list file unique to the application software for the system B into the common telephone number file 510, and the common list file into the list file unique to the application software for the system B.

An example of operation of this embodiment will be described. Assume that the mobile radio communication apparatus is operating as a terminal accommodated in the system A. In this state, the modulation/demodulation execution file (processing module) executed by the DSP 410 corresponds to the system A. The file is stored in the execution file storage section 411. At this time, that the DSP 410 is executing the modulation/demodulation execution file (processing module) corresponding to the system A is recorded in the RAM 402 by the CPU 401. The user uses the speech communication management system A dedicated to the system A through the input/output unit 7. Hence, the execution file 501 for the speech communication management system A, which is stored in the storage device 5, is loaded into the resource controller 4 and executed by the CPU 401.

Assume that the user inputs a request for displaying a menu list "telephone directory A" serving as a list of telephone numbers of frequent data communication partners (i.e., a telephone number list based on the unique telephone number file 503 for the speech communication management system A) on the display through the input/output unit 7. At this time, the CPU 401 in the resource controller 4 reads out the contents of the unique telephone number file 503 for the speech communication management system A, which are loaded from the storage device 5 into the resource controller 4, and displays the readout contents on the display device in the input/output unit 7.

After a call is made by referring to the display of the telephone number file on the display device or when a call is received, the user can add telephone number information to be newly added to the menu list. The new telephone number information to be added is first written in the unique telephone number file 503 for the speech communication management system A, which is loaded into the resource controller 4. Next, when the user has completed use of the speech communication management system A, the CPU 401 which is executing the execution file 501 for the speech communication management system A stores the rewritten unique telephone number file 503 for the speech communication management system A in the storage device 5.

According to this embodiment, the telephone number information in the rewritten unique telephone number file 503 for the speech communication management system A is managed after converted into the format of the common telephone number file 510 by the translator A 511 stored in the storage device. Hence, the modulation/demodulation execution file which is being executed by the DSP 410 is converted from a file format corresponding to the system A into a file format corresponding to the system B. For this reason, the telephone number information can be used even when another speech communication management system is used.

More specifically, when the user has completed use of the speech communication management system A (application software, i.e., the execution file 501 for the speech communication management system A) or when the modulation/demodulation execution file which is being executed by the DSP 410 is converted from the file format corresponding to the system A to the file format corresponding to the system B and the RAM 402 is rewritten, the CPU 401 executes the translator A 511. The unique telephone number file 503 for the speech communication management system A is converted into the common file format by the translator A 511. The common telephone number file 510 is overwritten by the converted file.

Figure 52:
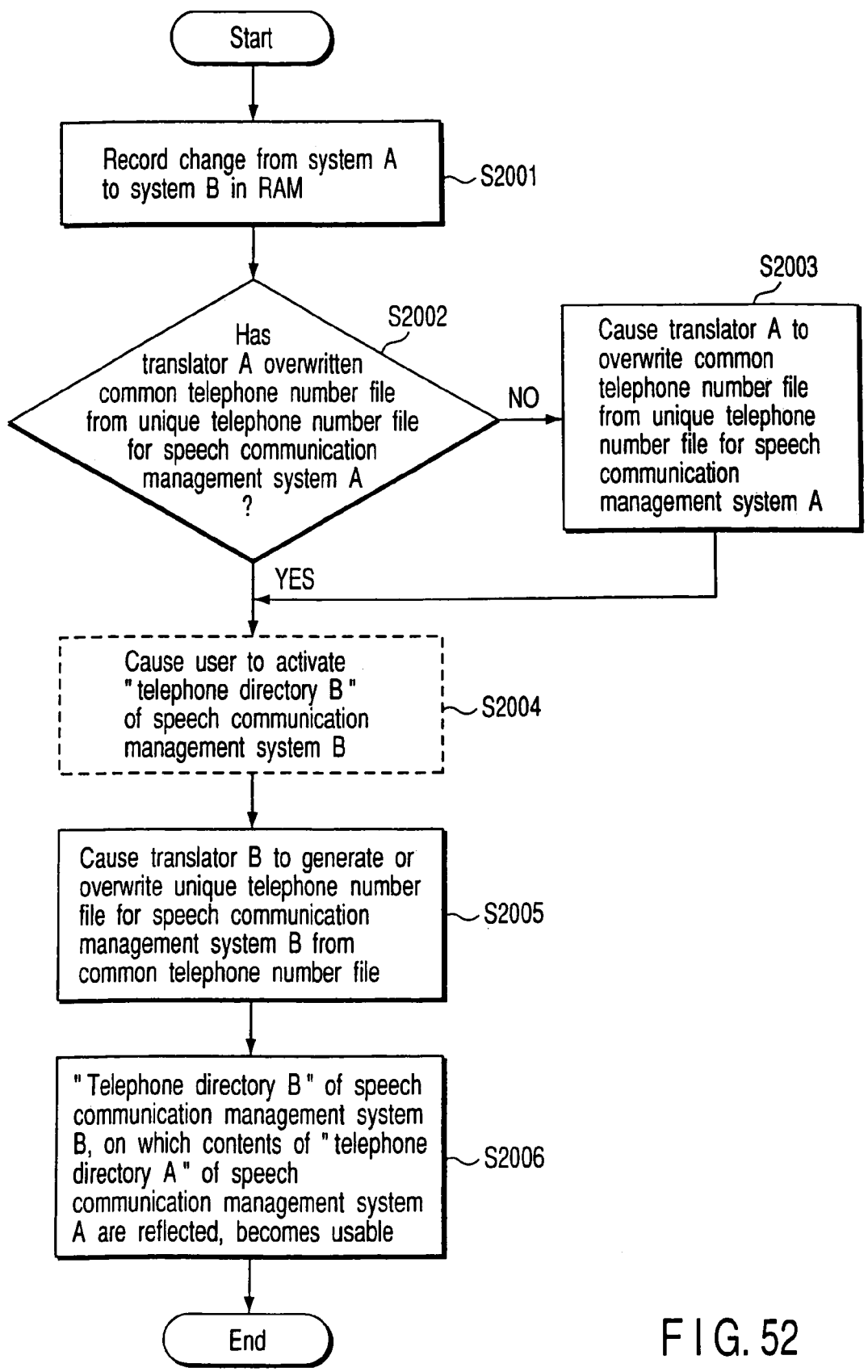
FIG. 52 is a flowchart illustrating the processing procedure in the eleventh embodiment.

The flow of this processing will be described below with reference to FIG. 52. In the initial state, assume that the user who is carrying the mobile radio communication apparatus is located in the service area of the system A, and the mobile radio communication apparatus is functioning as a terminal adapted to the system A. When the user moves, and the distance between the system A and the base station increases, the reception field strength of the mobile radio communication apparatus becomes small. This makes it difficult to make the mobile radio communication apparatus function as a terminal of the system A. At this time, assume that the user is located in the service area of the system B, and the mobile radio communication apparatus can ensure a sufficient reception field strength for a base station in the system B.

The mobile radio communication apparatus has a mechanism capable of switching the radio communication system to be used by monitoring whether a communication channel can be ensured between the apparatus and a radio communication system using a pilot radio channel that connects the base stations of the systems A and B. Hence, the mobile radio communication apparatus cannot maintain the channel to the system A anymore and can instead know that a channel to the system B can be ensured. At this time, the resource controller 4 changes the modulation/demodulation execution file executed by the DSP 410 to the file corresponding to the system B, which is stored in the execution file storage section 411. This change is recorded in the RAM 402 (step S2001)

Before this time, it is checked whether the common telephone number file 510 is overwritten by the translator A 511 in accordance with the lately updated unique telephone number file 503 for the speech communication management system A (step S2002). If the common telephone number file 510 is not overwritten, the resource controller 4 executes the translator A 511. Then, the unique telephone number file 503 for the speech communication management system A is converted into the common file format, and the common telephone number file 510 is overwritten by the converted file (step S2003). After that, processing advances to step S2004. As a result of the check in S2002, when the file is overwritten, processing advances to step S2004. Processing in step S2004 is not always necessary. In step S2004, the user activates "telephone directory B" of the speech communication management system B.

In step S2005, the translator B 512 is activated. The translator B 512 converts the file format of the common telephone number file 510 into the file format of the unique telephone number file 504 for the speech communication management system B. Thus, the unique telephone number file 504 for the speech communication management system B is generated or overwritten.

As described above, the unique telephone number files 503 and 504 for the speech communication management systems A and B are described in file formats which can be used only in the speech communication management systems A and B, respectively. When the contents of the file 503 or 504 change, the changed file is temporarily converted into the common file format and stored as the common telephone number file 510. When the radio communication system used by the mobile radio communication apparatus is changed, the common telephone number file 510 is converted to allow use under the changed radio communication system. That is, even when the contents of the file 503 or 504 have been changed before the change in radio communication system used by the mobile radio communication apparatus, a file on which the change has been reflected can be used under another radio communication system to be used next by the mobile radio communication apparatus.

Hence, the user can reflect the unique telephone number file 503 for the speech communication management system A, which has been changed in the system A, on the unique telephone number file 504 for the speech communication management system B after the shift to the system B. For this reason, the "telephone directory B" on which the change has been reflected can be used (step S2006). That is, when the menu list "telephone directory B", i.e., the list of telephone numbers that are frequently used in the speech communication management system B used only in the system B is displayed, the contents of the menu list "telephone directory A" updated in the speech communication management system A used in the system A can be directly used. With this arrangement, the user need not individually manage data for different radio communication systems and can use his/her latest telephone directory independently of the radio communication system.

In the above description, the unique telephone number files 503 and 504 for the speech communication management systems A and B are present on the storage device 5. However, these files 503 and 504 may be temporary files generated on a memory in the resource controller 4 as needed.

(12th Embodiment)

In a mobile radio communication apparatus according to the 12th embodiment of the present invention shown in FIG. 53, execution files 601 and 602 for the Web browsers A and B, unique URL (Uniform Resource Locators) files 603 and 604 for the Web browsers A and B, a common URL file 610, translators A 611 and B 612 are stored in a storage device 5. The execution files 601 and 602 are Web browsing software programs unique to the systems A and B used only in the systems A and B, respectively, i.e., application software programs for displaying the contents of a data file of a WWW page. The execution files 601 and 602 are loaded to a resource controller 4 and executed by the controller 4 to embody their function. The unique URL files 603 and 604 are favorite URL information list files described in unique file formats used by the execution files 601 and 602 for the Web browsers A and B, respectively. To the contrary, the common URL file 610 is described in a predetermined common file format.

Translators A 611 and B 612 are application software programs each for converting the file format of the common URL file 610 into that of a list file unique to browsing software used in a radio communication system defined by a modulation/demodulation execution file or vice versa. The translator A 611 has a function of converting the unique URL file 603 for the Web browser A, which is a list file unique to browsing application software for the system A into the common list file, and the common list file into the unique URL file 603 for the Web browser A. The translator B 612 has a function of converting the unique URL file 604 for the Web browser B, which is a list file unique to browsing application software for the system B into the common list file, and the common list file into the unique URL file 604 for the Web browser B. These unique URL files 603 and 604 are loaded to the resource controller 4 and executed by the controller 4, thereby realizing their functions.

As described above, the unique URL file 603 for the Web browser A is described in a file format which can be used in only the Web browser A. The unique URL file 604 for the Web browser B is described in a file format which can be used in only the Web browser B. Hence, in the Web browser A, no Web page address can be specified unless a URL file described in the dedicated file format is used. Similarly, in the Web browser B, no Web page address can be specified unless a URL file described in the dedicated file format is used. According to this embodiment, a URL file is stored in a format of a common list file. When a radio communication system used by the mobile radio communication apparatus is changed, the format of the common list file is converted into a format for the changed radio communication system by a translator. The URL information of a Web page can be used on the browser using the converted URL file.

An example of operation of this embodiment will be described. Assume that the mobile radio communication apparatus is operating as a terminal accommodated in the system A. In this state, the modulation/demodulation execution file (processing module) executed by a DSP 410 corresponds to the system A. The file is stored in an execution file storage section 411. When a signal processing procedure complying with the modulation/demodulation execution file is executed by the DSP 410, the function realized by the execution file is realized in the mobile radio communication apparatus.

The Web browser usable by the user through an input/output unit 7 at this time is the Web browser A used in only the system A. Under the control of the resource controller 4 which is recognizing that the mobile radio communication apparatus is operating under the system A, the execution file 601 for the Web browser A, which is stored in the storage device 5, is loaded into the resource controller 4 and executed by a CPU 401, thereby making browsing by the Web browser A possible. In the Web browser A, a direct selection function for a registered Web page address unique to the Web browser A is prepared by the unique URL file 603 for the Web browser A.

When the user wants to browse a Web page which is often browsed on the window of the Web browser A and performs predetermined operation on the input/output unit 7, the Web browser A looks up the unique URL file 603 for the Web browser A and displays the favorite menu list (URL information list of favorite URLs) in the Web browser A. The user selects and specifies a desired Web page from the displayed favorite menu list on the input/output unit 7. Then, the resource controller 4 controls a signal processing device 3 to cause the DSP 410 to generate the URL information of the Web page. The URL information is transferred to a wireless transmitter-receiver device 2 and transmitted to the base station in the system A. The base station accesses a Web site indicated by the URL information on the Internet through an Internet provider to read out Web page information. The readout Web page information is transmitted from the base station to the mobile radio communication apparatus through a reverse path.

In the mobile radio communication apparatus, the received Web page information is sent to the signal processing device 3 through the wireless transmitter-receiver device 2, processed by the DSP 410, and transferred to the resource controller 4. The resource controller 4 displays the received Web page information on the screen of the display device in the input/output unit 7 by processing of the Web browser A by the CPU 401.

In this way, the user can browse a favorite Web page by simple operation. Assume that the user found a new interesting Web page while browsing Web pages. The user can add the URL information of the found Web page to the favorite menu list. In this case, the user performs registration operation to the favorite menu list. In the resource controller 4, the CPU 401 which is executing the Web browser A additionally describes the new URL information to be registered in the execution file 602 for the Web browser B loaded in the resource controller 4. After that, when the user ends use of the Web browser A, the CPU 401 stores the rewritten unique URL file 603 for the Web browser A in the storage device 5. With this operation, the unique URL file 603 for the Web browser A stored in the storage device 5 is updated.

The thus updated unique URL file 603 for the Web browser A in the storage device 5 has a file format dedicated to the Web browser A and therefore cannot be referred to or updated by the Web browser B. The unique URL file 603 for the Web browser A is converted into a file having a common file format and stored in the storage device 5 as the common URL file 610.

According to this embodiment, the URL information of the rewritten unique URL file 603 for the Web browser A is converted into the format of the common URL file 610 by the translator A 611 stored in the storage device 5 and managed. Hence, even when the modulation/demodulation execution file which is being executed by the DSP 410 is changed from a file corresponding to the system A to a file corresponding to the system B and the Web browser B is used, the URL information can be used.

More specifically, when the user completes use of the Web browser A, or when the modulation/demodulation execution file which is being executed by the DSP 410 is converted into a file format corresponding to the system A into a file format corresponding to the system B and a RAM 402 is rewritten, the CPU 401 executes the translator A 611. The unique URL file 603 for the Web browser A is converted into a common file format by the translator A 611. The common URL file 610 is overwritten by the converted file.

Figure 54:
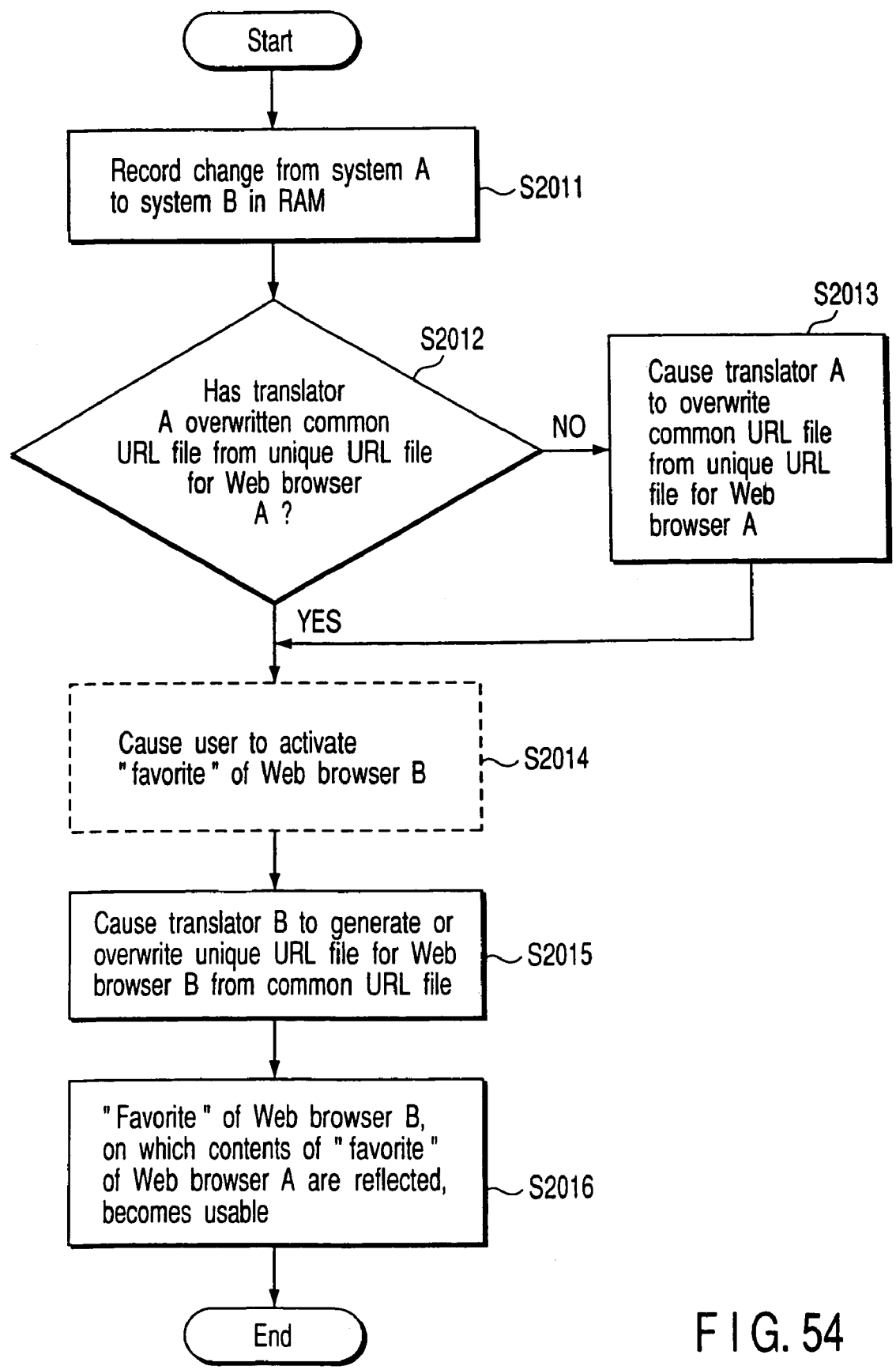
FIG. 54 is a flowchart illustrating the processing procedure in the twelfth embodiment.

The flow of this processing will be described below with reference to FIG. 54. In the initial state, assume that the user who is carrying the mobile radio communication apparatus is located in the service area of the system A, and the mobile radio communication apparatus is functioning as a terminal adapted to the system A. At this time, the resource controller 4 changes the modulation/demodulation execution file executed by the DSP 410 to the file corresponding to the system B, which is stored in the execution file storage section 411, and this change is recorded in the RAM 402 (step S2011). When the user moves, and the distance between the system A and the base station increases, the reception field strength of the mobile radio communication apparatus becomes small. This makes it difficult to make the mobile radio communication apparatus function as a terminal of the system A. At this time, assume that the user is located in the service area of the system B, and the mobile radio communication apparatus can ensure a sufficient reception field strength for a base station in the system B. The mobile radio communication apparatus cannot maintain the channel to the system A anymore and can instead know that a channel to the system B can be ensured, as described above.

Before this time, it is checked whether the common URL file 610 is overwritten by the translator A 611 in accordance with the lately updated unique URL file 603 for the Web browser A (step S2012). If the common URL file 610 is not overwritten, the resource controller 4 executes the translator A 611. Then, the unique URL file 603 for the Web browser A is converted into the format of the common URL file 610, and the common URL file 610 is overwritten by the converted file (step S2013). After that, processing advances to step S2014. Processing in step S2014 is not always necessary. In step S2014, the user activates "favorite" of the Web browser B by himself/herself.

In step S2015, the translator B 612 is activated. The translator B 612 converts the file format of the common URL file 610 into the file format of the unique URL file 604 for the Web browser B. Thus, the URL file 604 is generated or overwritten.

As described above, the unique URL files 603 and 604 for the Web browsers A and B are described in file formats which can be used only in the Web browsers A and B, respectively. Hence, the Web browser A cannot specify a Web page unless the unique URL file described in the file format dedicated to the Web browser A is used. Similarly, the Web browser B cannot specify a favorite Web page even when it is found and registered in the file unless the unique URL file described in the file format dedicated to the Web browser B is used. According to this embodiment, a unique URL file is converted into the common URL file 610 having a common file format and stored. The common URL file 610 is also converted into a file format corresponding to a Web browser to be used. With this procedure, the URL file can be used in the Web browser. Thus a Web page list based on a unique URL file for a specific Web browser can be used. The user who shifts from the system A to the system B requires the unique URL file 604 for the Web browser B to display the favorite menu list in the Web browser B which is used only in the system B. According to this embodiment, the unique URL file 604 for the Web browser B, on which the changed contents are reflected, can be obtained by file format conversion. For this reason, when the favorite menu list is displayed, the contents of the favorite menu list updated in the Web browser A used in the system A can be directly reflected (step S2016). With this arrangement, the user need not individually manage data for different radio communication systems, resulting in a large increase in convenience.

In the above description, the unique URL files 603 and 604 for the Web browsers A and B are present on the storage device 5. However, these files 603 and 604 may be temporary files generated on a memory in the resource controller 4 as needed.

(13th Embodiment)

Figure 55:
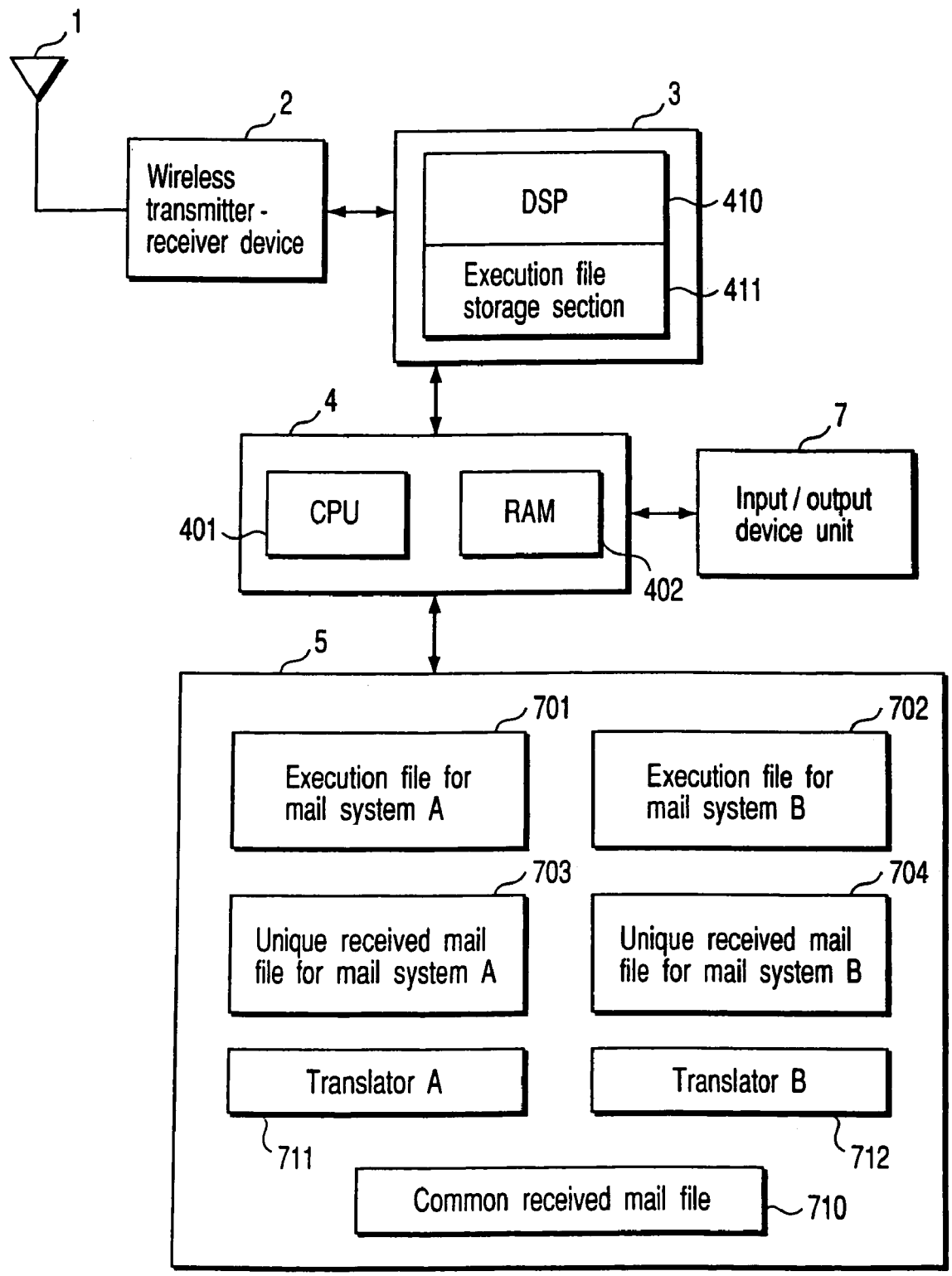
FIG. 55 is a block diagram showing an example of the structure of a mobile radio communication apparatus according to the thirteenth embodiment of the present invention.

In a mobile radio communication apparatus according to the 13th embodiment of the present invention shown in FIG. 55, execution files 701 and 702 for mail systems A and B, unique received mail files 703 and 704 for the mail systems A and B, a common received mail file 710, and translators A 711 and B 712 are stored in a storage device 5. The execution files 701 and 702 are mail systems unique to systems A and B used in only the systems A and B, respectively, i.e., mailing software programs used for e-mail transmission/reception. The execution files 701 and 702 are loaded to a resource controller 4 and executed by the controller to realize the mailing function. The mail files 703 and 704 are received mail files described in unique file formats used by the execution files 701 and 702, respectively. To the contrary, the common received mail file 710 is described in a predetermined common file format.

Translators A 711 and B 712 are file conversion application software programs each for converting the file format of the common received mail file 710 into that of a unique received mail file having a file format unique to the mail system used in a radio communication system defined by a modulation/demodulation execution file or vice versa. The translator A 711 has a function of converting the unique received mail file 703 for the mail system A, which is a received mail file unique to mailing application software for the system A into the file format of the common received mail file 710 having a common file format. The translator B 712 has a function of converting the common received mail file 710 into the unique received mail file 703 for the mail system A. These files 703 and 704 are loaded to the resource controller 4 and executed by the controller 4, thereby realizing their functions.

As described above, the unique received mail file 703 for the mail system A is described in a file format dedicated to application software which can be used in only the mail system A. The unique received mail file 704 for the mail system B is described in a file format dedicated to application software which can be used in only the mail system B.

The operation of this embodiment will be described. Assume that the mobile radio communication apparatus is operating as a terminal accommodated in the system A. In this state, the modulation/demodulation execution file (processing module) executed by a DSP 410 corresponds to the system A and is stored in an execution file storage section 411. When a signal processing procedure complying with the modulation/demodulation execution file is executed by the DSP 410, the function realized by the execution file is realized in the mobile radio communication apparatus.

The mail system used by the user through an input/output unit 7 at this time is the mail system A dedicated to the system A. The execution file 701 for the mail system A, which is stored in the storage device 5, is loaded into a memory (not shown) in the resource controller 4 and executed by a CPU 401 in the resource controller 4, thereby making the mail system A usable.

The user inputs a request for displaying a menu list "received mail" serving as a list of received mail messages addressed to himself/herself and stored in the storage device 5 on the display through the input/output unit 7. Upon receiving this request, the CPU 401 displays the contents of the unique received mail file 703 for the mail system A, which are loaded from the storage device 5 into the resource controller 4, on the display device in the input/output unit 7. Hence, the user can browse the received mail messages and return messages to them. If newly received mail is present, it can be added to the list. In this case, the CPU 401 additionally describes the contents of the newly received mail in the unique received mail file 703 for the mail system A, which is loaded to the memory (not shown) in the resource controller 4. After that, when the user ends use of the mail system A, the CPU 401 stores the rewritten unique received mail file 703 for the mail system A in the storage device 5.

According to this embodiment, even when the mobile radio communication apparatus shifts to another radio communication system, the file format is converted to make the previous received mail file usable. That is, even if the mobile radio communication apparatus shifts to the system B, the contents of mail received by the mail system A dedicated to the system A and stored in the unique received mail file 703 for the mail system A when the mobile radio communication apparatus was using the system A are made usable in the mail system B dedicated to the system B. For this purpose, when the unique received mail file 703 for the mail system A is updated or the mobile radio communication apparatus shifts to the system B, the unique received mail file 703 is converted into the format of the common received mail file 710 by the translator A 711 stored in the storage device 5 and managed by the common received mail file 710.

More specifically, when the user completes use of the mail system A, or when the modulation/demodulation execution file which is being executed by the DSP 410 is converted into a file corresponding to the system A into a file corresponding to the system B and a RAM 402 is rewritten, the CPU 401 executes the translator A 711. The unique received mail file 703 for the mail system A is converted into a common file format by the translator A 711. The common received mail file 710 is overwritten by the converted file.

Figure 56:
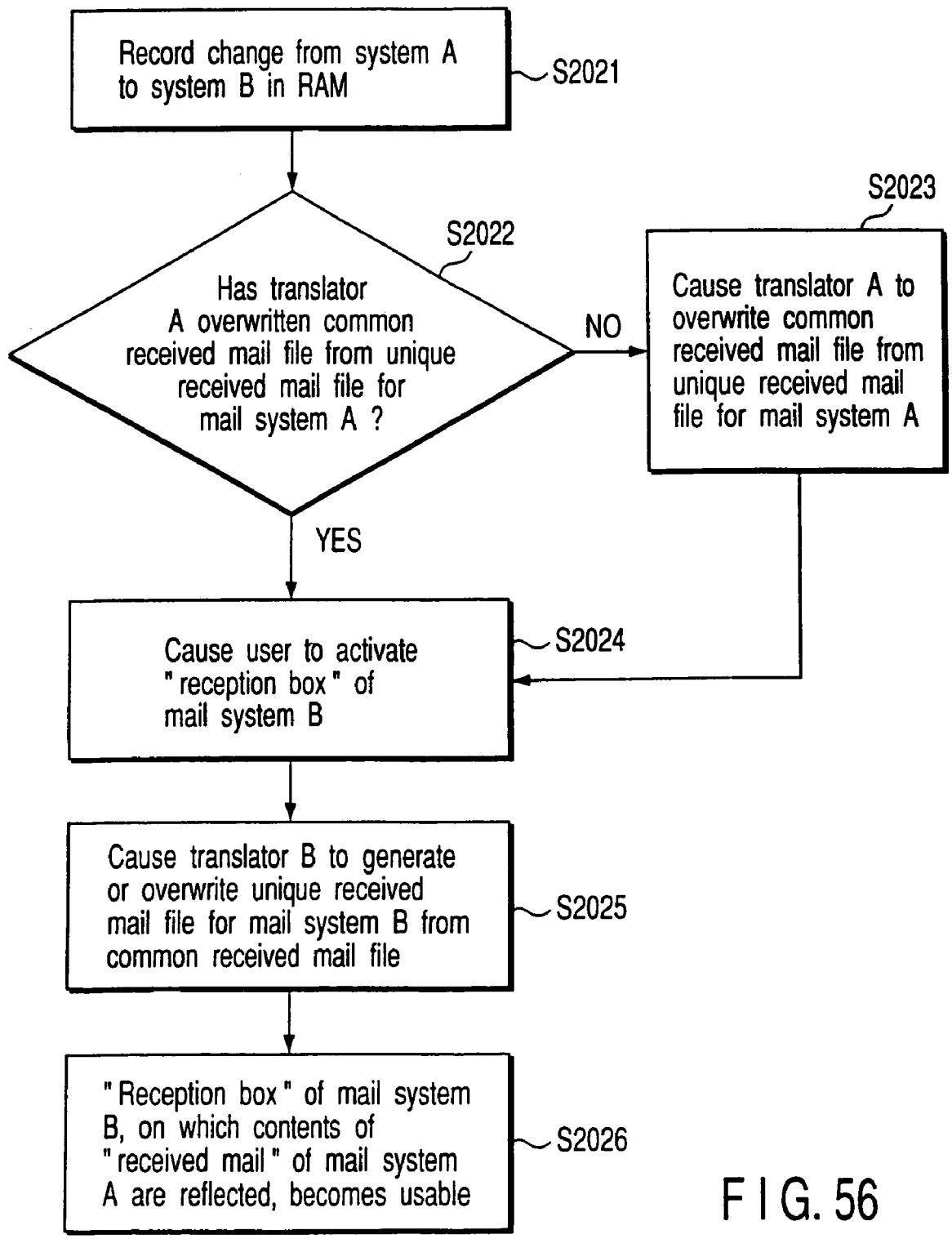
FIG. 56 is a flowchart illustrating the processing procedure in the thirteenth embodiment.

The flow of this processing will be described below with reference to FIG. 56. In the initial state, assume that the user who is carrying the mobile radio communication apparatus is located in the service area of the system A, and the mobile radio communication apparatus is functioning as a terminal adapted to the system A. At this time, the resource controller 4 changes the modulation/demodulation execution file executed by the DSP 410 to the file corresponding to the system B, which is stored in the execution file storage section 411, and this change is recorded in the RAM 402 (step S2021). When the user moves, and the distance between the system A and the base station increases, the reception field strength of the mobile radio communication apparatus becomes small. This makes it difficult to make the mobile radio communication apparatus function as a terminal of the system A. At this time, assume that the user is located in the service area of the system B, and the mobile radio communication apparatus can ensure a sufficient reception field strength for a base station in the system B. The mobile radio communication apparatus cannot maintain the channel to the system A anymore and can instead know that a channel to the system B can be ensured, as described above.

Before this time, it is checked whether the common received mail file 710 is overwritten by the translator A 711 in accordance with the lately updated unique received mail file 703 for the mail system A (step S2022). As described above, at this time, the file format is converted from the unique received mail file 703 for the mail system A by the translator A 711, and the common received mail file 710 is overwritten by the file after conversion (step S2023). After that, processing advances to step S2024. Processing in step S2024 is not always necessary. In step S2024, the user activates "reception box" of the mail system B.

In step S2025, the translator B 712 is activated. The translator B 712 converts the file format of the common received mail file 710 into the format of the unique received mail file 704 for the mail system B. Thus, the received mail file 704 is generated or overwritten (step S2025).

As described above, the unique received mail file 704 for the mail system B is described in a file format which can be used in only the mail system B. Hence, with the above file conversion, when the user displays the menu list "reception box" as the received mail list in the mail system B, the contents of the menu list "received mail" updated in the mail system A can be directly reflected (step S2026). The user need not individually manage data for different radio communication systems, resulting in a large increase in convenience.

In the above description, the unique received mail files 703 and 704 for the mail systems A and B are present on the storage device 5. However, these files 703 and 704 may be temporary files generated on the memory (not shown) in the resource controller 4 as needed. When the received mail in the above description is replaced with transmitted mail, the same management as described above can be done for the information of mail transmitted by the user in the past. The same management as described above can also be done for the mail address information of frequent mail transmission/reception partners of the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for connecting a mobile radio communication apparatus to a plurality of radio communication systems, comprising:

defining a plurality of functions in a resource of a signal processing device, said functions including at least a modem function and a protocol function;

performing signal processing in said resource to transmit and receive a radio signal through a wireless transmitter-receiver device;

controlling said signal processing device to redefine, to the resource, another modem function and another protocol function corresponding to a respective one of the mobile communication systems;

executing a predetermined program in a general-use processor serving as another part of said resource;

redefining a circuit structure of at least one programmable hardware device serving as a part of said resource according to a set of a plurality of logic circuits which carry out basic calculations of at least a part of said signal processing;

determining respective shares of processing to be executed by said at least one programmable hardware device and the general-use processor in accordance with the contents of said signal processing; and controlling said signal processing device to define, to the resource, the signal processing functions in accordance with determination of respective shares.

2. The method recited in claim 1, further comprising:

determining if it is possible to additionally define a newly requested signal processing function to said resource by comparing a residual resource amount with a resource amount necessary for defining, to the resource, the newly requested signal processing function of the resource; and executing an additional definition when it is determined that the residual resource amount is greater than or equal to the resource amount necessary for defining the newly requested signal processing function.

3. A method for connecting a mobile radio communication apparatus to a plurality of radio communication systems, comprising:

defining a plurality of functions in a resource of a signal processing device, said functions including at least a modem function and a protocol function;

performing signal processing in said resource to transmit and receive a radio signal through a wireless transmitter-receiver device;

controlling said signal processing device to redefine, to the resource, another modem function and another protocol function corresponding to a respective one of the mobile communication systems;

redefining a circuit structure of at least one programmable hardware device serving as a part of said resource according to a set of a plurality of logic circuits which carry out basic calculations of at least a part of said signal processing;

storing a program in a first memory of said signal processing device which indicates a procedure of said signal processing;

storing a plurality of circuit structure descriptions of said programmable hardware device corresponding to processing contents respectively in a second memory of said signal processing device, the circuit structure descriptions being used by said signal processing device to carry out said signal processing; and controlling the at least one programmable hardware device and said second memory to revise the circuit structure descriptions of said programmable hardware device in accordance with the program read out from said first memory under control of said controller.

4. The method recited in claim 3, further comprising:
determining if it is possible to additionally define a newly requested signal processing function to said resource by comparing a residual resource amount with a resource amount necessary for defining, to the resource, the newly requested signal processing function of the resource; and
executing an additional definition when it is determined that the residual resource amount is greater than or equal to the resource amount necessary for defining the newly requested signal processing function.

5. A method for connecting a mobile radio communication apparatus to a plurality of radio communication systems, comprising:
defining a plurality of functions in a resource of a signal processing device, said functions including at least a modem function and a protocol function;
performing signal processing in said resource to transmit and receive a radio signal through a wireless transmitter-receiver device;
controlling said signal processing device to redefine, to the resource, another modem function and another protocol function corresponding to a respective one of the mobile communication systems;
redefining a circuit structure of at least one programmable hardware device serving as a part of said resource according to a set of a plurality of logic circuits which carry out basic calculations of at least a part of said signal processing;
storing a program in a first memory of said signal processing device which indicates a procedure of said signal processing;
storing a plurality of circuit structure descriptions of said programmable hardware device corresponding to processing contents respectively in a second memory of said signal processing device, the circuit structure descriptions being used by said signal processing device to carry out said signal processing;
controlling the at least one programmable hardware device and said second memory to revise the circuit structure descriptions of said programmable hardware device in accordance with the program read out from said first memory under control of said controller;
performing at least another part of said signal processing by executing a given program on a general-use processor serving as another part of said resource;
determining respective shares of processing to be executed by said at least one programmable hardware device and the general-use processor in accordance with the program read out from said first memory;
selecting one of said plurality of circuit structure descriptions stored in said second memory in accordance with determination of the shares;
supplying selected descriptions to said at least one programmable hardware device; and
giving an execution instruction of the processing to be shared by said general-use processor to said general-use processor.

6. The method recited in claim 5, further comprising:
determining if it is possible to additionally define a newly requested signal processing function to said resource by comparing a residual resource amount with a resource amount necessary for defining, to the resource, the newly requested signal processing function of the resource; and
executing an additional definition when it is determined that the residual resource amount is greater than or equal to the resource amount necessary for defining the newly requested signal processing function.

* * * * *